(12) United States Patent
Kim et al.

(10) Patent No.: US 9,360,546 B2
(45) Date of Patent: Jun. 7, 2016

(54) SYSTEMS, METHODS, AND APPARATUS FOR INDICATING DIRECTION OF ARRIVAL

(71) Applicant: QUALCOMM Incorporated, San Diego, CA (US)

(72) Inventors: Lae-Hoon Kim, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/834,715

(22) Filed: Mar. 15, 2013

(65) Prior Publication Data

US 2013/0272538 A1 Oct. 17, 2013

Related U.S. Application Data

(60) Provisional application No. 61/624,181, filed on Apr. 13, 2012, provisional application No. 61/642,954, filed on May 4, 2012, provisional application No. 61/726,336, filed on Nov. 14, 2012, provisional application No. 61/713,447, filed on Oct. 12, 2012, provisional application No. 61/714,212, filed on Oct. 15, 2012.

(51) Int. Cl.
| | |
|---|---|
| *H04R 1/08* | (2006.01) |
| *G01S 3/80* | (2006.01) |
| *H04R 3/00* | (2006.01) |
| *G01B 21/00* | (2006.01) |

(Continued)

(52) U.S. Cl.
CPC ............... *G01S 3/8006* (2013.01); *G01B 21/00* (2013.01); *G01S 3/80* (2013.01); *G01S 5/18* (2013.01); *G01S 5/186* (2013.01); *G01S 15/876* (2013.01); *G06F 3/0484* (2013.01); *G06F 3/167* (2013.01); *H04R 1/08* (2013.01); *H04R 3/00* (2013.01); *H04R 3/005* (2013.01); *G06F 1/1633* (2013.01); *G10L 2021/02166* (2013.01)

(58) Field of Classification Search
CPC ..... G01S 3/8006; G01S 15/876; G01S 5/186; H04R 1/08; H04R 3/00; G01B 21/00; G06F 3/167; G06F 2/0484; G06F 1/1633; G10L 2021/02166
USPC ............... 381/92, 94.1, 57, 58; 367/108, 127; 704/233

See application file for complete search history.

(56) References Cited

U.S. PATENT DOCUMENTS

| | | |
|---|---|---|
| 4,982,375 A | 1/1991 | Ng |
| 5,561,641 A | 10/1996 | Nishimori et al. |

(Continued)

FOREIGN PATENT DOCUMENTS

| | | |
|---|---|---|
| CN | 101122636 A | 2/2008 |
| CN | 101592728 A | 12/2009 |

(Continued)

OTHER PUBLICATIONS

International Search Report and Written Opinion—PCT/US2013/032916—ISA/EPO—Jul. 26, 2013.

(Continued)

*Primary Examiner* — Melur Remakrishnaiah
(74) *Attorney, Agent, or Firm* — Austin Rapp & Hardman

(57) ABSTRACT

Systems, methods, and apparatus for projecting an estimated direction of arrival of sound onto a plane that does not include the estimated direction are described.

52 Claims, 61 Drawing Sheets

(51) Int. Cl.
*G06F 3/0484* (2013.01)
*G06F 3/16* (2006.01)
*G01S 15/87* (2006.01)
*G01S 5/18* (2006.01)
G10L 21/0216 (2013.01)
G06F 1/16 (2006.01)

(56) References Cited

U.S. PATENT DOCUMENTS

| | | | |
|---|---|---|---|
| 5,774,562 A | 6/1998 | Furuya et al. | |
| 5,864,632 A | 1/1999 | Ogawa et al. | |
| 6,339,758 B1 | 1/2002 | Kanazawa et al. | |
| 6,850,496 B1 | 2/2005 | Knappe et al. | |
| 7,626,889 B2 | 12/2009 | Seltzer et al. | |
| 7,712,038 B2 | 5/2010 | Brand et al. | |
| 7,788,607 B2 | 8/2010 | Boillot et al. | |
| 7,880,668 B1 | 2/2011 | Krause et al. | |
| 7,952,962 B2 | 5/2011 | Walley et al. | |
| 7,983,720 B2 | 7/2011 | Chen | |
| 8,005,237 B2 | 8/2011 | Tashev et al. | |
| 8,310,656 B2 | 11/2012 | Zalewski | |
| 8,369,184 B2 | 2/2013 | Calhoun | |
| 8,509,703 B2* | 8/2013 | Chen et al. | 455/67.13 |
| 8,525,868 B2* | 9/2013 | Forutanpour et al. | 348/14.02 |
| 8,705,778 B2 | 4/2014 | Zhan et al. | |
| 9,069,065 B1 | 6/2015 | Coley et al. | |
| 2002/0048376 A1 | 4/2002 | Ukita | |
| 2002/0122072 A1 | 9/2002 | Selker | |
| 2003/0009329 A1 | 1/2003 | Stahl et al. | |
| 2005/0047611 A1 | 3/2005 | Mao | |
| 2006/0117261 A1 | 6/2006 | Sim et al. | |
| 2006/0133622 A1* | 6/2006 | Chen | 381/92 |
| 2007/0255571 A1 | 11/2007 | Noh et al. | |
| 2008/0019589 A1 | 1/2008 | Yoon et al. | |
| 2008/0079723 A1 | 4/2008 | Hanson et al. | |
| 2008/0259731 A1 | 10/2008 | Happonen | |
| 2008/0269930 A1 | 10/2008 | Yamashita et al. | |
| 2009/0122023 A1 | 5/2009 | Kikuoka | |
| 2009/0149202 A1 | 6/2009 | Hill et al. | |
| 2009/0296991 A1 | 12/2009 | Anzola | |
| 2009/0310444 A1 | 12/2009 | Hiroe | |
| 2010/0054085 A1 | 3/2010 | Wolff et al. | |
| 2010/0095234 A1 | 4/2010 | Lane et al. | |
| 2010/0123785 A1 | 5/2010 | Chen et al. | |
| 2010/0142327 A1 | 6/2010 | Kepesi et al. | |
| 2010/0195838 A1 | 8/2010 | Bright | |
| 2010/0226210 A1 | 9/2010 | Kordis et al. | |
| 2010/0241959 A1 | 9/2010 | Ng et al. | |
| 2010/0303247 A1 | 12/2010 | Sinivaara | |
| 2010/0323652 A1 | 12/2010 | Visser et al. | |
| 2011/0038489 A1 | 2/2011 | Visser et al. | |
| 2011/0054891 A1 | 3/2011 | Vitte et al. | |
| 2011/0103614 A1 | 5/2011 | Cheung et al. | |
| 2011/0106865 A1 | 5/2011 | Boss et al. | |
| 2011/0130176 A1 | 6/2011 | Magrath et al. | |
| 2011/0158419 A1 | 6/2011 | Theverapperuma et al. | |
| 2011/0206214 A1 | 8/2011 | Christoph et al. | |
| 2011/0222372 A1 | 9/2011 | O'Donovan et al. | |
| 2011/0222698 A1 | 9/2011 | Asao et al. | |
| 2011/0234543 A1 | 9/2011 | Gaerdenfors et al. | |
| 2011/0271186 A1 | 11/2011 | Owens | |
| 2011/0293103 A1 | 12/2011 | Park et al. | |
| 2011/0299695 A1 | 12/2011 | Nicholson | |
| 2011/0305347 A1 | 12/2011 | Wurm | |
| 2011/0307251 A1 | 12/2011 | Tashev et al. | |
| 2011/0317848 A1 | 12/2011 | Ivanov et al. | |
| 2012/0020485 A1* | 1/2012 | Visser et al. | 381/57 |
| 2012/0026837 A1* | 2/2012 | Li et al. | 367/127 |
| 2012/0052872 A1 | 3/2012 | Do | |
| 2012/0057081 A1 | 3/2012 | Petersson et al. | |
| 2012/0071151 A1 | 3/2012 | Abramson et al. | |
| 2012/0076316 A1 | 3/2012 | Zhu et al. | |
| 2012/0099732 A1 | 4/2012 | Visser | |
| 2012/0120218 A1 | 5/2012 | Flaks et al. | |
| 2012/0163677 A1 | 6/2012 | Thorn | |
| 2012/0182429 A1 | 7/2012 | Forutanpour et al. | |
| 2012/0183149 A1 | 7/2012 | Hiroe | |
| 2012/0207317 A1 | 8/2012 | Abdollahzadeh et al. | |
| 2012/0224456 A1* | 9/2012 | Visser et al. | 367/127 |
| 2012/0263315 A1 | 10/2012 | Hiroe | |
| 2013/0272097 A1 | 10/2013 | Kim et al. | |
| 2013/0272539 A1 | 10/2013 | Kim et al. | |
| 2013/0275077 A1 | 10/2013 | Kim | |
| 2013/0275872 A1 | 10/2013 | Kim | |
| 2013/0275873 A1 | 10/2013 | Shaw et al. | |

FOREIGN PATENT DOCUMENTS

| | | |
|---|---|---|
| EP | 1331490 A1 | 7/2003 |
| EP | 1566772 A2 | 8/2005 |
| EP | 1887831 A2 | 2/2008 |
| EP | 2196150 A1 | 6/2010 |
| FR | 2962235 A1 | 1/2012 |
| JP | 2009246827 A | 10/2009 |
| WO | WO-2004063862 A2 | 7/2004 |
| WO | WO-2008051661 A1 | 5/2008 |
| WO | 2008139018 A1 | 11/2008 |
| WO | WO-2011076286 A1 | 6/2011 |

OTHER PUBLICATIONS

A. Farina et al., "A spherical microphone array for synthesizing virtual directive microphones in live broadcasting and in poswt production", AES 40th international Conference, Tokyo, Japan, Oct. 8, 2010, pp. 1-11, XP002712200.

Kubota Y., et al., "3D Auditory Scene Visualizer with Face Tracking: Design and Implementation for Auditory Awareness Compensation", Universal Communication, 2008. ISUC '08. Second International Symposium on, IEEE, Piscataway, NJ, USA, Dec. 15, 2008, pp. 42-49, XP031378922, ISBN: 978-0-7695-3433-6, p. 48, left-hand column, paragraph "4.2 User Interface with face tracking"—p. 18-26, left-hand column, paragraph "5. Discussion"; figures 6-8.

Mizumoto T., et al., "Design and implementation of selectable sound separation on the Texai telepresence system using HARK", Robotics and Automation (ICRA), 2011 IEEE International Conference on, IEEE, May 9, 2011, pp. 2130-2137, XP032033716, DOI: 10.1109/ICRA.2011.5979849 ISBN: 978-1-61284-386-5 p. 2132, left-hand column, paragraph "B Overview of Selectable sound separation"—paragraph C. Integration of HARK and Texai; figures 3,6.

Tamai Y et al: "Real-time 2 dimensional sound source localization by 128-channel huge microphone array", Robot and Human Interactive Communication, 2004, Roman 2004, 13th IEEE International Workshop on Kurashiki, Okayama, Japan Sep. 20-22, 2004, Piscataway, NJ, USA, IEEE, US, Sep. 20, 2004, pp. 6570, XP010755252, DOI: 10.1100/ROMAN.2004.1374731ISBN: 978-0-7803-8570-2.

Kubota Y., et al., "Design and Implementation of 3D Auditory Scene Visualizer Towards Auditory Awareness With Face Tracking," Tenth IEEE International Symposium on Multimedia, 2008, pp. 468-476, ISBN 978-0-7695-3454-1.

* cited by examiner

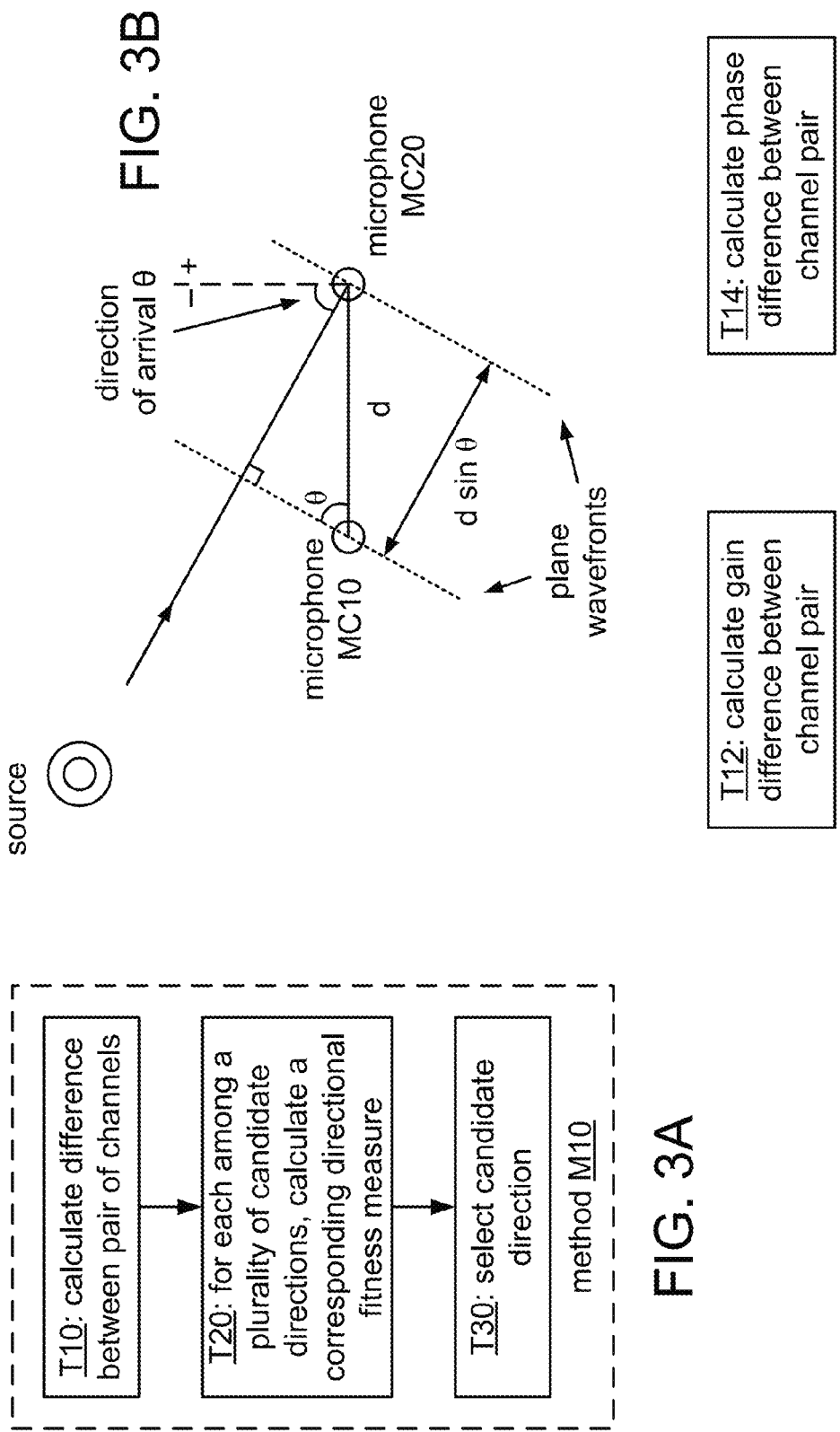

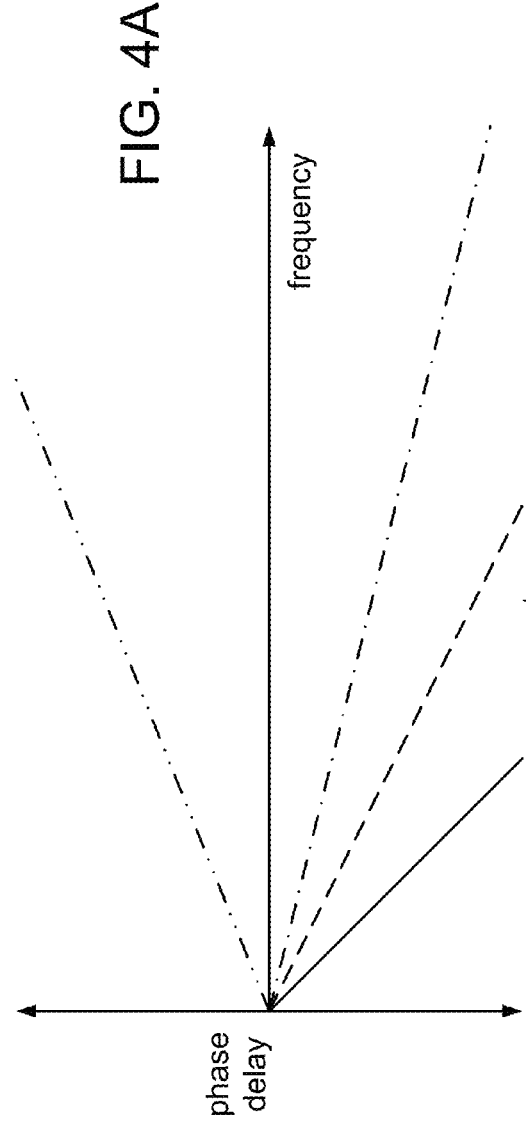
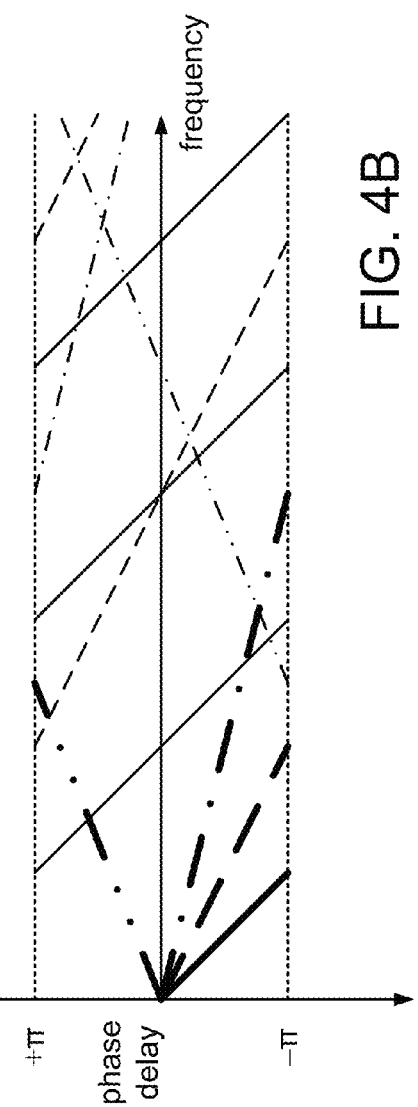
FIG. 4A
FIG. 4B

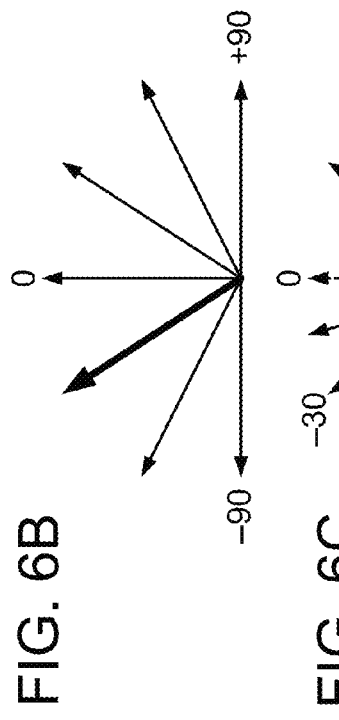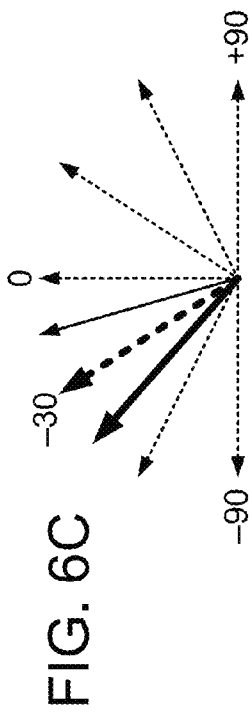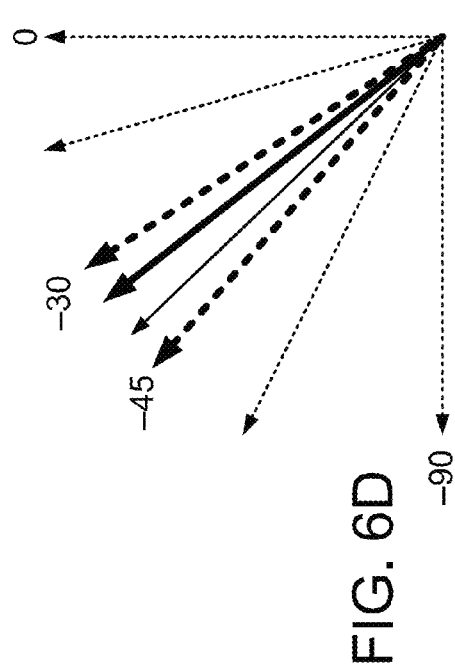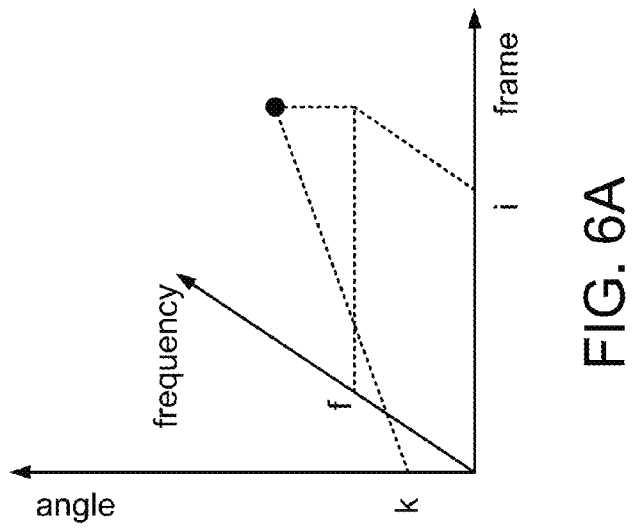
FIG. 6B
FIG. 6C
FIG. 6D
FIG. 6A

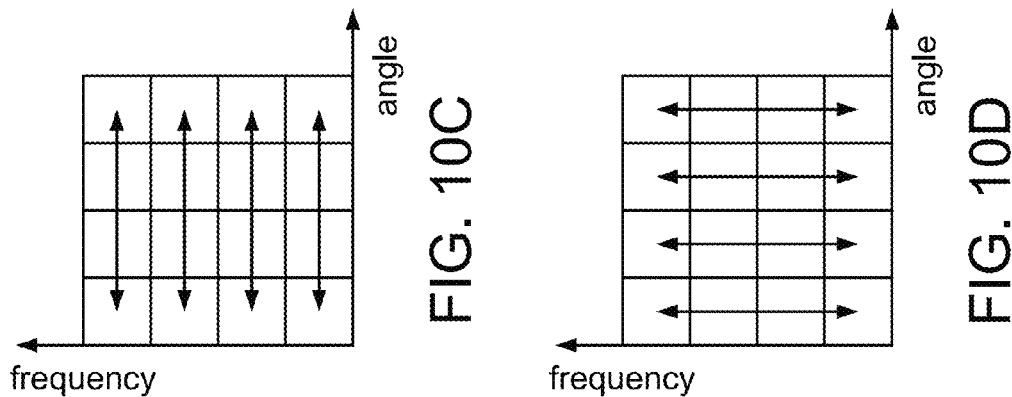
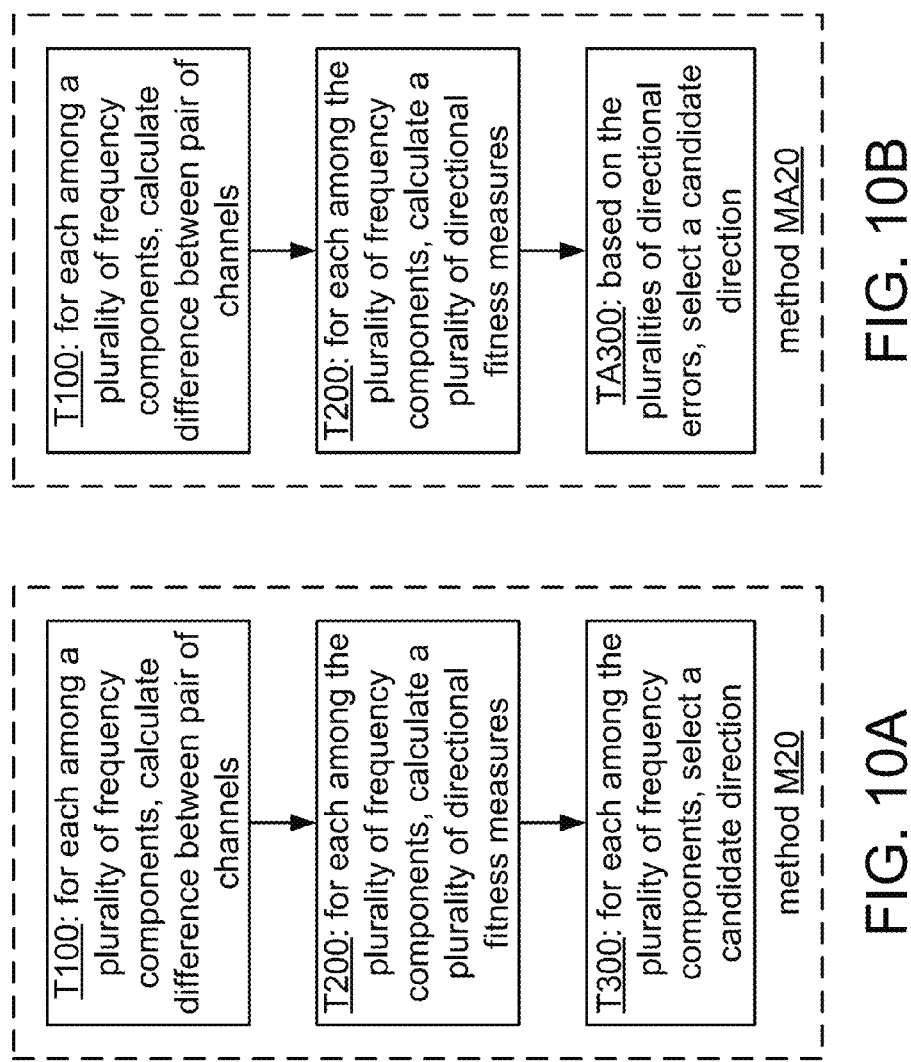

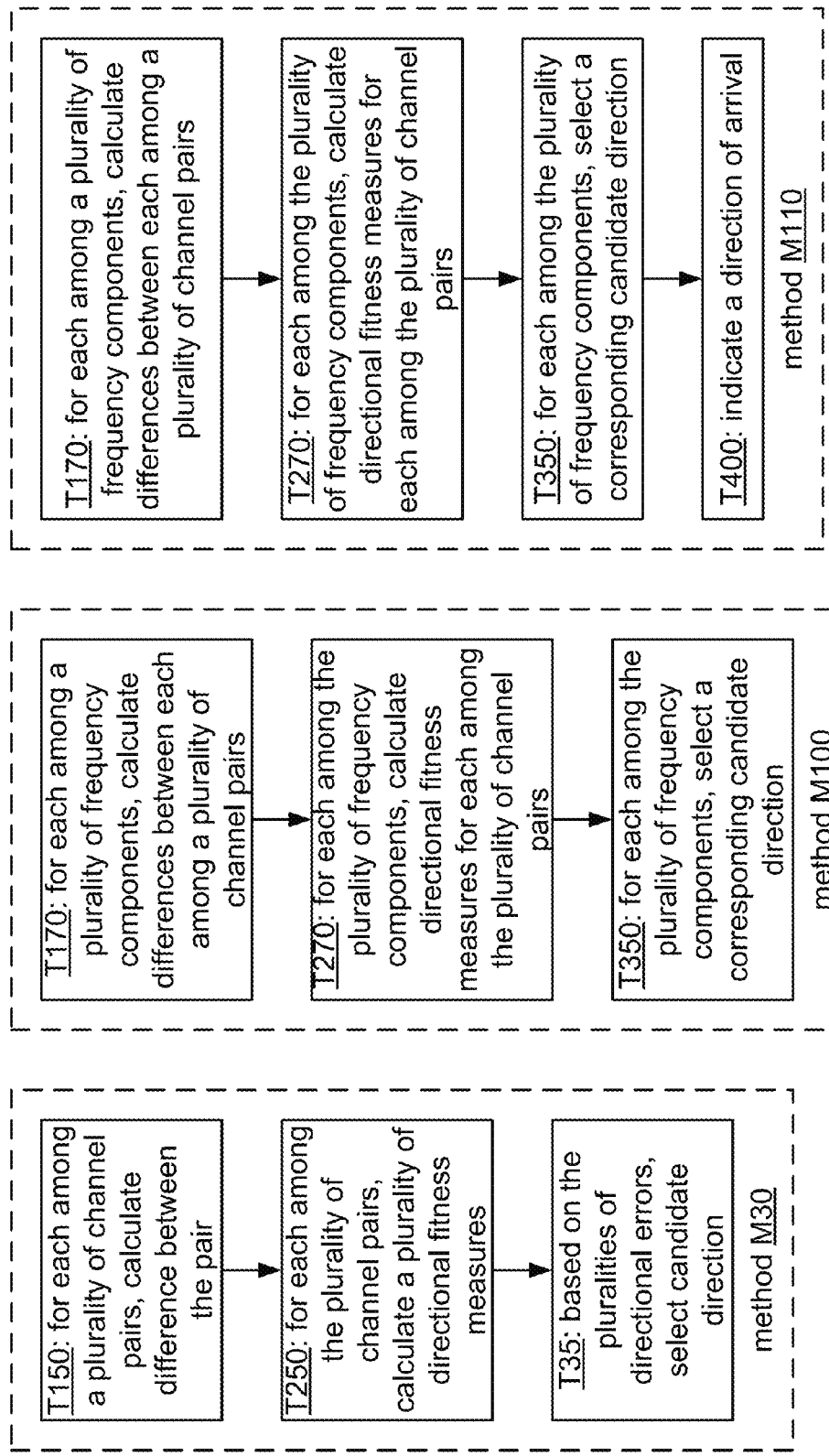

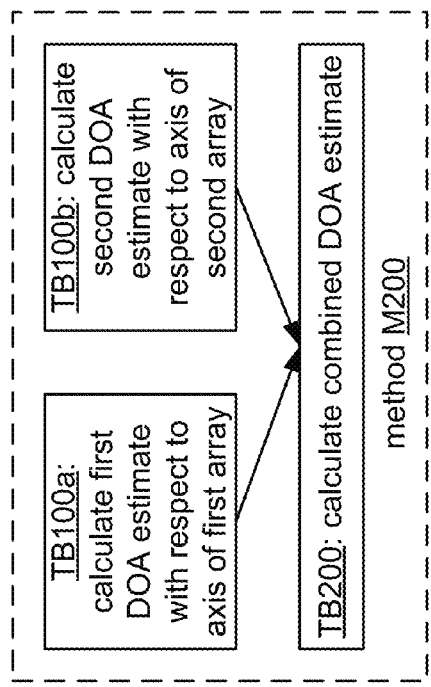
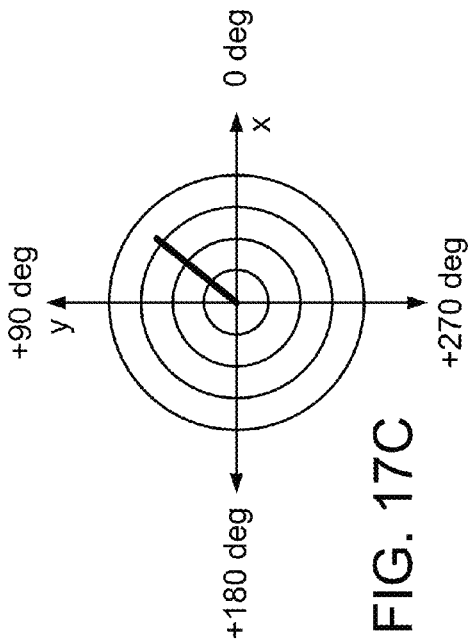
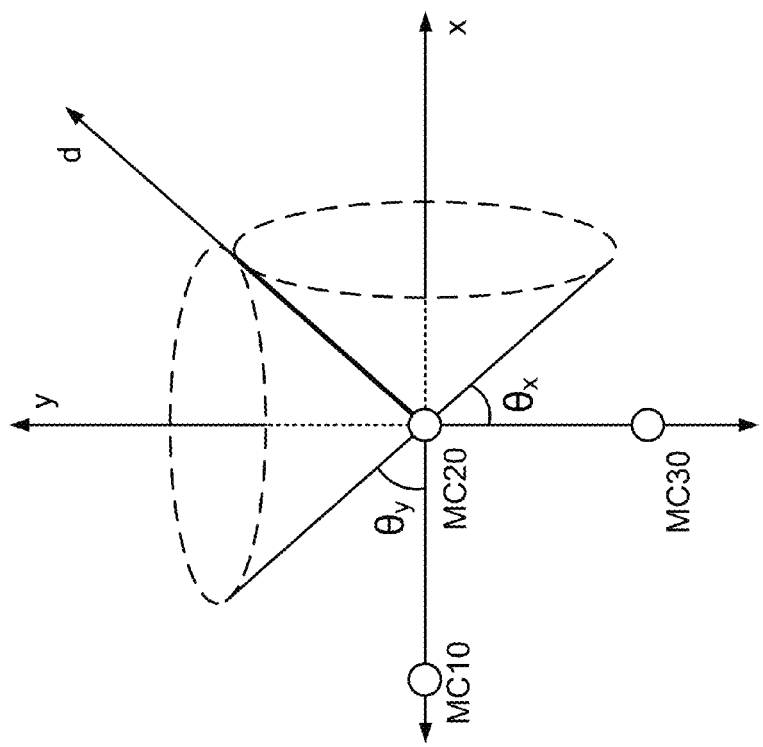
FIG. 17A
FIG. 17B
FIG. 17C

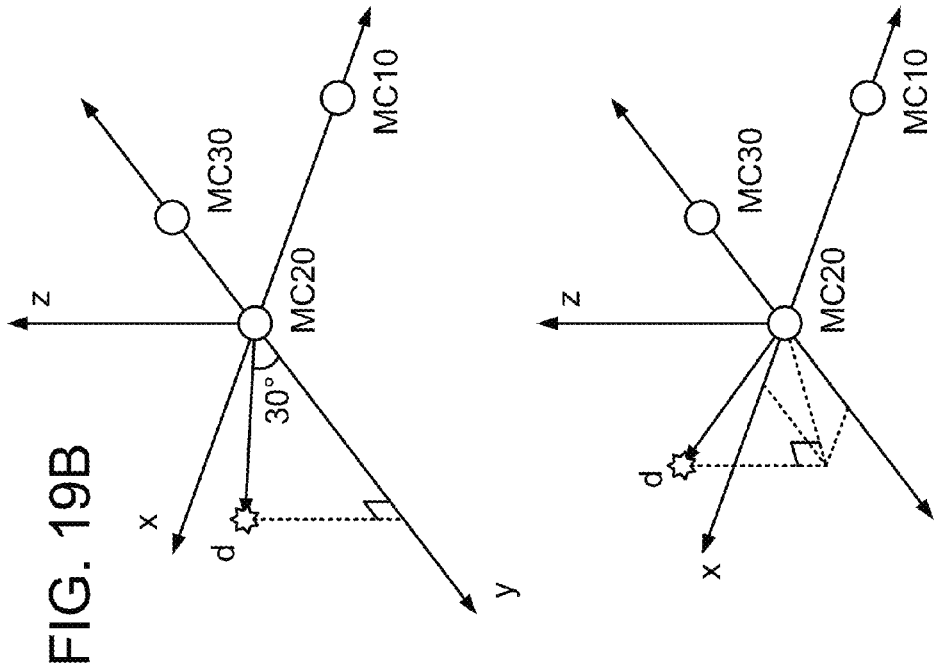
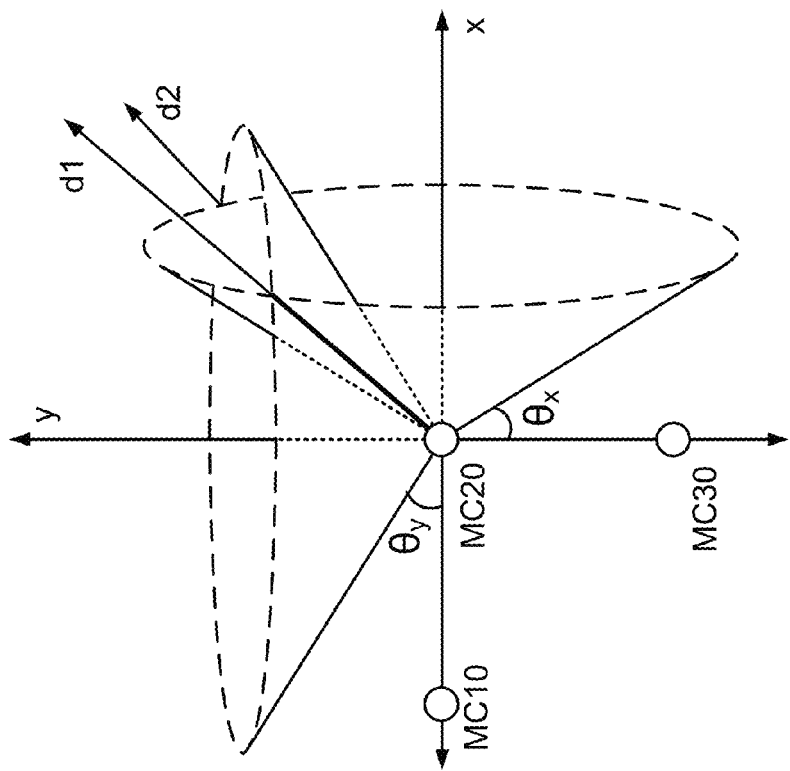
FIG. 19A
FIG. 19B
FIG. 19C

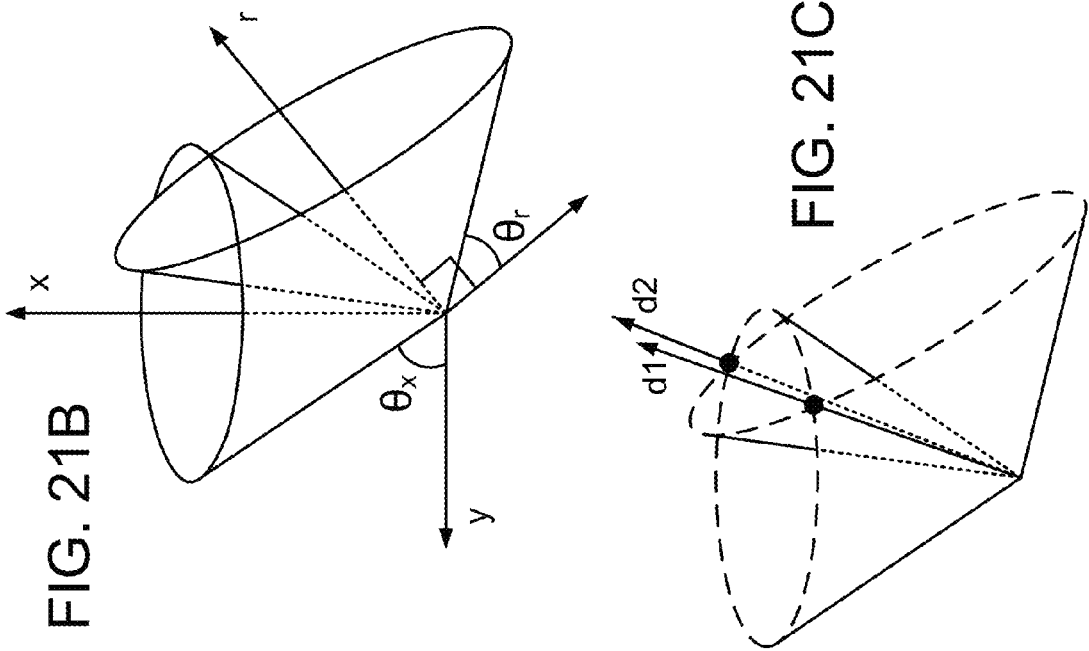
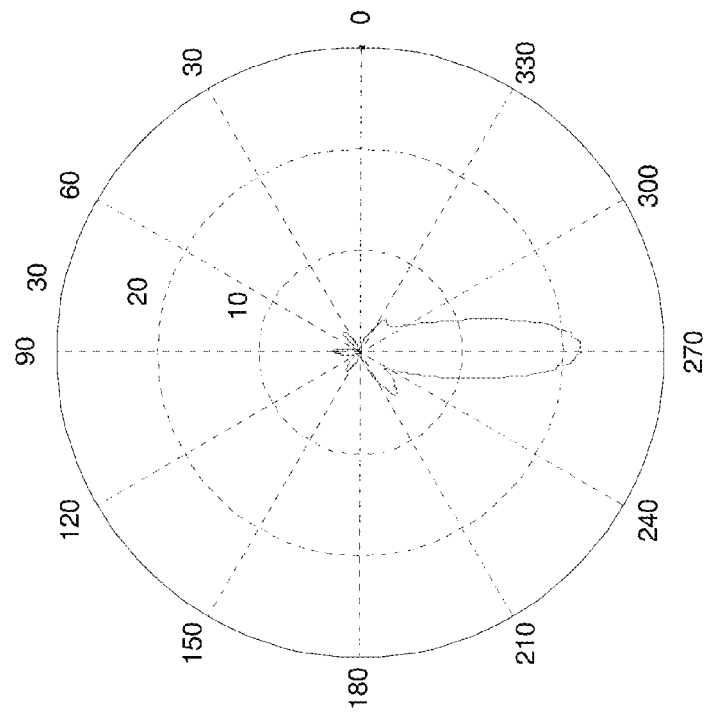
FIG. 21A
FIG. 21B
FIG. 21C

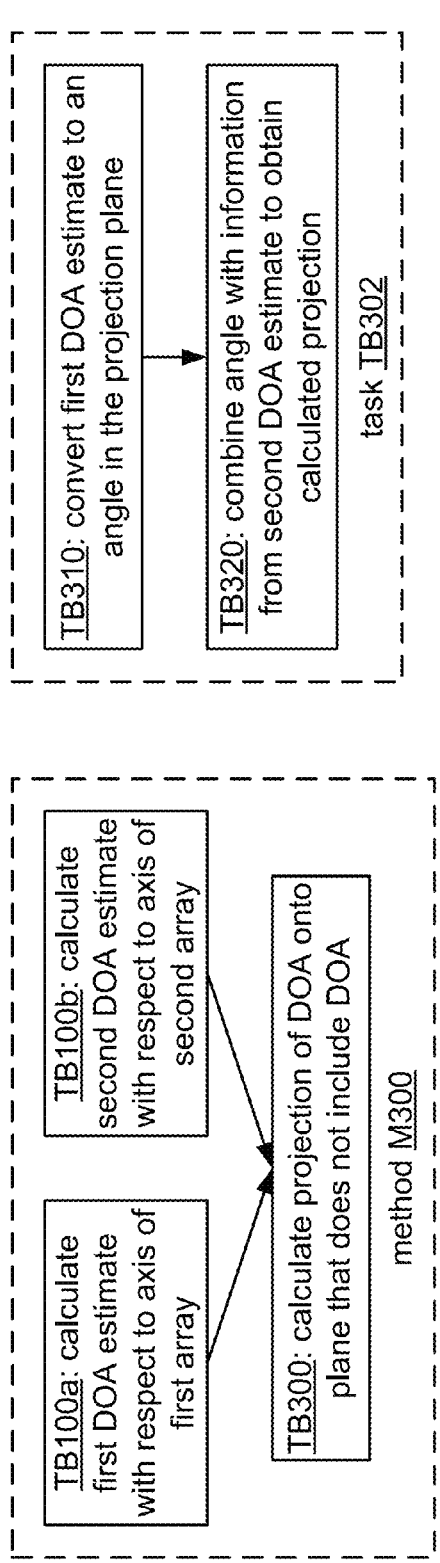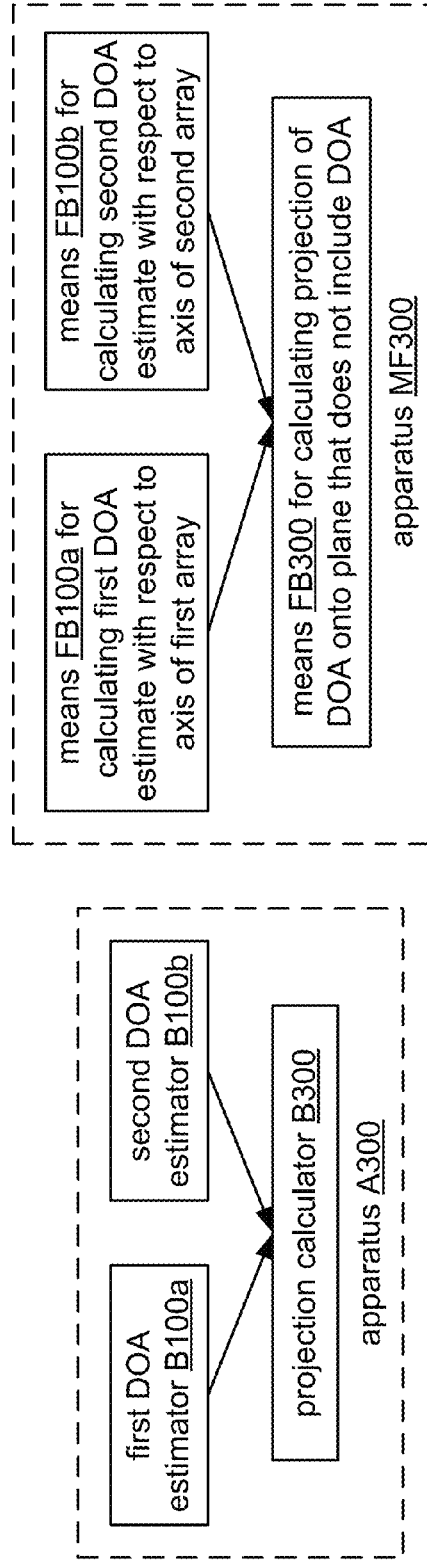

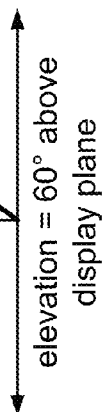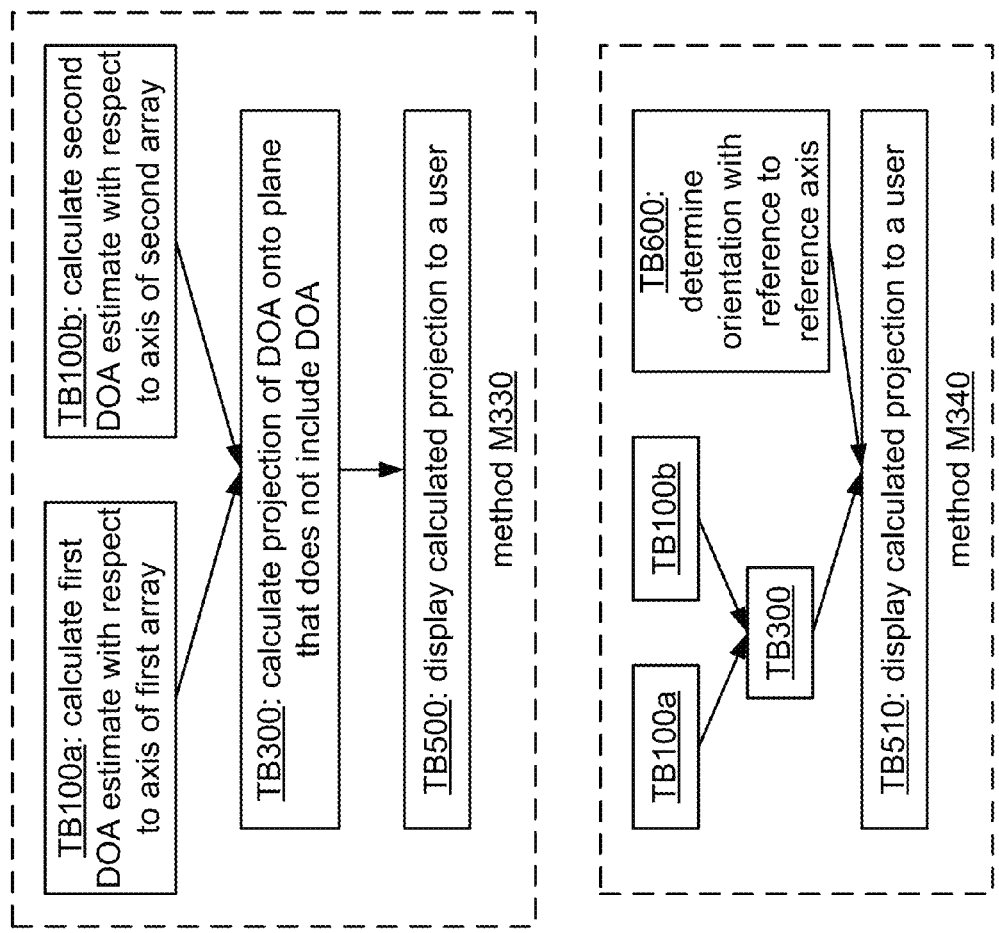

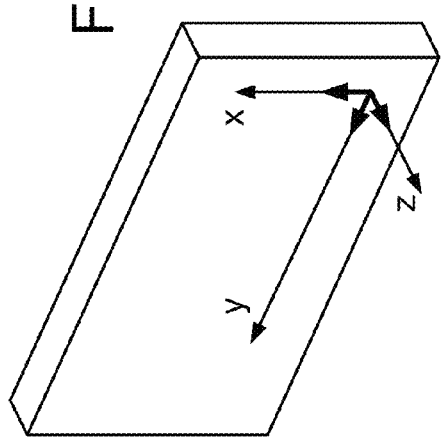
FIG. 28A
FIG. 28B
$$F = \left( \begin{bmatrix} 1 \\ 0 \\ 0 \end{bmatrix}, \begin{bmatrix} 0 \\ 1 \\ 0 \end{bmatrix}, \begin{bmatrix} 0 \\ 0 \\ 1 \end{bmatrix} \right)$$
$$F = \left( \begin{bmatrix} 0 \\ 0 \\ 1 \end{bmatrix}, \begin{bmatrix} 0 \\ 1 \\ 0 \end{bmatrix}, \begin{bmatrix} -1 \\ 0 \\ 0 \end{bmatrix} \right)$$
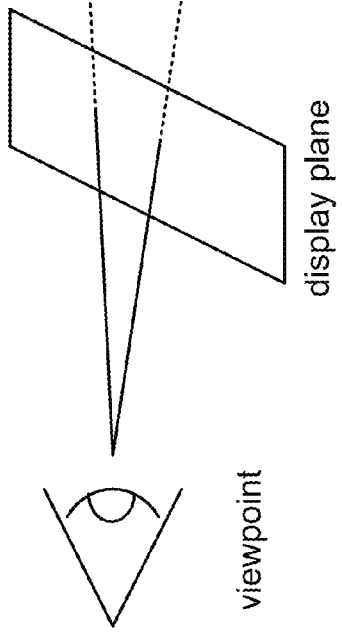
FIG. 28C

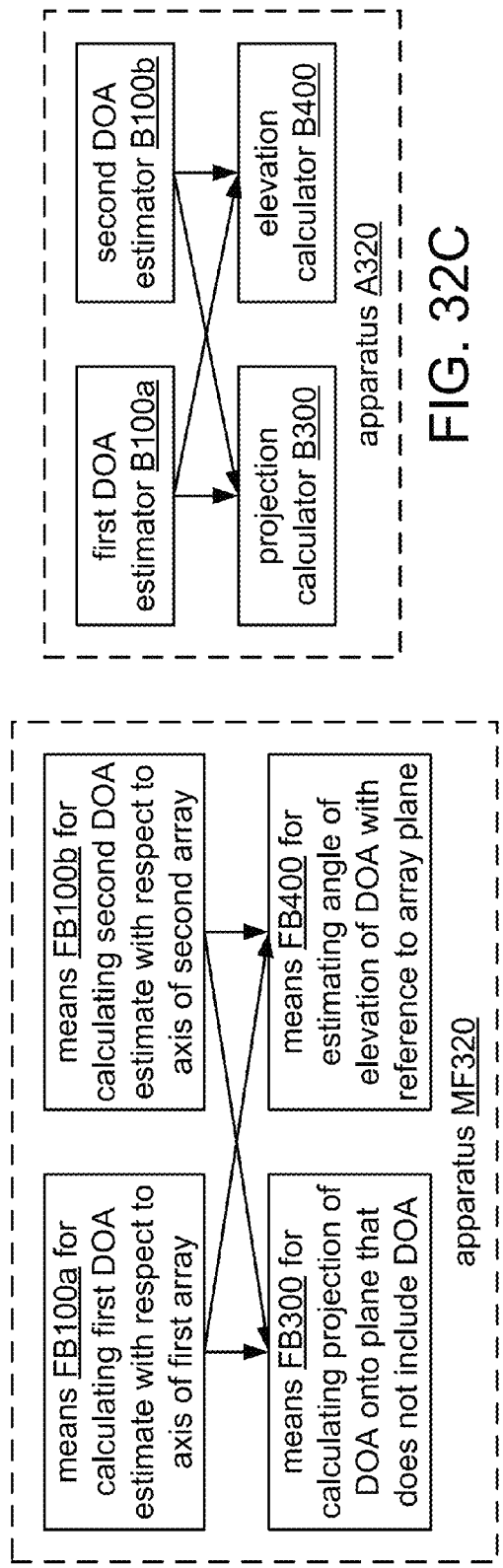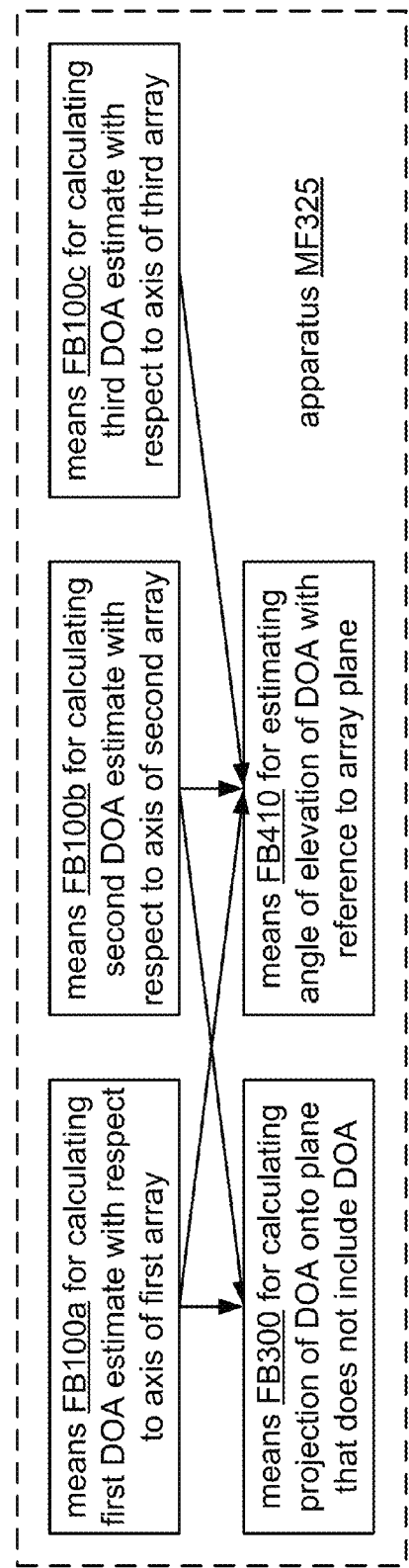
FIG. 32C
FIG. 32A
FIG. 32B

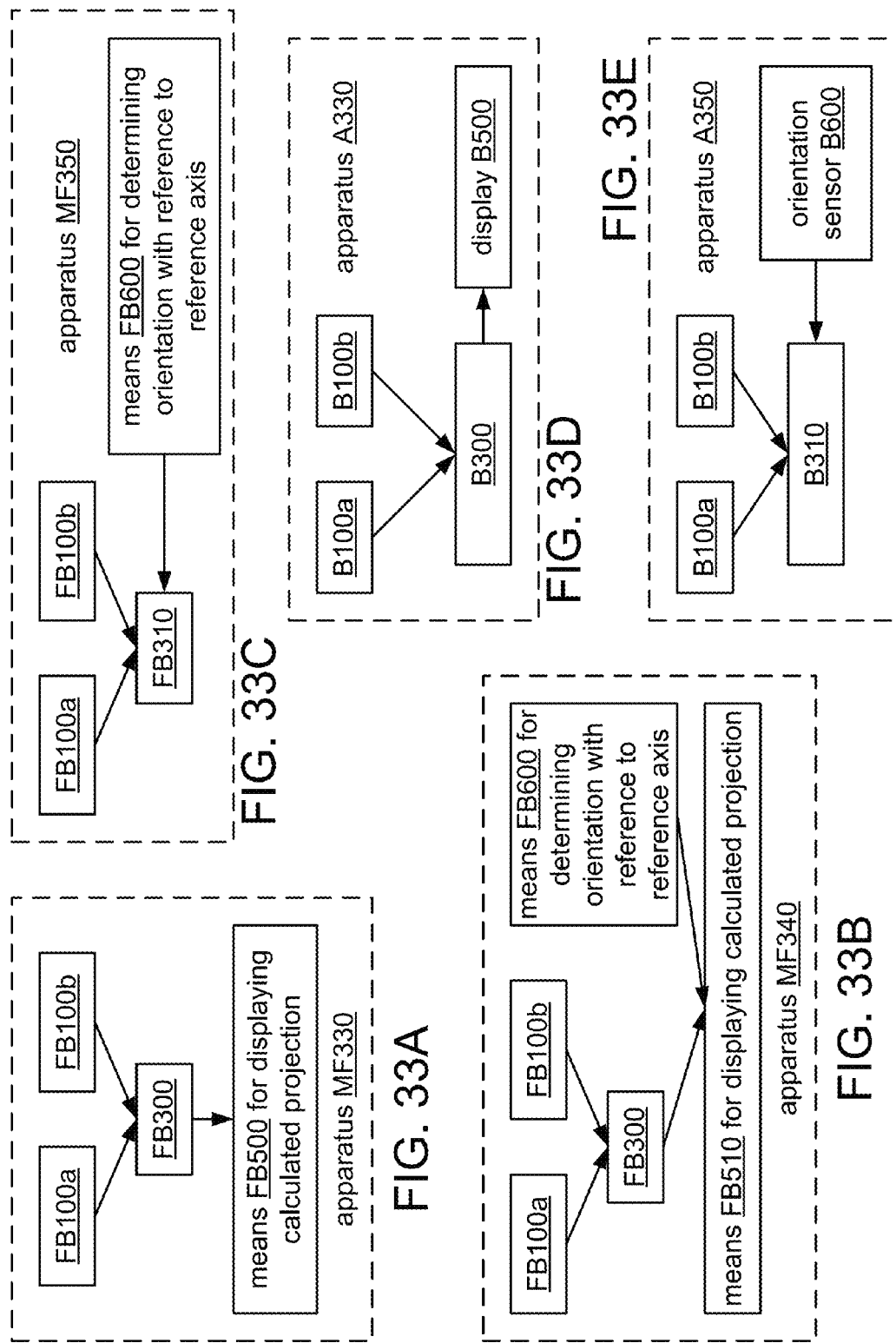

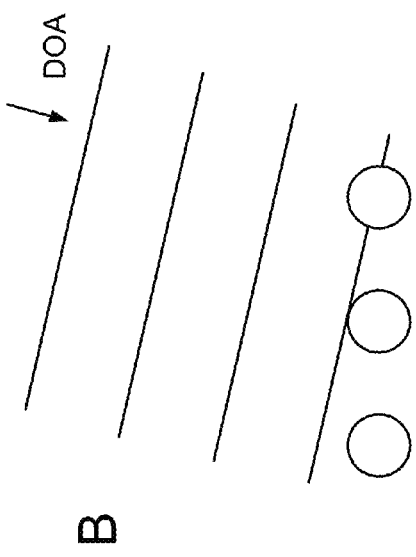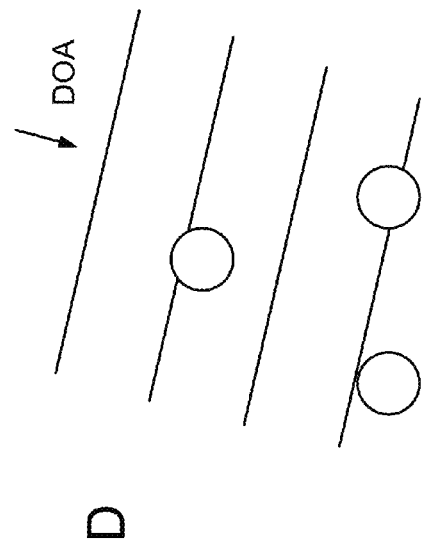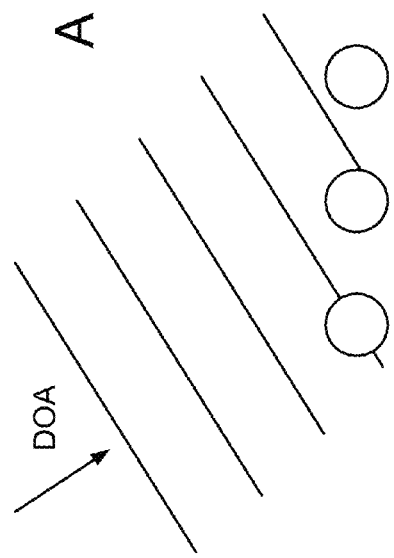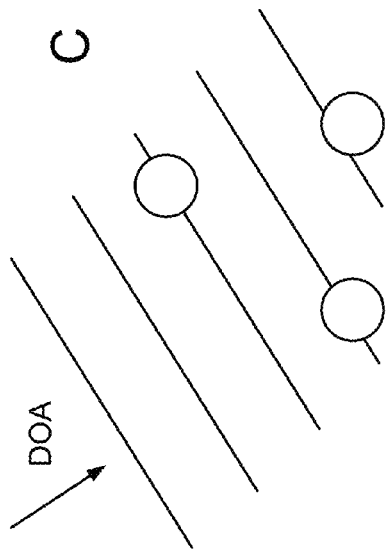
FIG. 48

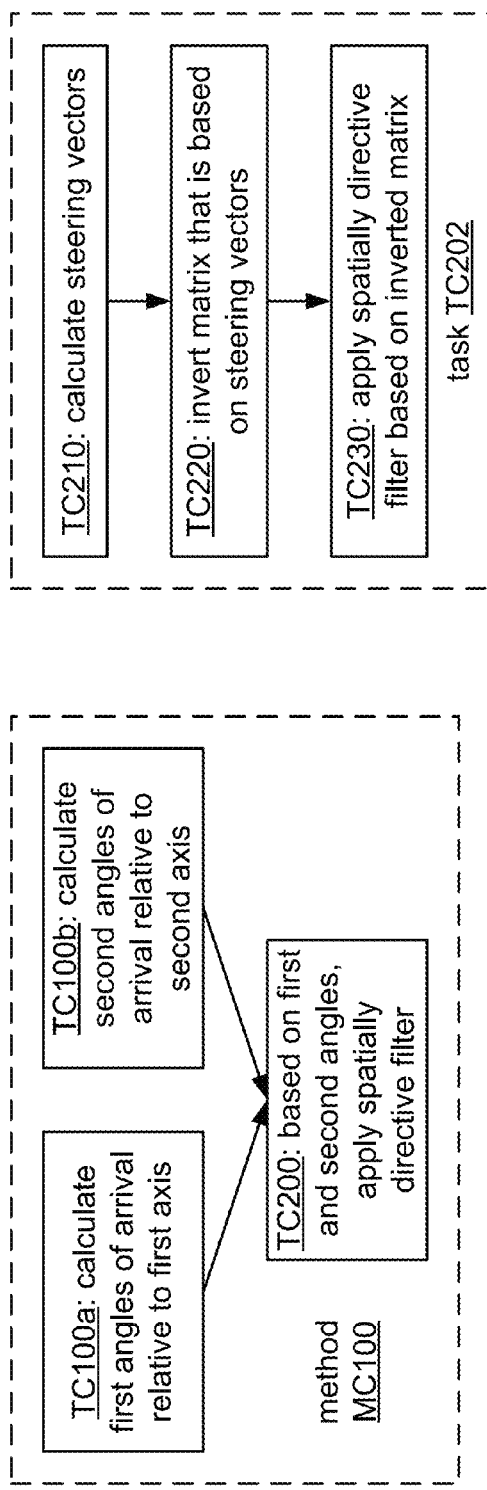
FIG. 49A
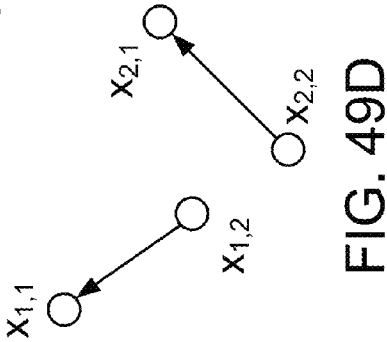
FIG. 49B
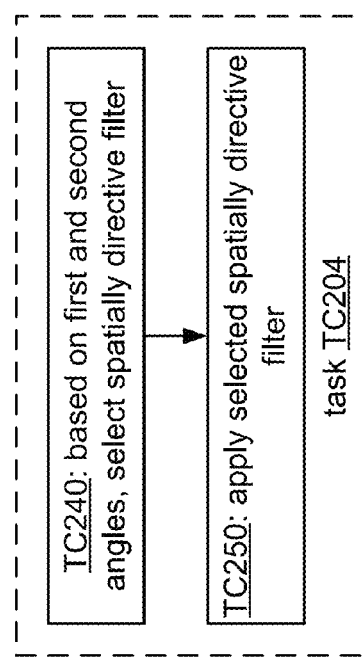
FIG. 49C
FIG. 49D
FIG. 49E $$\begin{bmatrix} d_{p,1}^n \\ d_{p,2}^n \end{bmatrix} = \begin{bmatrix} \exp\left(\dfrac{-j2\pi f l_p \sin\theta_{n,p}}{c}\right) \\ 1 \end{bmatrix}$$

$d^n_{p,1}$ — source index, microphone index, pair index $$\begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}$$

steering vector for microphone pair 1 and source 1 steering vector for microphone pair 2 and source 1

$$\left( \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} \right)^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}$$

FIG. 51A $$\left( \begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{P,1} & \cdots & d^N_{P,1} \\ d^1_{P,2} & \cdots & d^N_{P,2} \end{bmatrix}^H \begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{P,1} & \cdots & d^N_{P,1} \\ d^1_{P,2} & \cdots & d^N_{P,2} \end{bmatrix} \right)^{-1} \begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{P,1} & \cdots & d^N_{P,1} \\ d^1_{P,2} & \cdots & d^N_{P,2} \end{bmatrix}^H \begin{bmatrix} x_{1,1} \\ x_{1,2} \\ x_{2,1} \\ x_{2,2} \\ \vdots \\ x_{P,1} \\ x_{P,2} \end{bmatrix} = \begin{bmatrix} y_1 \\ y_2 \\ \vdots \\ y_N \end{bmatrix}$$

$$\left( \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right)^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}$$

FIG. 52B

$$\arg\max_i \left( \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right)^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}$$

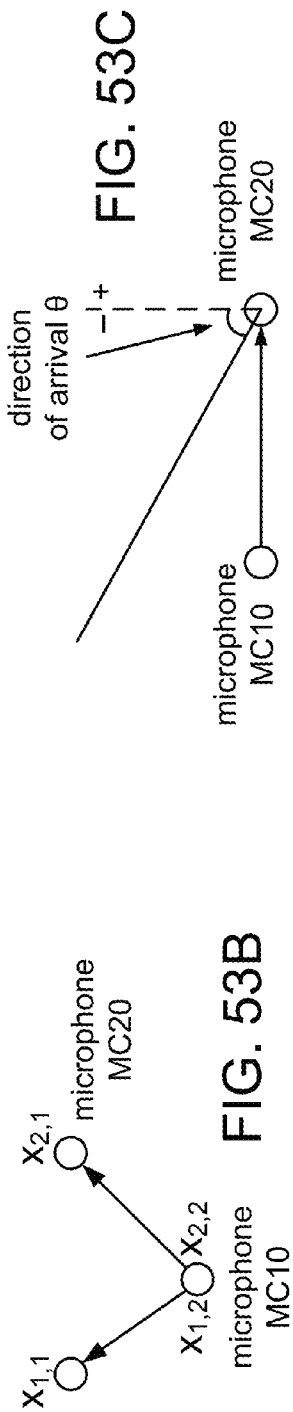

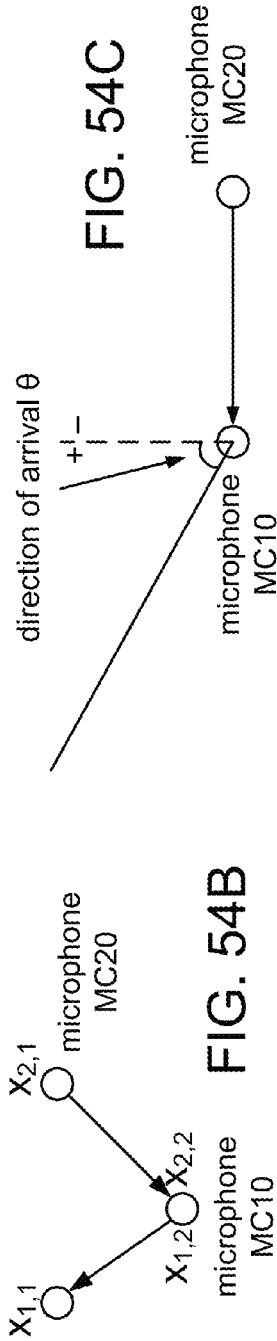

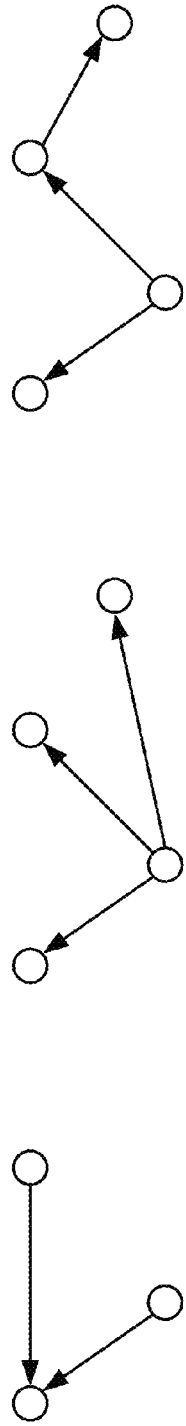

FIG. 55A $$\arg\max_{i} \frac{\left| \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H (\Gamma + \lambda \cdot I)^{-1} \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix} \right|^{-1} \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H (\Gamma + \lambda \cdot I)^{-1} \begin{bmatrix} x_{1,1} \\ x_{1,2} \\ x_{2,2} \end{bmatrix}}{\begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H (\Gamma + \lambda \cdot I)^{-1} \begin{bmatrix} d^i_{1,1} \\ d^i_{1,2} \\ d^i_{2,2} \end{bmatrix}}$$

FIG. 55B

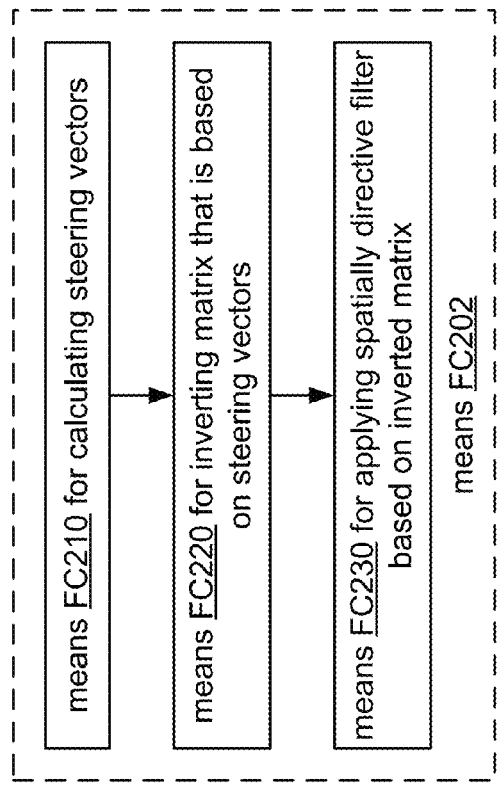
FIG. 56A
FIG. 56C
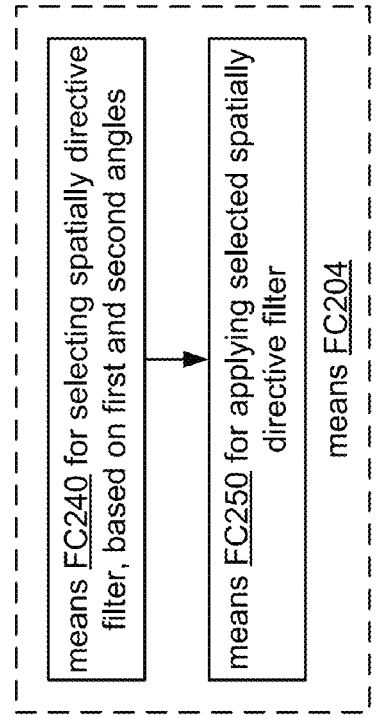
FIG. 56D
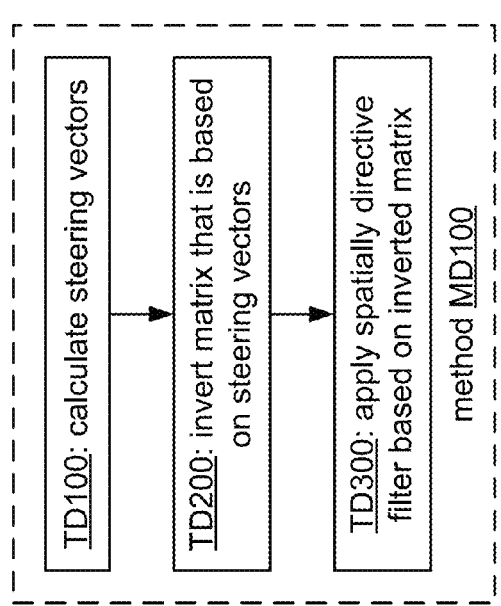
FIG. 56B
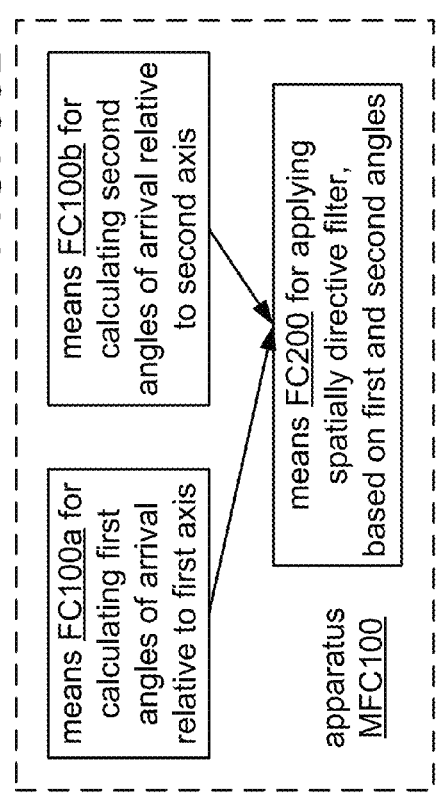

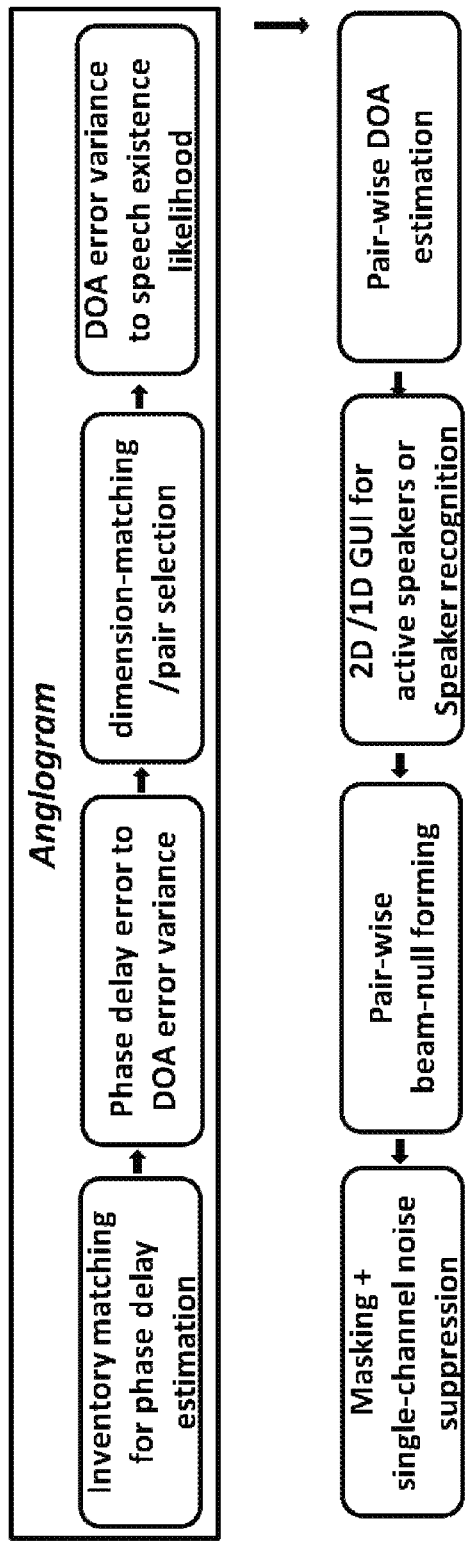
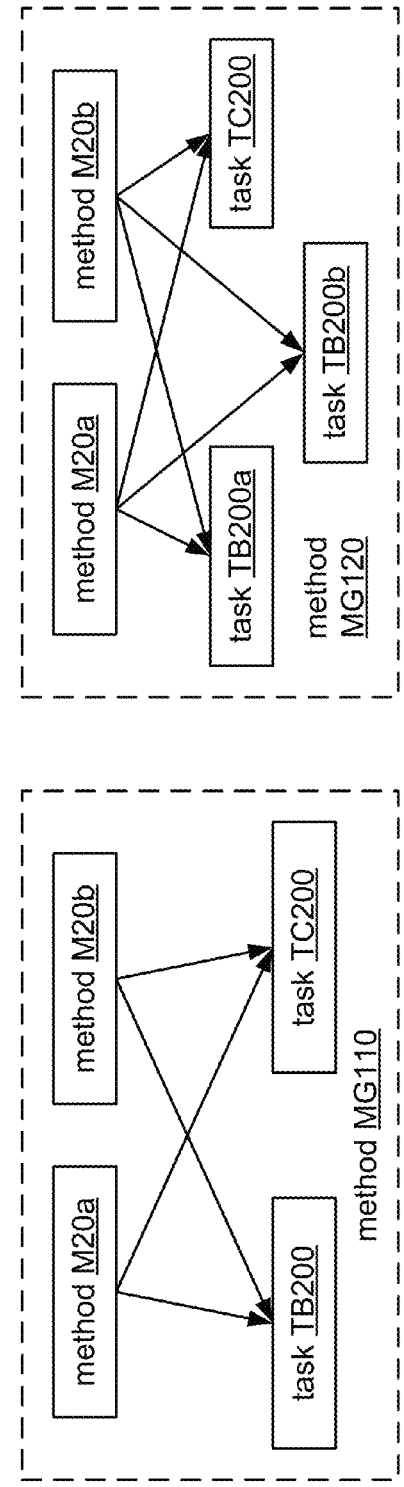
FIG. 58A
FIG. 58B
FIG. 58C

SYSTEMS, METHODS, AND APPARATUS FOR INDICATING DIRECTION OF ARRIVAL

CLAIM OF PRIORITY UNDER 35 U.S.C. §119

The present application for patent claims priority to Provisional Application No. 61/624,181, entitled "SYSTEMS, METHODS, AND APPARATUS FOR ESTIMATING DIRECTION OF ARRIVAL," filed Apr. 13, 2012, and assigned to the assignee hereof. The present application for patent also claims priority to Provisional Application No. 61/642,954, entitled "SYSTEMS, METHODS, AND APPARATUS FOR ESTIMATING DIRECTION OF ARRIVAL," filed May 4, 2012, and assigned to the assignee hereof. The present application for patent also claims priority to Provisional Application No. 61/726,336, entitled "SYSTEMS, METHODS, AND APPARATUS FOR ESTIMATING DIRECTION OF ARRIVAL," filed Nov. 14, 2012, and assigned to the assignee hereof. The present application for patent also claims priority to Provisional Application No. 61/713,447, entitled "SYSTEMS AND METHODS FOR MAPPING COORDINATES," filed Oct. 12, 2012, and assigned to the assignee hereof. The present application for patent also claims priority to Provisional Application No. 61/714,212, entitled "SYSTEMS AND METHODS FOR MAPPING COORDINATES," filed Oct. 15, 2012, and assigned to the assignee hereof.

BACKGROUND

1. Field

This disclosure is related to audio signal processing.

2. Background

FIG. 1 shows an example of a multi-microphone handset H100 that includes a first microphone pair MV10-1, MV10-3 whose axis is in a left-right direction of a front face of the device, and a second microphone pair MV10-1, MV10-2 whose axis is in a front-back direction (i.e., orthogonal to the front face). Such an arrangement may be used to determine when a user is speaking at the front face of the device (e.g., in a browse-talk mode). Information from the front-back microphone pair may be used to resolve an ambiguity between front and back directions that the left-right microphone pair typically cannot resolve on its own.

SUMMARY

A method of indicating a direction of arrival of a sound according to a general configuration includes calculating a first estimate, with respect to an axis of a first microphone array, of the direction of arrival; calculating a second estimate, with respect to an axis of a second microphone array that is different than the axis of the first microphone array, of the direction of arrival; and based on the first and second estimates, calculating a projection of the direction of arrival onto a projection plane that does not include the direction of arrival. Computer-readable storage media (e.g., non-transitory media) having tangible features that cause a machine reading the features to perform such a method are also disclosed.

An apparatus for indicating a direction of arrival of a sound according to a general configuration includes means for calculating a first estimate, with respect to an axis of a first microphone array, of the direction of arrival; means for calculating a second estimate, with respect to an axis of a second microphone array that is different than the first microphone array, of the direction of arrival; and means for calculating, based on the first and second estimates, a projection of the direction of arrival onto a projection plane that does not include the direction of arrival.

Another apparatus for indicating a direction of arrival of a sound according to a general configuration includes a first direction estimator configured to calculate a first estimate, with respect to an axis of a first microphone array, of the direction of arrival; a second direction estimator configured to calculate a second estimate, with respect to an axis of a second microphone array that is different than the first microphone array, of the direction of arrival; and a calculator configured to calculate, based on the first and second estimates, a projection of the direction of arrival onto a projection plane that does not include the direction of arrival.

BRIEF DESCRIPTION OF THE DRAWINGS

FIG. 3A shows a flowchart for a method M10 according to a general configuration.

FIG. 3B shows a far-field model of plane wave propagation relative to a microphone pair.

FIG. 3C shows an implementation T12 of task T10.

FIG. 3D shows an implementation T14 of task T10.

FIG. 4A shows plots of unwrapped phase delay vs. frequency for four different DOAs, and FIG. 4B shows plots of wrapped phase delay vs. frequency for the same DOAs.

FIG. 6A shows an example of likelihood calculation.

FIG. 6B illustrates a reduced set of candidate directions.

FIGS. 6C and 6D illustrate search sets of candidate directions for subsequent phases of an iterative implementation of tasks T20 and T30.

FIG. 10A shows a flowchart for an implementation M20 of method M10.

FIG. 10B shows a flowchart for an implementation MA20 of method M10.

FIG. 10C shows an example of calculating a DOA estimate.

FIG. 10D shows an example of identifying a DOA estimate for each frequency.

FIG. 13A shows a flowchart for an implementation M30 of method M10.

FIG. 13B shows a flowchart for an implementation M100 of method M30.

FIG. 13C shows a flowchart for an implementation M110 of method M100.

FIG. 17A shows a 2-D microphone array.

FIG. 17B shows a flowchart of a method M200 according to a general configuration.

FIG. 17C shows an example of a DOA estimate shown on a planar polar plot display.

FIG. 19A shows a 2-D microphone array.

FIG. 19B shows another example of a 2-D microphone array.

FIG. 19C shows an example of a general case in which a point source is elevated above the array plane.

FIG. 21A shows a plot obtained by applying an alternate mapping to the estimates of FIG. 19B.

FIG. 21B shows an example of intersecting cones of confusion.

FIG. 21C shows the lines of intersection of the cones of FIG. 21B.

FIG. 23A shows a flowchart of a method M300 according to a general configuration.

FIG. 23B shows a flowchart of an implementation TB302 of task TB300.

FIG. 23C shows a block diagram of an apparatus A300 according to a general configuration.

FIG. 23D shows a block diagram of an apparatus MF300 according to a general configuration.

FIG. 25A shows a flowchart of an implementation M330 of method M300.

FIG. 25B shows an example of a display of an indication of an estimated angle of elevation.

FIG. 25C shows a flowchart of an implementation M340 of method M330.

FIG. 28A shows an example in which the device coordinate system E is aligned with the world coordinate system.

FIG. 28B shows an example in which the device is rotated with respect to the world coordinate system.

FIG. 28C shows a perspective mapping, onto a display plane of a device, of a projection of a DOA onto the world reference plane.

FIG. 32A shows a block diagram of an implementation MF320 of apparatus MF300.

FIG. 32B shows a block diagram of an implementation MF325 of apparatus MF320.

FIG. 32C shows a block diagram of an implementation A320 of apparatus A300.

FIG. 33A shows a block diagram of an implementation MF330 of apparatus MF300.

FIG. 33B shows a block diagram of an implementation MF340 of apparatus MF330.

FIG. 33C shows a block diagram of an implementation MF350 of apparatus MF300.

FIG. 33D shows a block diagram of an implementation A330 of apparatus A300.

FIG. 33E shows a block diagram of an implementation A350 of apparatus A300.

FIGS. 48A-D show examples of source DOAs relative to different array configurations.

FIG. 49A shows a flowchart for a method MC100 according to a general configuration.

FIG. 49B shows a flowchart for an implementation TC202 of task TC200.

FIG. 49C shows a flowchart for an implementation TC204 of task TC200.

FIG. 49D shows coplanar microphone pairs.

FIG. 49E shows a three-microphone array having two microphone pairs.

FIG. 51A shows an example of the expression $A^+x=y$ for the matrix A shown in FIG. 50D.

FIG. 51B shows a generalization of the example of FIG. 51A.

FIG. 52A shows an example of a regularization operation.

FIG. 52B shows an example of a normalization operation.

FIGS. 53A-D and 54A-D show two different examples of overlapping rows of an array steering matrix.

FIG. 55A shows several examples of other microphone array configurations.

FIG. 55B shows an example of a pairwise normalized minimum variance distortionless response beamformer/null beamformer.

FIG. 56A shows a flowchart of a method MD100 of processing a multichannel signal according to such a general configuration.

FIG. 56B shows a block diagram of an apparatus MFC100 according to a general configuration.

FIG. 56C shows a block diagram of an implementation FC202 of means FC200.

FIG. 56D shows a block diagram of an implementation FC204 of means FC200.

FIG. 58A shows a flowchart of one example of an integrated method of source direction estimation as described herein.

FIG. 58B shows a flowchart of an implementation MG110 of method MG100.

FIG. 58C shows a flowchart of an implementation MG120 of method MG110.

FIG. 61B shows a block diagram of a wireless device 1102.

DETAILED DESCRIPTION

Figure 1:
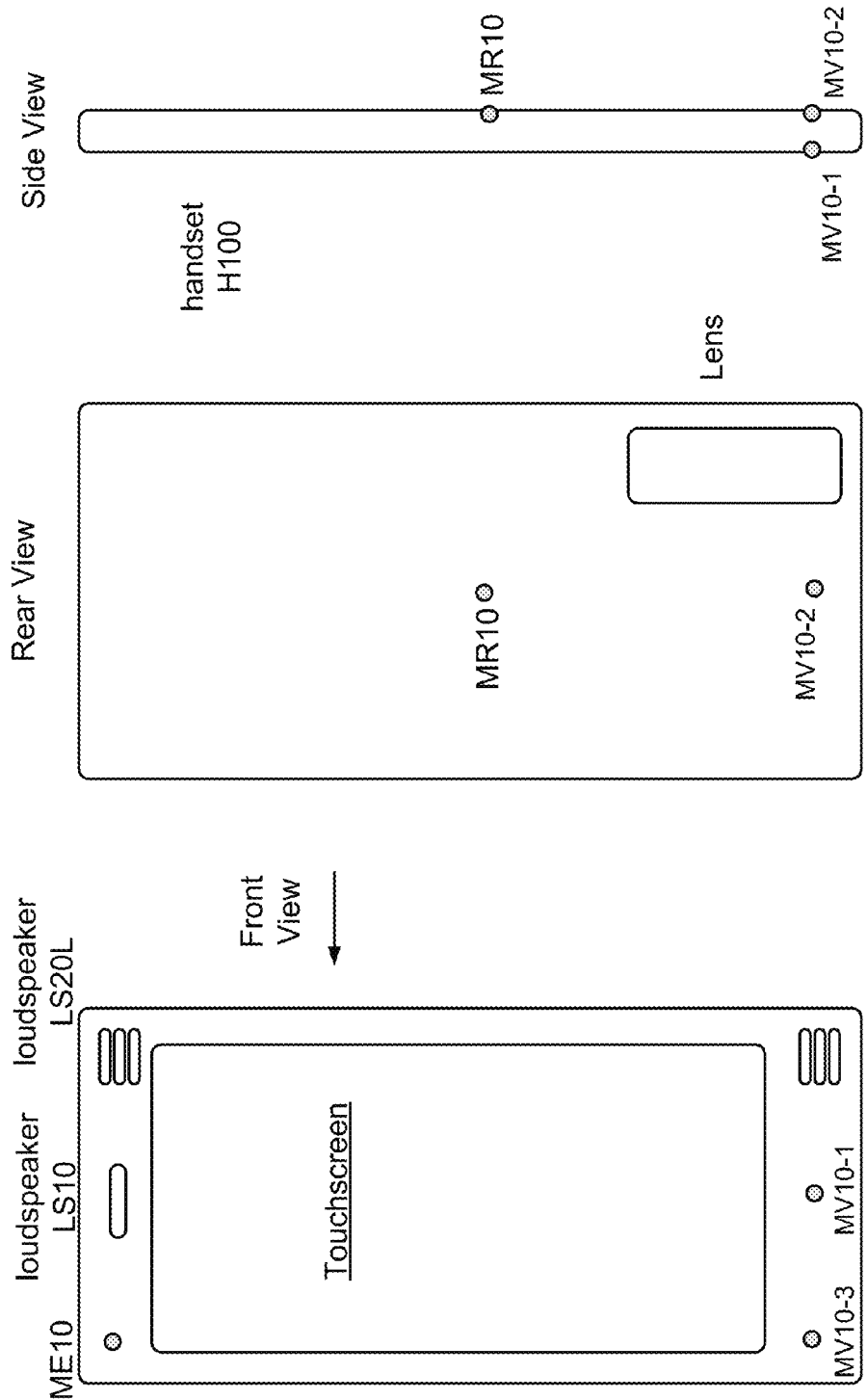
FIG. 1 shows multiple views of a multi-microphone handset H100.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample (or "bin") of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

It may be assumed that in the near-field and far-field regions of an emitted sound field, the wavefronts are spherical and planar, respectively. The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

In addition to a handset as shown in FIG. 1 or other handheld communications device, other examples of audio sensing devices that may be implemented to include a multi-microphone array (or to receive audio input from such an array) and to perform a method as described herein include desktop computers, portable computing devices (e.g., laptop computers, notebook computers, netbook computers, ultraportable computers, tablet computers, mobile Internet devices, smartbooks, smartphones, etc.), audio recorders, video cameras, audio- or video-conferencing devices, set-top boxes, gaming systems, digital media receivers (e.g., streaming players), media playback devices, and display screens (e.g., computer monitors, television sets).

A device having multiple microphones for audio sensing may be configured to estimate the direction of arrival (DOA) of a source signal by measuring a difference between a pair of microphone channels for each of one or more frequency components to obtain a corresponding indication of direction of arrival relative to an axis of the corresponding pair of microphones. The device may be, for example, a device for voice communications, such as the portable device shown in FIG. 1. The source signal may be, for example, speech of a user. The difference between the pair of channels may be, for example, a difference of phase or of time of arrival. For a case in which such direction indications are obtained for each of two or more frequency components, such a technique may include combining the direction indications (e.g., averaging the direction indications to determine whether the estimated direction is consistent over all of these frequency components) to obtain a DOA estimate for the signal.

Such a DOA estimate may be useful for a range of applications as noted herein, including spatially selective filtering and displaying and/or tracking the direction of a moving source (relative to an axis of the microphones) over time. For example, the estimated DOA may be used to display the current direction of the source relative to the device and/or to configure a spatially selective filtering operation to enhance the source signal and/or attenuate sounds arriving from other directions (or to attenuate the source signal if desired). It may be desirable to continue such estimation over time to track changes in the direction of arrival that may result from movement of the source and/or of the microphone array relative to the other. Such continued estimation may be used, for example, to update a visualization of current source direction and/or to update a spatially selective filtering operation.

The range of frequency components that are available for time- or phase-difference-based direction estimation is typically constrained by the spatial aliasing frequency for the microphone pair. This frequency, which may be defined as the frequency at which the wavelength of the signal is twice the distance d between the microphones, typically imposes an upper limit on the range of useful frequency components. Additionally, such a difference-based approach may not support accurate estimation of source DOA beyond one meter and typically supports only a low DOA resolution. Such an approach also typically uses only one fixed pair for tracking. In this case, dependence on a front-back microphone pair to resolve ambiguity between speech from the user and sound from another direction (e.g., speech from another person) may impose a significant constraint on the microphone placement geometry, as placing the device on a surface (e.g., a tabletop) may effectively occlude the front or back microphone.

It is a challenge to provide a method for estimating a direction of arrival (DOA) in two or three dimensions for each frame of an audio signal for concurrent multiple sound events that is sufficiently robust under background noise and reverberation. Robustness of such a method may be increased by maximizing the number of reliable frequency bins. It may be desirable for such a method to be suitable for arbitrarily shaped microphone array geometry, such that specific constraints on microphone placement may be avoided.

Figure 2:
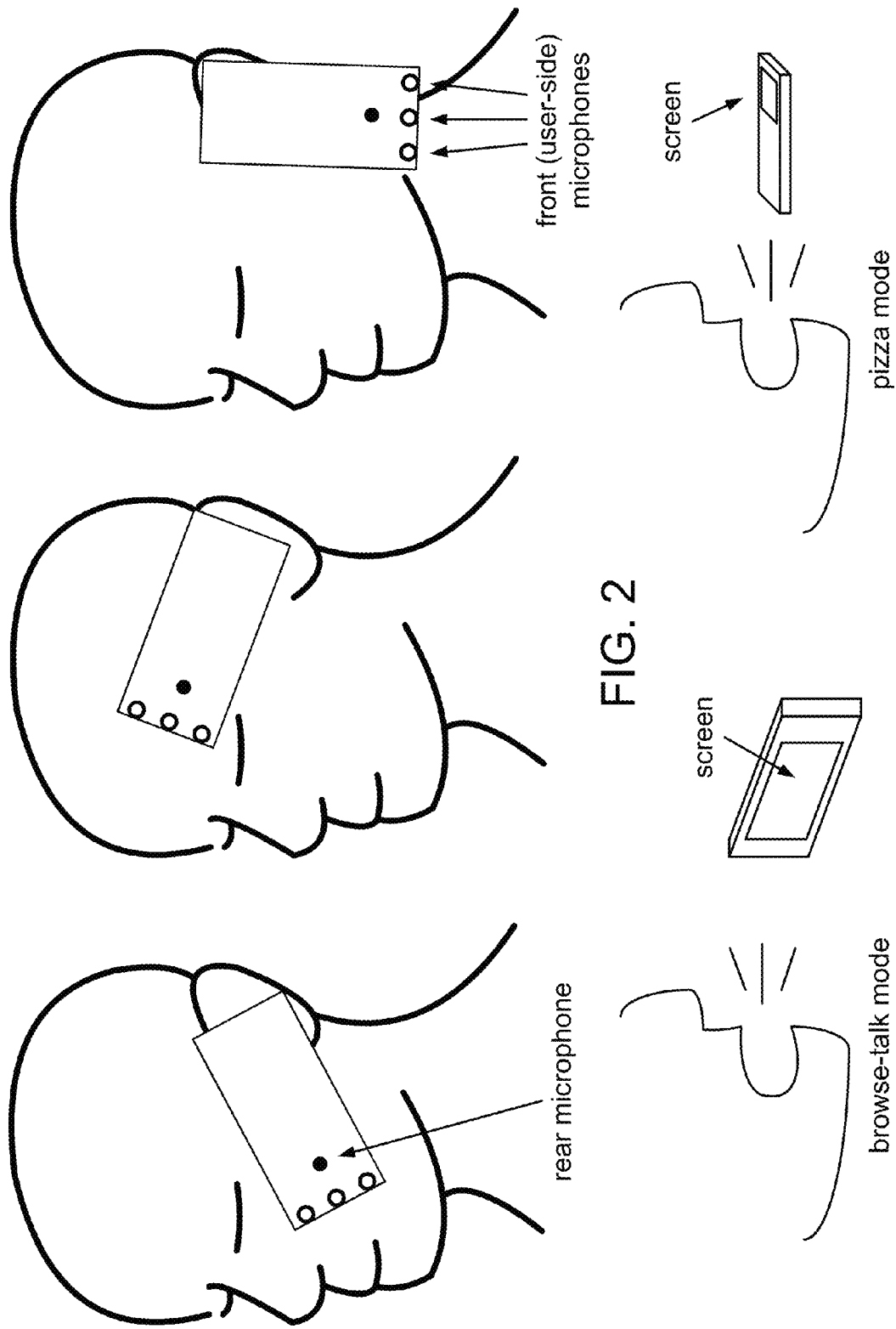
FIG. 2 shows examples of five different holding positions for a portable multi-microphone device.

During use of a multi-microphone device, the direction of arrival of a desired source signal relative to the device may change. For example, the device may be a smartphone (e.g., as shown in FIG. 1) that the user may hold in different positions during use (e.g., among any of the five examples shown in FIG. 2). It may be desirable to provide continuity in the operation of the device from one holding position to another such that a desired focus on the user's voice is maintained. In another example, the device may be used as a speakerphone. It may be desirable to provide a voice-tracking application (e.g., a user-tracking or generic speakerphone application) such that the multi-microphone device may be placed arbitrarily (e.g., on a table for a conference call, on a car seat, etc.), and/or moved arbitrarily during use, and still be able to track and/or enhance the voice of each of one or more individual speakers. It may be desirable for such an approach to be capable of dealing with an arbitrary target speaker position with respect to an arbitrary orientation of available microphones. It may also be desirable for such an approach to provide instantaneous multi-speaker tracking/separating capability. Unfortunately, the current state of the art is a single-microphone approach.

It may also be desirable to support source tracking in a far-field application, which may be used to provide solutions for tracking sources at large distances and unknown orientations with respect to the multi-microphone device. The multi-microphone device in such an application may include an array mounted on a television or set-top box, which may be used to support telephony. Examples include the loudspeaker array of a Kinect device (Microsoft Corp., Redmond, Wash.) and loudspeaker arrays from Skype (Microsoft Skype Division) and Samsung Electronics (Seoul, KR). In addition to the large source-to-device distance, such applications typically also suffer from a bad signal-to-interference+noise ratio (SINR) and room reverberation.

A solution as proposed herein may be implemented for one or more such applications (e.g., DOA estimation for source tracking, source visualization, spatially selective filtering, a generic speakerphone application, or a far-field application). Such an approach may be implemented to operate without a microphone placement constraint. For example, a pair-wise 1-D approach as described herein can be appropriately incorporated into any microphone array geometry. Such an approach may also be implemented to track sources using available frequency bins up to the Nyquist frequency (i.e., one-half of the sampling frequency) and down to a lower frequency (e.g., by supporting use of an additional microphone pair having a larger inter-microphone distance). Rather than being limited to a single pair of microphones for tracking, such an approach may be implemented to select a current best pair among all available pairs of microphones. Such an approach may be used to support source tracking even in a far-field scenario, up to a distance of three to five meters or more, and/or to provide a much higher DOA resolution. Other potential features include obtaining an accurate 2-D representation of an active source. For best results, it may be desirable that each source is a time-sparse broadband audio source, and that each frequency component (e.g., bin or subband) is mostly dominated by no more than one source.

Such multichannel processing is generally applicable, for example, to source tracking for speakerphone applications. Such a technique may be used to calculate a DOA estimate for a frame of the received multichannel signal. Such an approach may calculate, at each frequency bin, the error for each candidate angle with respect to the observed angle, which is indicated by the phase delay. The target angle at that frequency bin is the candidate having the minimum error. In one example, the error is then summed across the frequency bins to obtain a measure of likelihood for the candidate. In another example, one or more of the most frequently occurring target DOA candidates across all frequency bins is identified as the DOA estimate (or estimates) for a given frame.

FIG. 3A shows a flowchart for a method M10 according to a general configuration that includes tasks T10, T20, and T30. Task T10 calculates a difference between a pair of channels of a multichannel signal (e.g., in which each channel is based on a signal produced by a corresponding microphone). For each among a plurality of candidate directions, task T20 calculates a corresponding directional fitness measure (e.g., a directional error) that is based on the calculated difference. Based on the plurality of directional fitness measures, task T30 selects a candidate direction.

Method M10 may be configured to process the multichannel signal as a series of segments. Typical segment lengths range from about five or ten milliseconds to about forty or fifty milliseconds, and the segments may be overlapping (e.g., with adjacent segments overlapping by 25% or 50%) or non-overlapping. In one particular example, the multichannel signal is divided into a series of nonoverlapping segments or "frames", each having a length of ten milliseconds. In another particular example, each frame has a length of twenty milliseconds. A segment as processed by method M10 may also be a segment (i.e., a "subframe") of a larger segment as processed by a different operation, or vice versa.

Examples of differences between the channels include a gain difference or ratio, a time difference of arrival, and a phase difference. For example, task T10 may be implemented to calculate the difference between the channels of a pair as a difference or ratio between corresponding gain values of the channels (e.g., a difference in magnitude or energy). FIG. 3C shows such an implementation T12 of task T10.

Task T12 may be implemented to calculate measures of the gain of a segment of the multichannel signal in the time domain (e.g., for each of a plurality of subbands of the signal) or in a frequency domain (e.g., for each of a plurality of frequency components of the signal in a transform domain, such as a fast Fourier transform (FFT), discrete cosine transform (DCT), or modified DCT (MDCT) domain). Examples of such gain measures include, without limitation, the following: total magnitude (e.g., sum of absolute values of sample values), average magnitude (e.g., per sample), RMS amplitude, median magnitude, peak magnitude, peak energy, total energy (e.g., sum of squares of sample values), and average energy (e.g., per sample).

In order to obtain accurate results with a gain-difference technique, it may be desirable for the responses of the two microphone channels to be calibrated relative to each other. It may be desirable to apply a lowpass filter to the multichannel signal such that calculation of the gain measure is limited to an audio-frequency portion (e.g., a range of speech frequencies) of the multichannel signal. For example, such a lowpass filter may be implemented to have a cutoff frequency (e.g., the frequency at which the magnitude response drops to minus three decibels, or to minus twenty decibels) of 700 Hertz or of 1, 2, 5, 7, 8, 10, 12, or twenty kilohertz.

Task T12 may be implemented to calculate a difference between gains as a difference between corresponding gain measure values for each channel in a logarithmic domain (e.g., values in decibels) or, equivalently, as a ratio between the gain measure values in a linear domain. For a calibrated microphone pair, a gain difference of zero may be taken to indicate that the source is equidistant from each microphone (i.e., located in a broadside direction of the pair), a gain difference with a large positive value may be taken to indicate that the source is closer to one microphone (i.e., located in one endfire direction of the pair), and a gain difference with a large negative value may be taken to indicate that the source is closer to the other microphone (i.e., located in the other endfire direction of the pair).

In another example, task T10 is implemented to perform a cross-correlation on the channels to determine the difference. Such an implementation of task T10 may be configured to calculate a time-difference-of-arrival based on a lag between channels of the multichannel signal.

In a further example, task T10 is implemented to calculate the difference between the channels of a pair as a difference between the phase of each channel (e.g., at a particular frequency component of the signal). FIG. 3D shows such an implementation T14 of task T10. As discussed below, such calculation may be performed for each among a plurality of frequency components.

For a signal received by a pair of microphones directly from a point source in a particular direction of arrival (DOA) relative to the axis of the microphone pair, the phase difference (also called "phase delay") differs for each frequency component and also depends on the spacing between the microphones. The observed value of the phase delay at a particular frequency component (e.g., frequency bin) may be calculated as the inverse tangent (also called the arctangent) of the ratio of the imaginary term of the complex FFT coefficient to the real term of the complex FFT coefficient. (If a real-valued transform such as the DCT or MDCT is used, it may be desirable to pair such transform with a discrete sine transform (e.g., as in a complex lapped transform or modified complex lapped transform) to obtain the phase information.)

As shown in FIG. 3B, the phase delay value $\Delta\phi_f$ at a particular frequency f may be related to source DOA under a far-field (i.e., plane-wave) assumption as $\Delta\phi_f = 2\pi f\, d \sin\theta/c$, where d denotes the distance between the microphones (in m), $\theta$ denotes the angle of arrival (in radians) relative to a direction that is orthogonal to the array axis, f denotes frequency (in Hz), and c denotes the speed of sound (in m/s). For the ideal case of a single point source with no reverberation, the ratio of phase delay to frequency $\Delta\phi/f$ will have the same value $2\pi d \sin\theta/c$ over all frequencies. As discussed in more detail below, the DOA $\theta$ relative to a microphone pair is a one-dimensional measurement that defines the surface of a cone in space (e.g., such that the axis of the cone is the axis of the array). An implementation of method M10 in which task T10 is implemented to calculate a phase delay will typically be more robust to a mismatch between the gain responses of the microphones of the pair than a similar implementation of method M10 in which task T10 is implemented to calculate a gain difference.

Such an approach is typically limited in practice by the spatial aliasing frequency for the microphone pair, which may be defined as the frequency at which the wavelength of the signal is twice the distance d between the microphones. Spatial aliasing causes phase wrapping, which typically puts an upper limit on the range of frequencies that may be used to provide reliable phase delay measurements for a particular microphone pair.

FIG. 4A shows plots of actual phase delay vs. frequency for four signals, each arriving from a different DOA, where the plot for each signal is indicated by a corresponding line pattern. FIG. 4B shows plots of observed phase delay vs. frequency for the same four signals (indicated by the same line patterns), where the initial portion of each plot (i.e., until the first phase wrapping occurs) are shown in bold. Attempts to extend the useful frequency range of phase delay measurement by unwrapping the measured phase (e.g., to unwrap the observations shown in FIG. 4B to recreate a plot as shown in FIG. 4A) are typically unreliable, especially in the presence of noise.

Task T20 may be implemented to calculate the directional fitness measure (e.g., directional error) in terms of, for example, gain difference, phase difference, or time-difference-of-arrival (e.g., depending on the corresponding implementation of task T10). For example, task T20 may be implemented to calculate the directional error in terms of phase difference at frequency f for each of an inventory of K DOA candidates, where $1 \le k \le K$ and $K \ge 2$. Such an implementation of task T20 may calculate the directional error for frequency f and DOA candidate k as a squared difference $e_{ph\_f\_k} = (\Delta\phi_{ob\_f} - \Delta\phi_{k\_f})^2$ (alternatively, as an absolute difference $e_{ph\_f\_k} = |\Delta\phi_{ob\_f} - \Delta\phi_{k\_f}|$), where $\Delta\phi_{ob\_f}$ denotes the observed phase difference at frequency f and $\Delta\phi_{k\_f}$ denotes the phase difference that corresponds to the DOA candidate $\theta_k$ at frequency f.

The phase delay values $\Delta\phi_{k\_f}$ for each DOA candidate $\theta_k$ may be calculated before run-time (e.g., during design or manufacture), according to known values of velocity c and distance d and the desired range of frequency components f, and retrieved from storage during execution of method M10 (e.g., during use of the device). Such a pre-calculated inventory may be configured to support a desired angular range and resolution (e.g., a uniform resolution, such as one, two, five, six, ten, or twelve degrees; or a desired nonuniform resolution) and a desired frequency range and resolution (which may also be uniform or nonuniform).

Figure 5A:
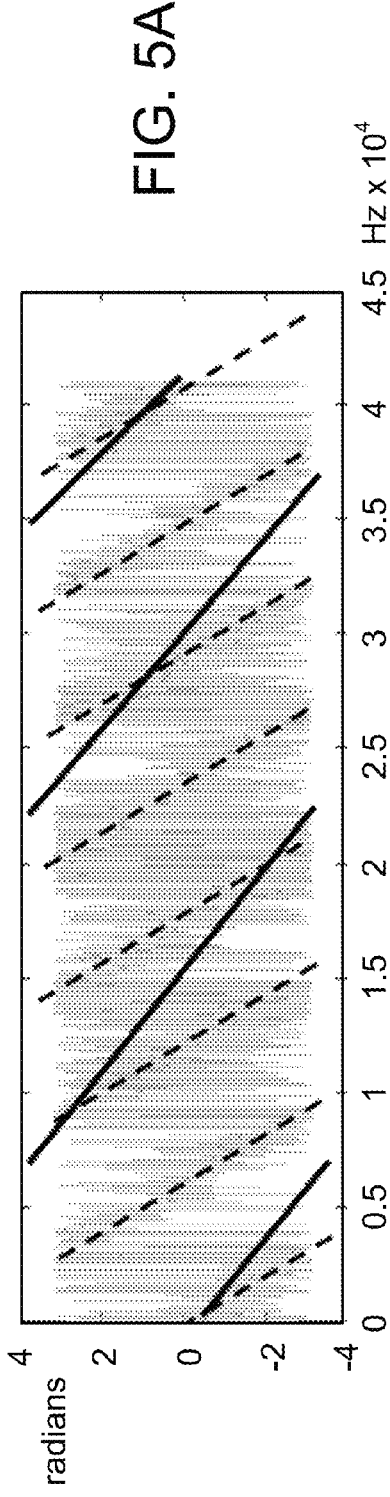
FIG. 5A shows an example of measured phase delay values and calculated values for two DOA candidates.

It may be desirable to extend the range of useful frequency components by using phase difference measurements from components having frequencies above the spatial aliasing frequency. As noted above, however, phase unwrapping techniques may become unreliable in the presence of noise. Instead of phase unwrapping, task T20 may be implemented according to an alternate approach that compares the phase delay as measured (e.g., wrapped) with pre-calculated values of wrapped phase delay for each of an inventory of DOA candidates. FIG. 5A shows such an example that includes angle-vs.-frequency plots of the (noisy) measured phase delay values (gray) and the phase delay values for two DOA candidates of the inventory (solid and dashed lines), where phase is wrapped to the range of pi to minus pi. The DOA candidate that is best matched to the signal as observed may then be determined by calculating a corresponding directional error for each DOA candidate $\theta_i$ and identifying the DOA candidate value that corresponds to the minimum among these directional errors. Such a directional error may be calculated, for example, as an error $e_{ph\_k}$ between the phase delay values $\Delta\phi_{k\_f}$ for the k-th DOA candidate and the observed phase delay values $\Delta\phi_{ob\_f}$. In one example, the directional error $e_{ph\_k}$ is expressed as $\|\Delta\phi_{ob\_f} - \Delta\phi_{k\_f}\|_f^2$ over a desired range or other set F of frequency components, i.e. as the sum over set F $$e_{ph\_k} = \sum_{f \in F} (\Delta\varphi_{ob\_f} - \Delta\varphi_{k\_f})^2$$

of the squared differences between the observed and candidate phase delay values.

It may be desirable to calculate the directional error (e.g., $e_{ph\_f\_k}$, $e_{ph\_k}$) across as many frequency bins as possible to increase robustness against noise. For example, it may be desirable for the error calculation to include terms from frequency bins that are beyond the spatial aliasing frequency. In a practical application, the maximum frequency bin may be limited by other factors, which may include available memory, computational complexity, strong reflection by a rigid body (e.g., an object in the environment, a housing of the device) at high frequencies, etc.

A speech signal is typically sparse in the time-frequency domain. If two or more sources are disjoint in the frequency domain, then method M20 may be implemented to track more than one of these sources at the same time. If two or more sources are disjoint in the time domain, then method M10 may be implemented to track more than one of these sources at the same frequency.

The error may also be considered as a variance (i.e., the degree to which the individual errors (the observed phase delays) deviate from an expected value (the candidate phase delay)). Conversion of the time-domain received signal into the frequency domain (e.g., by applying an FFT) has the effect of averaging the spectrum in each bin. This averaging is even more apparent if a subband representation is used (e.g., mel scale or Bark scale). Additionally, it may be desirable to perform time-domain smoothing on the DOA estimates (e.g., by applying a recursive smoother, such as a first-order infinite-impulse-response filter).

Even for the ideal case of a point source and no reverberation, such that all of the frequency components of the source signal arrive from the same direction, the difference between the observed phase delay for the signal and the calculated phase delay for a particular DOA candidate will be greater for high-frequency components than for low-frequency components. In other words, the value of a directional fitness measure (e.g., a directional error) that is expressed in terms of time or phase delay (e.g., $e_{ph\_f\_k}$) will vary with frequency even if the actual error in DOA remains the same. For such reasons, it may be desirable to implement task T20 to calculate the directional fitness measure in terms of DOA (e.g., to indicate a value of a measure that is based on a difference between spatial angles) rather than in terms of time or phase delay.

An expression of directional error in terms of DOA may be derived by expressing wrapped phase delay at frequency f (e.g., the observed phase delay $\Delta\phi_{ob\_f}$) as a function $\Psi_{f\_wr}$ of the DOA θ of the signal. The DOA may be used to express such a function as, for example, $$\Psi_{f\_wr}(\theta) = \mod\left(-2\pi f \frac{d\sin\theta}{c} + \pi, 2\pi\right) - \pi.$$

We can assume that this expression is equivalent to a corresponding expression for unwrapped phase delay as a function of DOA, such as $$\Psi_{f\_un}(\theta) = -2\pi f \frac{d\sin\theta}{c},$$

except near discontinuities that are due to phase wrapping. The directional error $e_{ph\_f\_k}$ may then be expressed in terms of observed DOA $\theta_{ob}$ and candidate DOA $\theta_k$ as $$e_{ph\_f\_k} = |\Psi_{f\_wr}(\theta_{ob}) - \Psi_{f\_wr}(\theta_k)| \equiv |\Psi_{f\_un}(\theta_{ob}) - \Psi_{f\_un}(\theta_k)|$$

or as $$e_{ph\_f\_k} = (\Psi_{f\_wr}(\theta_{ob}) - \Psi_{fwr}(\theta_k))^2 \equiv (\Psi_{f\_un}(\theta_{ob}) - \Psi_{f\_un}(\theta_k))^2,$$

where the difference between the observed and candidate phase delay at frequency f is expressed in terms of observed DOA at frequency f $\theta_{ob\_f}$ and candidate DOA $\theta_k$ as $$\Psi_{f\_un}(\theta_{ob}) - \Psi_{f\_un}(\theta_k) = \frac{-2\pi f d}{c}(\sin\theta_{ob\_f} - \sin\theta_k).$$

A directional error $e_{ph\_k}$ across F may then be expressed in terms of observed DOA $\theta_{ob}$ and candidate DOA $\theta_k$ as $$e_{ph\_k} = \|\Psi_{f\_wr}(\theta_{ob}) - \Psi_{f\_wr}(\theta_k)\|_f^2 \equiv \|\Psi_{f\_un}(\theta_{ob}) - \Psi_{f\_un}(\theta_k)\|_f^2.$$

We can perform a Taylor series expansion on this result to obtain the following first-order approximation:

$$\frac{-2\pi f d}{c}(\sin\theta_{ob\_f} - \sin\theta_k) \approx (\theta_{ob\_f} - \theta_k)\frac{-2\pi f d}{c}\cos\theta_k.$$

This approximation may then be used to obtain an expression of the difference between the DOA $\theta_{ob\_f}$ as observed at frequency f and DOA candidate $\theta_k$:

$$(\theta_{ob\_f} - \theta_k) \cong \frac{\Psi_{f\_un}(\theta_{ob}) - \Psi_{f\_un}(\theta_k)}{\frac{2\pi f d}{c}\cos\theta_k}.$$

This expression may be used (e.g., in task T20), with the assumed equivalence of observed wrapped phase delay to unwrapped phase delay, to express the directional error in terms of DOA ($e_{DOA\_f\_k}, e_{DOA\_k}$) rather than phase delay ($e_{ph\_f\_k}, e_{ph\_k}$):

$$e_{DOA\_f\_k} = (\theta_{ob} - \theta_k)^2 \cong \frac{(\Psi_{f\_wr}(\theta_{ob}) - \Psi_{f\_wr}(\theta_k))^2}{\left(\frac{2\pi f d}{c}\cos\theta_k\right)^2},$$

$$e_{DOA\_k} = \|\theta_{ob} - \theta_k\|_k^2 \cong \frac{\|\Psi_{f\_wr}(\theta_{ob}) - \Psi_{f\_wr}(\theta_k)\|_f^2}{\left\|\frac{2\pi f d}{c}\cos\theta_k\right\|_f^2},$$

where the values of $[\Psi_{f\_wr}(\theta_{ob}), \Psi_{f\_wr}(\theta_k)]$ are defined as $[\Delta\phi_{ob\_f}, \Delta\phi_{k\_f}]$.

To avoid division with zero at the endfire directions (θ=+/−90°), it may be desirable to implement task T20 to perform such an expansion using a second-order approximation instead of a first-order approximation, as in the following:

$$|\theta_{ob} - \theta_k| \cong \begin{cases} |-C/B|, & \theta_i = 0\text{(broadside)} \\ \left|\frac{-B + \sqrt{B^2 - 4AC}}{2A}\right|, & \text{otherwise,} \end{cases}$$

where $A = (\pi f d \sin\theta_k)/c$, $B = (-2\pi f d\cos\theta_k)/c$, and $C = -(\Psi_{f\_un}(\theta_{ob}) - \Psi_{f\_un}(\theta_k))$.

Figure 5B:
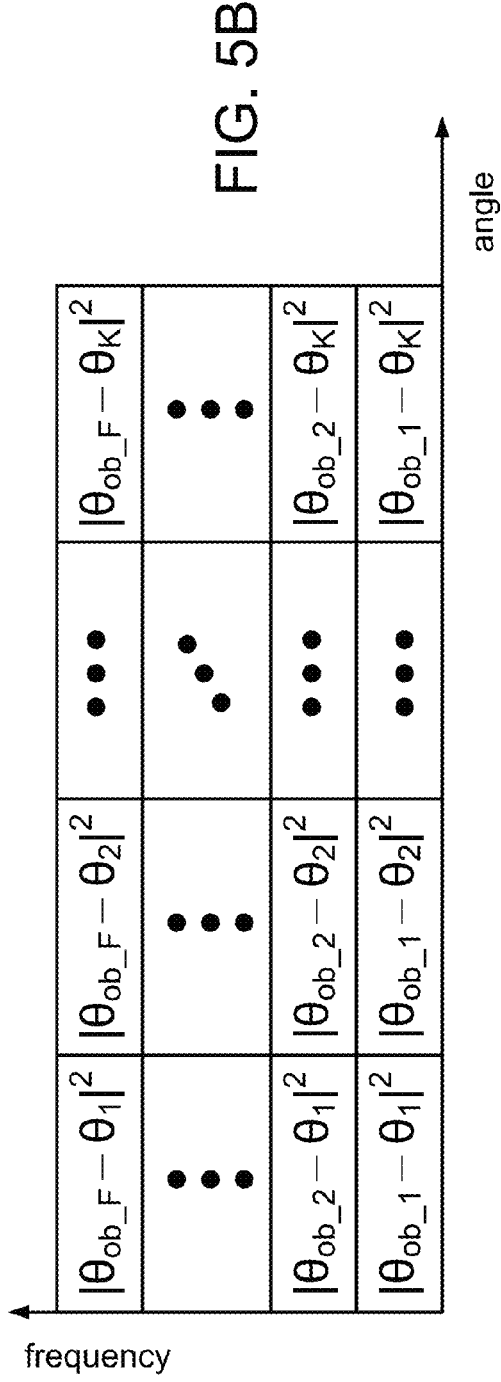
FIG. 5B shows an example of calculating DOA differences for a frame.

As in the first-order example above, this expression may be used (e.g., in task T20), with the assumed equivalence of observed wrapped phase delay to unwrapped phase delay and using the candidate DOA $\theta_k$, to express the directional error in terms of DOA (e.g., as an estimate of a value of a measure that is based on a difference between angular directions, such as a squared difference between angular directions) as a function of the observed and candidate wrapped phase delay values. FIG. 5B shows an example in which, at each of a plurality of frequencies f of the received multichannel signal (e.g., ∀f ∈ F) and for each of a plurality of DOA candidates $\theta_k$ (e.g., ∀k ∈ K), task T20 calculates a directional error that indicates such a value related to a difference between observed and candidate DOA for a given frame of the received signal.

Based on the directional fitness measures, task T30 selects a candidate direction for the frequency component. For example, task T30 may be implemented to select the candidate direction associated with the lowest (i.e., the minimum) among the plurality of directional errors produced by task T20. In another example, task T30 is implemented to calculate, for each of the plurality of directional errors, a corresponding likelihood, and to select the candidate direction associated with the highest likelihood.

FIG. 6A shows one example of a decision space that may be populated as desired with directional errors for different tuples of candidate angle k, frequency f, and frame i as calculated by instances of implementations of task T20. It may be desirable to implement task T30 to indicate a likelihood of source activity in terms of such a calculated DOA difference or error. One example of such a directional likelihood L may be expressed, for a particular frame i, frequency f, and angle k, as $$L(i, f, k) = \frac{1}{|\theta_{ob} - \theta_k|_{f,i}^2}. \tag{1}$$

Task T20 may be implemented to calculate each of the plurality of directional fitness measures as such a likelihood.

For example, task T20 may be implemented to calculate a likelihood as shown in expression (1) according to a first-order Taylor approximation as described above:

$$L(i, f, k) = \frac{1}{\|\theta_{ob} - \theta_k\|_{f,i}^2} \cong \frac{\left\|\frac{2\pi f d}{c}\cos\theta_k\right\|_f^2}{\|\Psi_{fwr}(\theta_{ob}) - \Psi_{fwr}(\theta_k)\|_f^2}.$$

Similarly, task T20 may be implemented to calculate a likelihood as shown in expression (1) according to a second-order Taylor approximation as described above.

In some cases, it may be desirable to calculate, for a frame i and for each of a plurality of candidate angles k, the sum of likelihoods L across multiple frequencies f, and to select the candidate angle having the largest sum of likelihoods. For expression (1), an extremely good match at a particular frequency may cause a corresponding likelihood to dominate the likelihoods at all other frequencies, even if they all indicate that another candidate angle k is most likely. To reduce this susceptibility, it may be desirable to include a regularization term λ, as in the following expression:

$$L(i, f, k) = \frac{1}{|\theta_{ob} - \theta_k|_{f,i}^2 + \lambda}. \quad (2)$$

Figure 7:
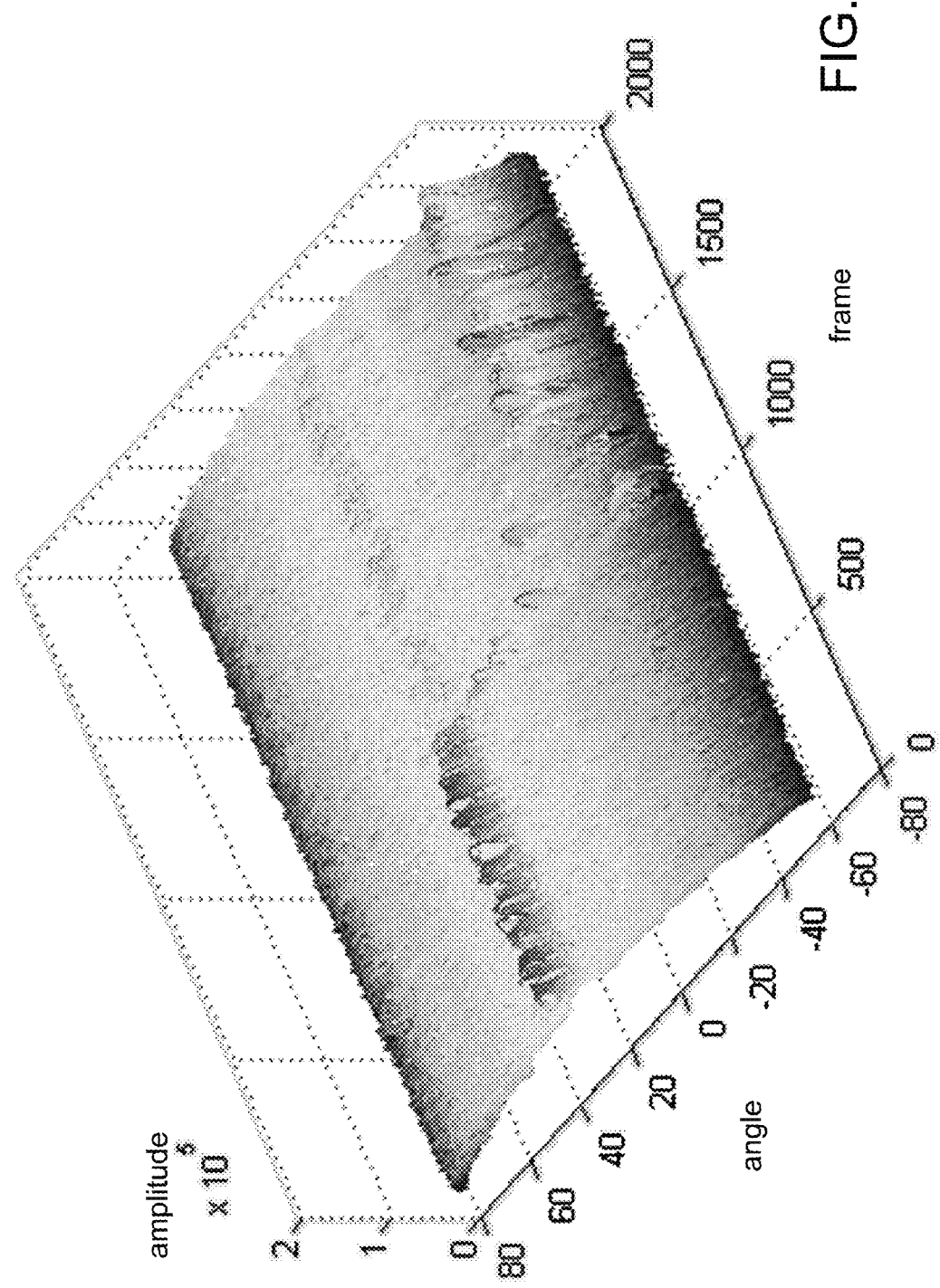
FIGS. 7 and 8 show an example of bias removal.
Figure 8:
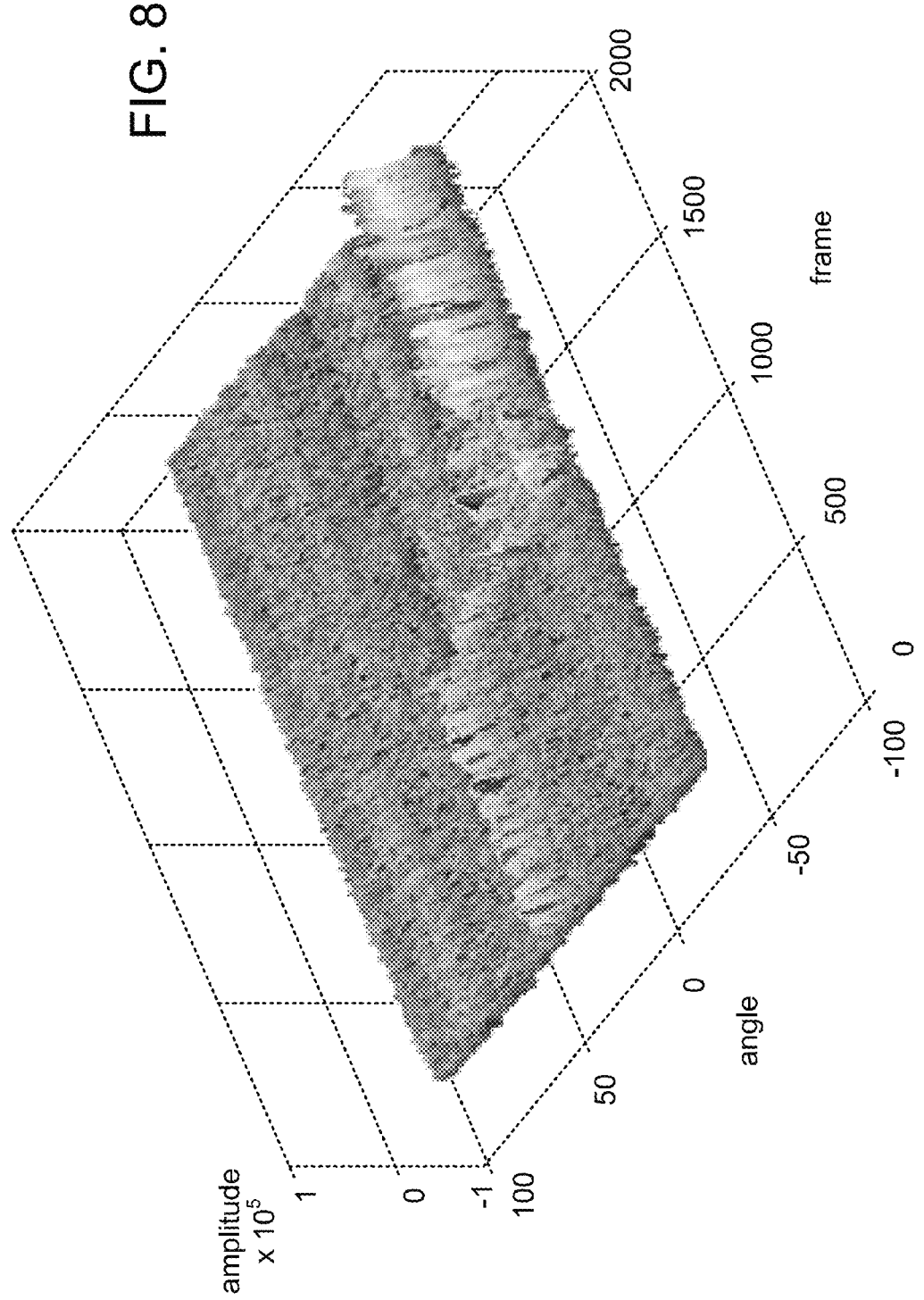

The frequency-specific likelihood results may be projected onto a (frame, angle) plane (e.g., as shown in FIGS. 7 and 8) to obtain a DOA estimation per frame $\theta_{est\_i}=\theta_{kmax\_i}$ [where kmax_i=argmax$_k$ $\Sigma_{f\in F}$L(i,f,k)] that is robust to noise and reverberation because only target-dominant frequency bins contribute to the estimate. In this summation, terms in which the error is large have likelihood values that approach zero and thus become less significant to the estimate. If a directional source is dominant in some frequency bins, the error value at those frequency bins will be nearer to zero for the candidate angle that corresponds to the source. Also, if another directional source is dominant in other frequency bins, the error value at the other frequency bins will be nearer to zero for the candidate angle which corresponds to that source.

Speech tends to be sparse in both time and frequency, such that a sum over a set of frequencies F may include results from bins that are dominated by noise. It may be desirable to include a bias term β, as in the following expression:

$$L(i, f, k) = \frac{1}{|\theta_{ob} - \theta_k|_{f,i}^2 + \lambda} - \beta. \quad (3)$$

The bias term, which may vary over frequency and/or time, may be based on an assumed distribution of the noise (e.g., Gaussian). Additionally or alternatively, the bias term may be based on an initial estimate of the noise (e.g., from a noise-only initial frame). Additionally or alternatively, the bias term may be updated dynamically based on information from noise-only frames, as indicated, for example, by a voice activity detection module. FIGS. 7 and 8 show examples of plots of likelihood (for a range of candidate angles from +90 to −90 degrees and a sequence of 2000 consecutive frames) before and after bias removal, respectively.

Figure 9:
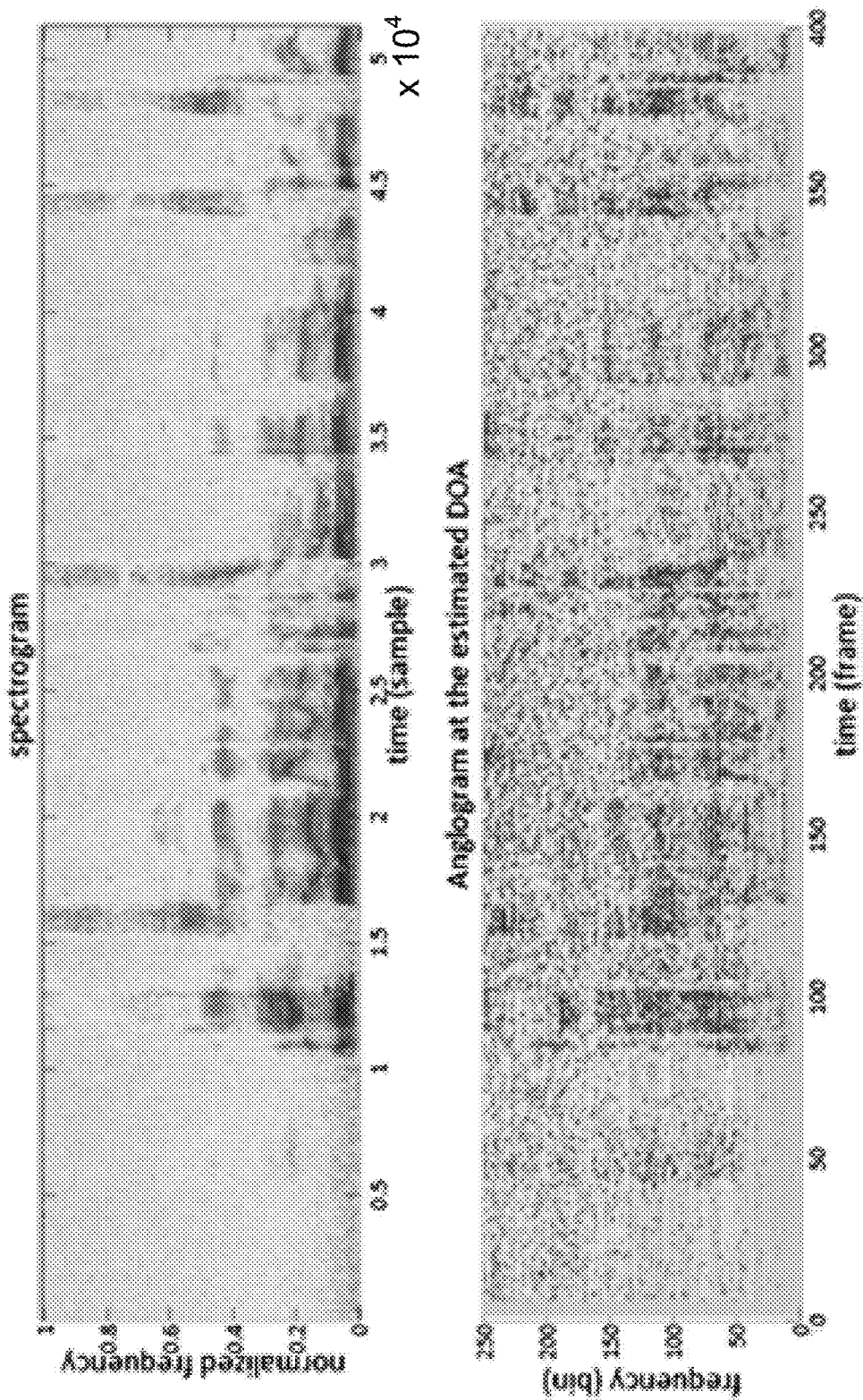
FIG. 9 shows an example of an anglogram that plots source activity likelihood at the estimated DOA over frame and frequency.

The likelihood results may also be projected onto a (frame, frequency) plane as shown in the bottom panel of FIG. 9 to indicate likelihood information per frequency bin, based on directional membership (e.g., for voice activity detection). This panel shows, for each frequency f and frame i, the corresponding likelihood for the estimated DOA (e.g., L (i, f, kmax_i)). This likelihood may be used to indicate likelihood of speech activity. Additionally or alternatively, such information may be used, for example, to support time- and/or frequency-selective masking of the received signal by classifying frames and/or frequency components according to their directions of arrival.

An anglogram representation, as shown in the bottom panel of FIG. 9, is similar to a spectrogram representation. As shown in the top panel of FIG. 9, a spectrogram may be obtained by plotting, at each frame, the magnitude of each frequency component. An anglogram may be obtained by plotting, at each frame, a likelihood of the current DOA candidate at each frequency.

Tasks T20 and T30 may be iterated as a decision tree to provide an increased degree of directional resolution at a reduced computational cost. In an initial phase of such an implementation, task T20 calculates directional fitness measures (e.g., directional errors or likelihoods) for each of a reduced set of the K candidate directions. The reduced set may be uniformly distributed with respect to direction (e.g., as shown in FIG. 6B). Alternatively, the reduced set may be concentrated more toward the endfire directions of the microphone pair, at which directional accuracy is typically higher, than toward the broadside direction, where the ability to reliably discriminate among nearby directions is typically reduced. Task T30 then selects one of the reduced set of candidate directions according to the directional fitness measures calculated in the initial phase (e.g., as indicated by the bold ray at −30 degrees in FIG. 6B), such as the candidate direction that corresponds to the minimum directional error and/or the maximum likelihood.

In a subsequent phase of the implementation, task T20 calculates directional fitness measures for one or more candidate directions (e.g., as indicated by the solid rays at −15 and −45 degrees in FIG. 6C) that are within a limited span of the selected candidate direction (indicated by the bold dotted ray at −30 degrees in FIG. 6C). Task T30 then selects one of the candidate directions within the limited span according to the directional fitness measures calculated in the subsequent phase, such as the candidate direction that corresponds to the minimum directional error and/or the maximum likelihood (e.g., as indicated by the bold solid ray at −45 degrees in FIG. 6C).

If desired, further iterations of tasks T20 and T30 may be performed to achieve higher resolution. For example, FIG. 6C shows a further iteration in which task T20 calculates directional fitness measures for one or more candidate directions (e.g., as indicated by the solid rays at −35 and −40 degrees in FIG. 6D) that are between the candidate directions selected in the previous two iterations (indicated by the bold dotted rays at −30 and −45 degrees in FIG. 6D) and task T30 then selects one of these intermediate candidate directions according to the corresponding directional fitness measures (e.g., as indicated by the bold solid ray at −35 degrees in FIG. 6D).

FIG. 10A shows a flowchart for an implementation M20 of method M10 that includes tasks T100, T200, and T300. Such a method may be used, for example, to select a candidate direction of arrival of a source signal, based on information from a pair of channels of a multichannel signal, for each of a plurality of frequency components of the multichannel signal (e.g., set F or a subset thereof, as described herein). For each among the plurality of frequency components, task T100 calculates a difference between the pair of channels. Task T100 may be implemented, for example, to perform a corresponding instance of task T10 (e.g., task T12 or T14) for each among the plurality of frequency components.

For each among the plurality of frequency components, task T200 calculates a plurality of directional fitness measures. For example, task T200 may be implemented to perform a corresponding instance of task T20 for each among the plurality of frequency components. Task T200 may be implemented to calculate the same number (e.g., K) of directional fitness measures for each frequency component. Alternatively, task T200 may be implemented to calculate a different number of directional fitness measures for each of two or more among the frequency components.

For each among the plurality of frequency components, task T300 selects a candidate direction. Task T300 may be implemented to perform a corresponding instance of task T30 for each among the plurality of frequency components. For example, task T300 may be implemented to indicate the candidate direction that corresponds to the minimum directional error (or maximum likelihood) for each frequency component, as illustrated in FIG. 10C. A DOA estimate for the frame may then be determined as the most frequently indicated candidate direction across all of the frequency components. It is expressly noted that for each of the plurality of frequency components, tasks T200 and T300 may be implemented to iterate as a decision tree as described herein over the inventory of candidate directions.

FIG. 10B shows a flowchart for an implementation MA20 of method M10 that includes tasks T100, T200, and TA300. Based on the pluralities of directional errors calculated in task T200, task TA300 selects a candidate direction. For example, task TA300 may be implemented to calculate, for each candidate direction, a corresponding sum of the likelihoods (e.g., over all of the frequency components as illustrated in FIG. 10D) and to select the candidate direction having the greatest sum of likelihoods. In another example, task TA300 is implemented to calculate, for each candidate direction, an average (e.g., median or mode) of the directional errors (alternatively, of the likelihoods) over the frequency components as illustrated in FIG. 10D and to select the candidate direction having the minimum average directional error (alternatively, the maximum average likelihood).

The energy spectrum of voiced speech (e.g., vowel sounds) tends to have local peaks at harmonics of the pitch frequency. The energy spectrum of background noise, on the other hand, tends to be relatively unstructured. Consequently, components of the input channels at harmonics of the pitch frequency may be expected to have a higher signal-to-noise ratio (SNR) than other components. It may be desirable to configure method M20 such that the plurality of frequency components (e.g., set F) is limited to frequency components which correspond to harmonics (e.g., integer multiples) of an estimated pitch frequency.

Typical pitch frequencies range from about 70 to 100 Hz for a male speaker to about 150 to 200 Hz for a female speaker. The current pitch frequency may be estimated by calculating the pitch period as the distance between adjacent pitch peaks (e.g., in a primary microphone channel). A sample of an input channel may be identified as a pitch peak based on a measure of its energy (e.g., based on a ratio between sample energy and frame average energy) and/or a measure of how well a neighborhood of the sample is correlated with a similar neighborhood of a known pitch peak. A pitch estimation procedure is described, for example, in section 4.6.3 (pp. 4-44 to 4-49) of EVRC (Enhanced Variable Rate Codec) document C.S0014-C, available online at www-dot-3gpp-dot-org. A current estimate of the pitch frequency (e.g., in the form of an estimate of the pitch period or "pitch lag") will typically already be available in applications that include speech encoding and/or decoding (e.g., voice communications using codecs that include pitch estimation, such as code-excited linear prediction (CELP) and prototype waveform interpolation (PWI)).

It may be desirable, for example, to configure task T100 such that at least twenty-five, fifty, or seventy-five percent of the calculated channel differences (e.g., phase differences) correspond to multiples of an estimated pitch frequency. The other tasks of such an implementation of method M20 may be similarly tailored to a set F of harmonic frequencies, and the same principle may be applied to harmonic non-speech source signals as well. For a case in which the harmonics of different source signals are mostly disjoint (e.g., at least 50, 60, or 75 percent of the set of harmonic frequency components for each source is unique to that source), such an implementation of method M20 may be configured to select a corresponding candidate direction for each source. In a related implementation of method M20, task T100 is implemented to calculate phase differences for each of the frequency components of at least a subband of the channel pair, and task T200 is implemented to calculate directional fitness measures based on only those phase differences which correspond to multiples of an estimated pitch frequency.

Figure 11C:
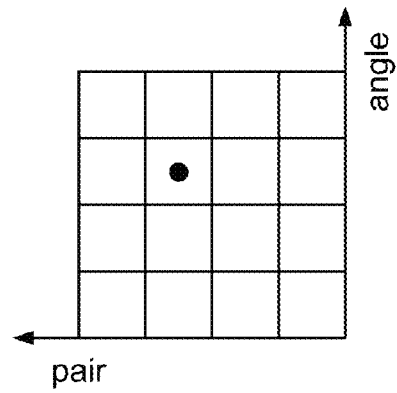
FIG. 11C shows an example of using calculated likelihoods to identify a best microphone pair and best DOA candidate for a given frequency.
Figure 11B:
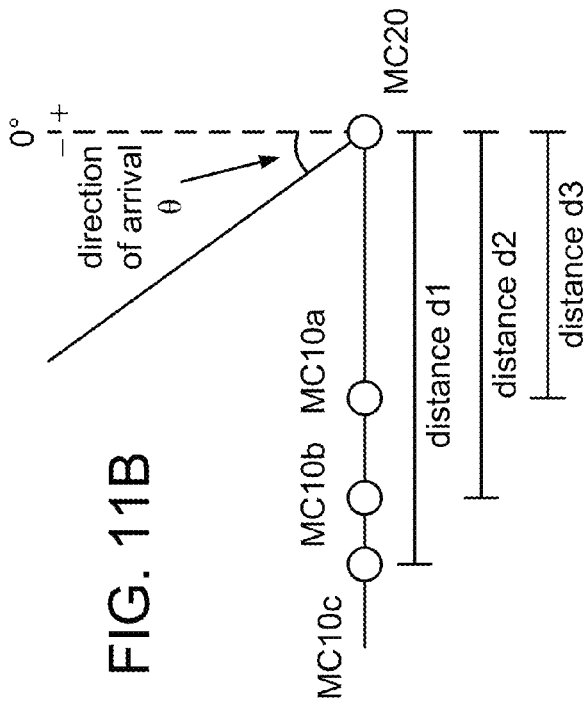
FIG. 11B shows multiple microphone pairs in a linear array.
Figure 11A:
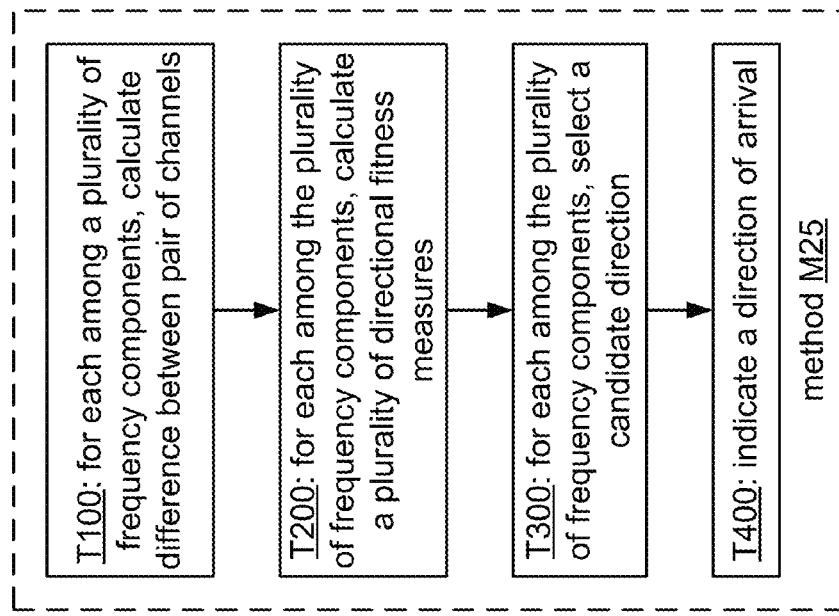
FIG. 11A shows a flowchart for an implementation M25 of method M20.

FIG. 11A shows a flowchart for an implementation M25 of method M20 that includes task T400. Such a method may be used, for example, to indicate a direction of arrival of a source signal, based on information from a pair of channels of a multichannel signal. Based on the candidate direction selections produced by task T300, task T400 indicates a direction of arrival. For example, task T400 may be implemented to indicate the most frequently selected among the candidate directions as the direction of arrival. For a case in which the source signals are mostly disjoint in frequency as described above, task T400 may be implemented to indicate more than one direction of arrival (e.g., to indicate a direction for each among more than one source). In such case, for example, task T400 may be implemented to indicate the two candidate directions most frequently selected by task T300. It may be desirable to configure such an implementation of task T400 to indicate such a direction only if the number of selections for the candidate meets or, alternatively, exceeds a threshold value (e.g., 25, 30, 35, or 40 percent of the total number of selections). Method M25 may be iterated over time to indicate one or more directions of arrival for each of a sequence of frames of the multichannel signal.

A microphone pair having a large spacing is typically not suitable for DOA estimation at high frequencies, because spatial aliasing begins at a relatively low frequency for such a pair. A DOA estimation approach as described herein, however, allows the use of phase delay measurements beyond the frequency at which phase wrapping begins, and even up to the Nyquist frequency (i.e., half of the sampling rate). By relaxing the spatial aliasing constraint, such an approach also enables the use of microphone pairs having larger inter-microphone spacings. As an array with a large inter-microphone distance typically provides better directivity at low frequencies than an array with a small inter-microphone distance, use of a larger array typically extends the range of useful phase delay measurements into lower frequencies as well.

The DOA estimation principles described herein may be extended to multiple microphone pairs in a linear array (e.g., as shown in FIG. 11B). One example of such an application for a far-field scenario is a linear array of microphones arranged along the margin of a television or other large-format video display screen (e.g., as shown in FIG. 12B). It may be desirable to configure such an array to have a nonuniform (e.g., logarithmic) spacing between microphones, as in the examples of FIGS. 11B and 12B, although arrays with uniformly spaced microphones can also be useful and are expressly contemplated.

For a far-field source, the multiple microphone pairs of a linear array may be expected to observe essentially the same DOA. Accordingly, one option is to perform a corresponding instance of an implementation of method M10 (e.g., method M20) for each of two or more microphone pairs of the array and to estimate the DOA as an average of these DOA estimates. However, an averaging scheme may be affected by mismatch of even a single one of the pairs, which may reduce DOA estimation accuracy. Alternatively, it may be desirable to select, from among two or more pairs of microphones of the array, the best microphone pair for each frequency (e.g., the pair that gives the minimum directional error or maximum likelihood at that frequency), such that different microphone pairs may be selected for different frequency bands. At the spatial aliasing frequency of a microphone pair, it may be expected that the corresponding directional error will be large (and that the corresponding directional likelihood will be small). Consequently, such an approach will tend to automatically avoid a microphone pair when the frequency is close to its wrapping frequency, thus reducing the related uncertainty in the DOA estimate. For higher-frequency bins, a pair having a shorter distance between the microphones will typically provide a better estimate and may be automatically favored, while for lower-frequency bins, a pair having a larger distance between the microphones will typically provide a better estimate and may be automatically favored. In the four-microphone example shown in FIG. 11B, six different pairs of microphones are possible $$\left(\text{i.e.,}\binom{4}{2}=6\right).$$

In one example, the best pair for each axis is selected by calculating, for each frequency f, P×K values, where P is the number of pairs, K is the size of the inventory, and each value $e_{pk}$ is the squared absolute difference between the observed angle $\theta_{pf}$ (for pair p and frequency f) and the candidate angle $\theta_k$. For each frequency f, the pair p that corresponds to the lowest error value $e_{pk}$ (or the highest likelihood value) is selected. This fitness value also indicates the best DOA candidate $\theta_k$ at frequency f (as shown in FIG. 11C).

FIG. 13A shows a flowchart for an implementation M30 of method M10 that includes tasks T150, T250, and T35. For each of a plurality of pairs of channels of the multichannel signal, task T150 performs an instance of task T10 as described herein to calculate a difference between the pair (e.g., a phase difference). For each among the plurality of pairs of channels, task T250 performs a corresponding instance of task T20 as described herein to calculate a plurality of directional fitness measures. Task T250 may be implemented to calculate the same number of directional fitness measures (e.g., K) for each channel pair. Alternatively, task T250 may be implemented to calculate a different number of directional fitness measures for each of two or more of the channel pairs.

Method M30 also includes a task T35 which selects a candidate direction, based on the pluralities of directional fitness measures. For example, task T35 may be implemented to select the candidate direction that corresponds to the minimum among the directional errors (or the maximum likelihood). It is expressly noted that for each of the plurality of channel pairs, tasks T250 and T35 may be implemented to iterate as a decision tree over the inventory of candidate directions (e.g., as described below). Method M30 may be used, for example, to indicate a candidate direction for a frequency component of the multichannel signal (e.g., at a particular frame).

FIG. 13B shows a flowchart for an implementation M100 of methods M20 and M30 that includes tasks T170, T270, and T350. Task T170 is an implementation of tasks T100 and T150 that performs a corresponding instance of task T150 for each among a plurality of frequency components. Task T270 is an implementation of tasks T200 and T250 that performs a corresponding instance of task T250 for each among the plurality of frequency components. For example, task T270 may be implemented to calculate, for each of the frequency components, K directional fitness measures for each of P pairs, or a total of P×K directional fitness measures for each frequency component. For each among the plurality of frequency components, task T350 performs an instance of task T35 to select a corresponding candidate direction. It is expressly noted that for each of the plurality of frequency components, tasks T270 and T350 may be implemented to iterate as a decision tree over the inventory of candidate directions (e.g., as described below).

Method M100 may be used, for example, to select a candidate direction for each among a plurality of frequency components of the multichannel signal (e.g., at a particular frame). FIG. 13C shows a flowchart of an implementation M110 of method M100 that includes an instance of task T400 as described herein.

It may be desirable to reduce the computational complexity of the error calculation operation by using a search strategy (e.g., a binary tree or other decision tree) and/or by applying known information (e.g., DOA candidate selections from one or more previous frames). For an application in which instances of implementations of method M20 (e.g., method M25, M100, or M110) are performed on successive segments (e.g., frames) of the multichannel signal, it may be desirable to use information from a previous iteration to reduce the search space. For example, it may be desirable to configure task T200 in subsequent instances of method M20 or M25 (or task T270 in subsequent instances of method M100 or M110) to calculate directional fitness measures for each of fewer than all of the frequency components of set F.

Figure 12A:
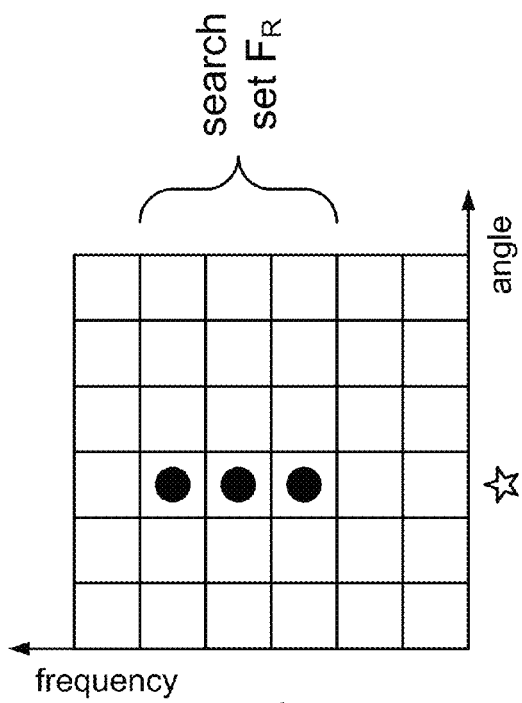
FIG. 12A illustrates an example of a strategy for a reduced search in the frequency component space.
Figure 12B:
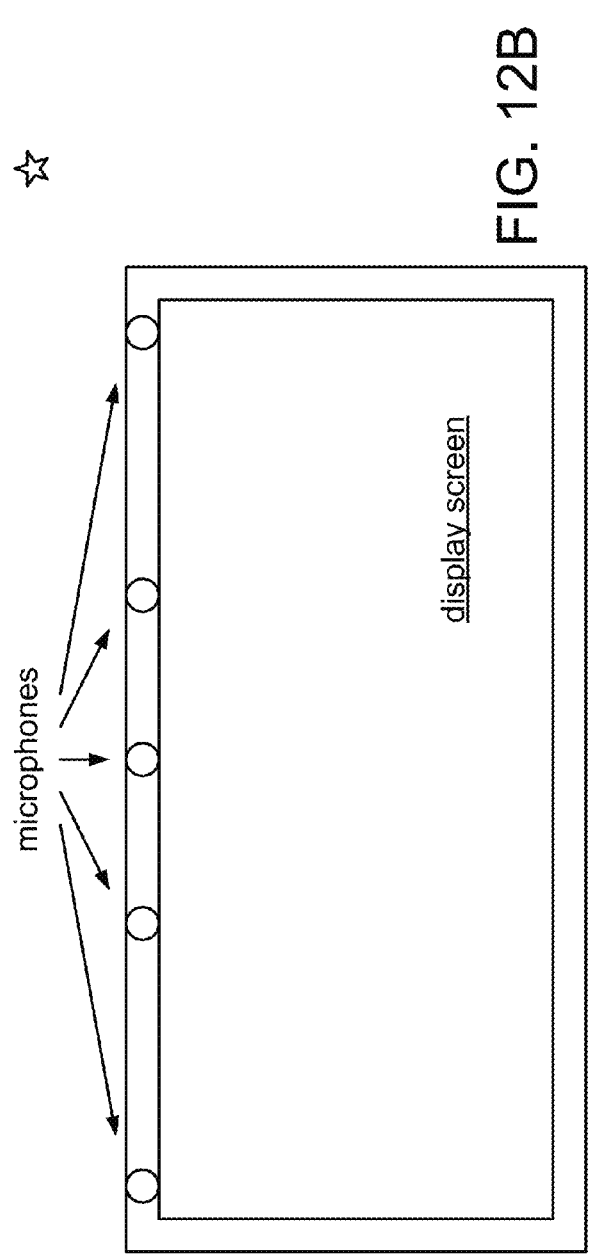
FIG. 12B shows a linear array of microphones arranged along the top margin of a television screen.

FIG. 12A illustrates one example of such a reduced search strategy. In this example, an initial instance of method M20 (e.g., of method M25, M100, or M110) is implemented to record an indication of the R frequency components that have the lowest directional errors (indicated by the marked blocks) for the selected candidate direction (indicated by the star). Examples for the value of R include ten, twenty, 25, 35, and 50 percent of the number of elements in set F, although any other value that is deemed suitable for the particular application may be used. This reduced set $F_R$ is then used as the set F of frequency components for the next instance of method M20 (e.g., of method M25, M100, or M110).

Subsequent instances of method M20 (e.g., of method M25, M100, or M110) may be similarly limited to the reduced set $F_R$ until, for example, a specified time interval or number of frames has elapsed since the last full search (e.g., twenty, fifty, 100, or 200 frames, or one, two, three, four, or five seconds), or until a specified reset event occurs. One example of a reset event is a change in the selected candidate direction. Another example of a reset event is an increase (e.g., to meet or exceed a threshold value) in the average directional error (e.g., mean, median, or mode) over reduced set $F_R$ at the selected candidate direction. At such times, a new cycle may be initiated by executing an instance of method M20 (e.g., of method M25, M100, or M110) that searches the full set of F frequency components and selects a new instance of reduced search set $F_R$ for subsequent instances of the method, as described above.

In addition to or in the alternative to limiting subsequent instances of method M20 to a reduced set $F_R$ of frequency components, it may be desirable to implement subsequent instances of implementations of method M10 (e.g., of method M20, M25, M30, M100, or M110) to perform task T20 for fewer than all of the K candidate directions. Such a subsequent instance of method M10 (e.g., of method M20, M25, M30, M100, or M110) may be configured, for example, to calculate directional fitness measures for only those candidate directions that are less than (alternatively, not farther than) a maximum change angle $\theta_A$ from the candidate direction selected by the initial instance. The maximum change angle $\theta_A$ may be determined, for example, by the expected maximum speed of the desired source in a direction parallel to an axis of the microphone array. Examples of values for maximum change angle $\theta_A$ include twenty, 30, and 45 degrees.

Subsequent instances of method M10 (e.g., of method M20, M25, M30, M100, or M110) may be similarly limited to such an angular search window as indicated by angle $\theta_A$ until, for example, a specified time interval or number of frames has elapsed since the last full search (e.g., twenty, fifty, 100, or 200 frames, or one, two, three, four, or five seconds), or until a specified reset event occurs. One example of a reset event is a change in the selected candidate direction. Another example of a reset event is an increase (e.g., to meet or exceed a threshold value) in the average directional fitness measure (e.g., mean, median, or mode) over the angular search window. At such times, a new cycle may be initiated by executing an instance of method M10 (e.g., of method M20, M25, M30, M100, or M110) that searches the full set of K candidate directions and selects a new initial candidate direction for subsequent instances of the method, as described above.

Such a method may be applied to obtain instantaneous tracking results (e.g., with a delay of less than one frame). The delay is dependent on the FFT size and the degree of overlap. For example, for a 512-point FFT with a 50% overlap and a sampling frequency of 16 kHz, the resulting 256-sample delay corresponds to sixteen milliseconds. Such a method may be used to support differentiation of source directions typically up to a source-array distance of two to three meters, or even up to five meters.

It may be desirable to implement task T20 (or T200 or T250) to perform a temporal smoothing operation on each directional fitness measure according to an expression such as $e_s(n)=\beta e_s(n-1)+(1-\beta)e(n)$ (also known as a first-order IIR or recursive filter), where $e_s(n-1)$ denotes the smoothed directional fitness measure for the previous frame, $e(n)$ denotes the current unsmoothed value of the directional fitness measure, $e_s(n)$ denotes the current smoothed value of the directional fitness measure, and $\beta$ is a smoothing factor whose value may be selected from the range of from zero (no smoothing) to one (no updating). Typical values for smoothing factor $\beta$ include 0.1, 0.2, 0.25, 0.3, 0.4, and 0.5. It is typical, but not necessary, for such an implementation of task T20 to use the same value of $\beta$ to smooth directional fitness measures that correspond to different frequency components. Similarly, it is typical, but not necessary, for such an implementation of task T20 to use the same value of $\beta$ to smooth directional fitness measures that correspond to different candidate directions. Task T10 (or T100 or T150) may be implemented to perform a similar temporal smoothing operation on each calculated difference. Task T30 (or T35 or T350) may be implemented to perform a similar temporal smoothing operation on each selected candidate direction. Task T400 may be implemented to perform a similar temporal smoothing operation on each DOA indication.

Figure 14D:
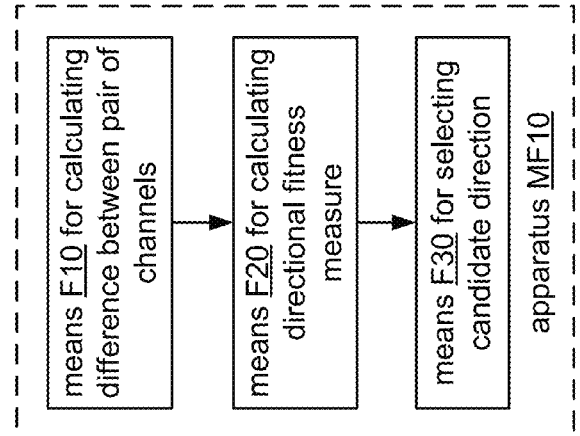
FIG. 14D shows a block diagram of an apparatus MF5 according to a general configuration.
Figure 14C:
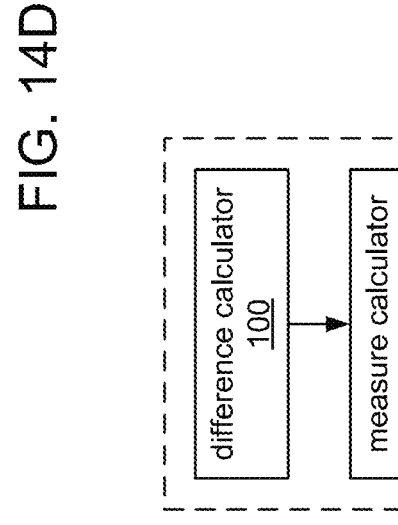
FIG. 14C shows a block diagram of an implementation A15 of apparatus A10.
Figure 14E:
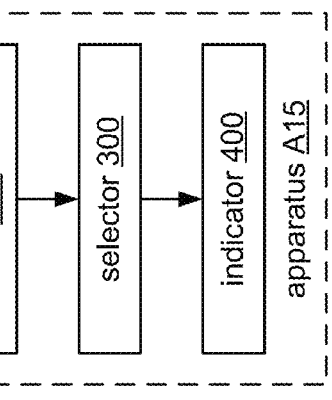
FIG. 14E shows a block diagram of an implementation MF10 of apparatus MF5.
Figure 14A:
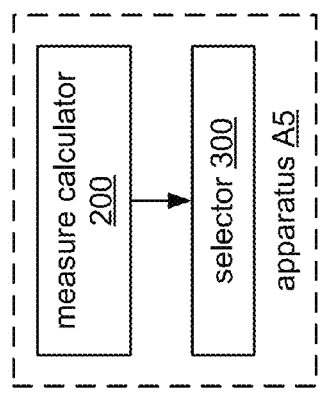
FIG. 14A shows a block diagram of an apparatus A5 according to a general configuration.

FIG. 14A shows a block diagram of an apparatus A5 according to a general configuration that includes a measure calculator 200 and a selector 300. Measure calculator 200 is configured to calculate, for a calculated difference between a pair of channels of a multichannel signal and for each among a plurality of candidate directions, a corresponding directional fitness measure that is based on the calculated difference (e.g., a directional error or likelihood, as described herein with reference to implementations of task T20). Selector 300 is configured to select a candidate direction, based on the corresponding directional fitness measure (e.g., as described herein with reference to implementations of task T30).

Figure 14B:
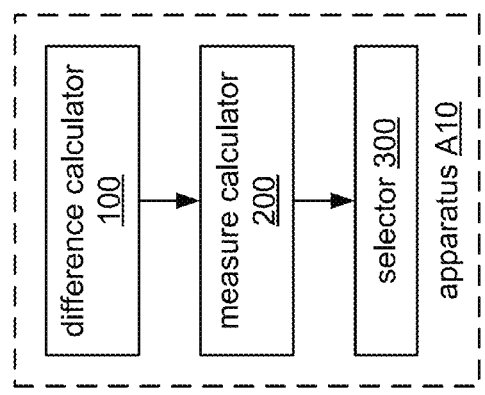
FIG. 14B shows a block diagram of an implementation A10 of apparatus A5.

FIG. 14B shows a block diagram of an implementation A10 of apparatus A5 that includes a difference calculator 100. Apparatus A10 may be implemented, for example, to perform an instance of method M10, M20, MA20, M30, and/or M100 as described herein. Calculator 100 is configured to calculate a difference (e.g., a gain-based or phase-based difference) between a pair of channels of a multichannel signal (e.g., as described herein with reference to implementations of task T10). Calculator 100 may be implemented, for example, to calculate such a difference for each among a plurality of frequency components of the multichannel signal (e.g., as described herein with reference to implementations of task T100). In such case, calculator 100 may also be implemented to apply a subband filter bank to the signal and/or to calculate a frequency transform of each channel (e.g., a fast Fourier transform (FFT) or modified discrete cosine transform (MDCT)) before calculating the differences. Measure calculator 200 may be implemented in apparatus A10 to calculate a plurality of directional fitness measures for each among the plurality of frequency components (e.g., as described herein with reference to implementations of task T200), and selector 300 may be implemented in apparatus A10 to select a candidate direction based on the pluralities of directional fitness measures (e.g., as described herein with reference to implementations of task TA300) or to select a candidate direction for each among the plurality of frequency components (e.g., as described herein with reference to implementations of task T300).

Additionally or alternatively, calculator 100 may be implemented to calculate such a difference or plurality of differences for each among a plurality of pairs of channels of the multichannel signal (e.g., as described herein with reference to implementations of tasks T150 and T170, respectively). In such cases, measure calculator 200 may be implemented to calculate a plurality of directional fitness measures for each among the plurality of channel pairs (e.g., as described herein with reference to implementations of task T250 and T270, respectively), and selector 300 may be implemented to select a candidate direction based on the pluralities of directional fitness measures (e.g., as described herein with reference to implementations of task T35) or to select a corresponding candidate direction for each among the plurality of frequency components (e.g., as described herein with reference to implementations of task T350).

FIG. 14C shows a block diagram of an implementation A15 of apparatus A10 that includes an indicator 400. Indicator 400 is configured to indicate a direction of arrival, based on a plurality of candidate direction selections produced by selector 300 (e.g., as described herein with reference to implementations of task T400). Apparatus A15 may be implemented, for example, to perform an instance of method M25 and/or M110 as described herein.

FIG. 14D shows a block diagram of an apparatus MF5 according to a general configuration. Apparatus MF5 includes means F20 for calculating, for a calculated difference between a pair of channels of a multichannel signal and for each among a plurality K of candidate directions, a corresponding directional fitness measure that is based on the calculated difference (e.g., a directional error or likelihood, as described herein with reference to implementations of task T20). Apparatus MF5 also includes means F30 for selecting a candidate direction, based on the corresponding directional fitness measure (e.g., as described herein with reference to implementations of task T30).

FIG. 14E shows a block diagram of an implementation MF10 of apparatus MF5 that may be implemented, for example, to perform an instance of method M10, M20, M30, and/or M100 as described herein. Apparatus MF10 includes means F10 for calculating a difference (e.g., a gain-based or phase-based difference) between a pair of channels of a multichannel signal (e.g., as described herein with reference to implementations of task T10). Means F10 may be implemented, for example, to calculate such a difference for each among a plurality F of frequency components of the multichannel signal (e.g., as described herein with reference to implementations of task T100). In such case, means F10 may also be implemented to include means for performing a subband analysis and/or calculating a frequency transform of each channel (e.g., a fast Fourier transform (FFT) or modified discrete cosine transform (MDCT)) before calculating the differences. Means F20 may be implemented in apparatus MF10 to calculate a plurality of directional fitness measures for each among the plurality of frequency components (e.g., as described herein with reference to implementations of task T200), and means F30 may be implemented in apparatus MF10 to select a candidate direction based on the pluralities of directional fitness measures (e.g., as described herein with reference to implementations of task TA300) or to select a candidate direction for each among the plurality of frequency components (e.g., as described herein with reference to implementations of task T300).

Additionally or alternatively, means F10 may be implemented to calculate such a difference or plurality of differences for each among a plurality of pairs of channels of the multichannel signal (e.g., as described herein with reference to implementations of tasks T150 and T170, respectively). In such cases, means F20 may be implemented to calculate a plurality of directional fitness measures for each among the plurality of channel pairs (e.g., as described herein with reference to implementations of task T250 and T270, respectively), and means F30 may be implemented to select a candidate direction based on the pluralities of directional fitness measures (e.g., as described herein with reference to implementations of task T35) or to select a corresponding candidate direction for each among the plurality of frequency components (e.g., as described herein with reference to implementations of task T350).

Figure 15B:
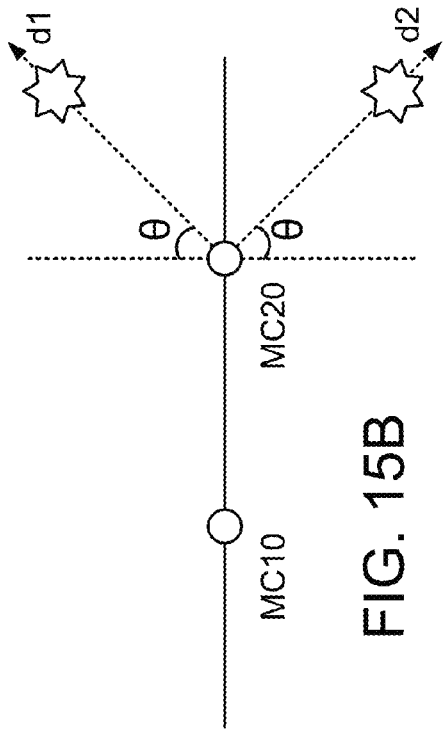
FIG. 15B shows an example of an ambiguity of a 1-D measurement.
Figure 15C:
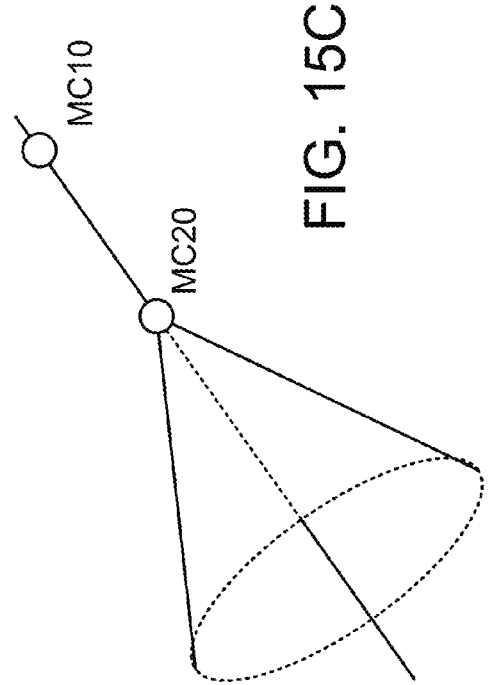
FIG. 15C shows one example of a cone of confusion.
Figure 15A:
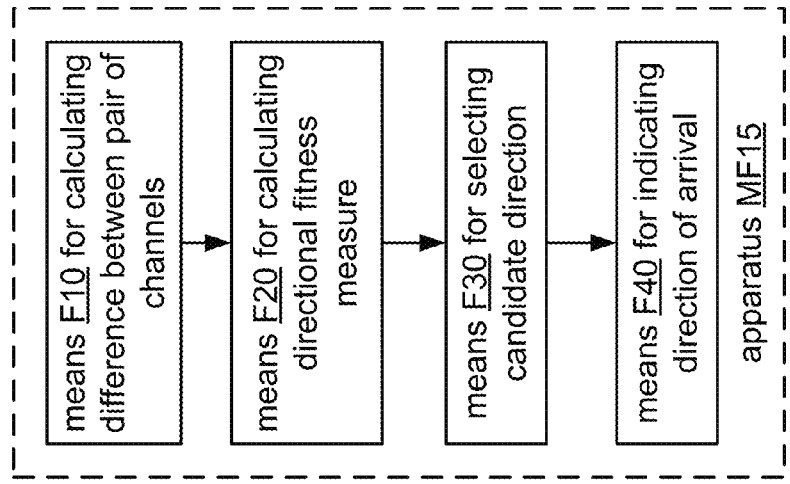
FIG. 15A shows a block diagram of an implementation MF15 of apparatus MF10.

FIG. 15A shows a block diagram of an implementation MF15 of apparatus MF10 that includes means F40 for indicating a direction of arrival, based on a plurality of candidate direction selections produced by means F30 (e.g., as described herein with reference to implementations of task T400). Apparatus MF15 may be implemented, for example, to perform an instance of method M25 and/or M110 as described herein.

The signals received by a microphone pair or other linear array of microphones may be processed as described herein to provide an estimated DOA that indicates an angle with reference to the axis of the array. As described above (e.g., with reference to methods M20, MA20, M25, M100, and M110), more than two microphones may be used in a linear array to improve DOA estimation performance across a range of frequencies. Even in such cases, however, the range of DOA estimation supported by a linear (i.e., one-dimensional) array is typically limited to 180 degrees.

FIG. 11B shows a measurement model in which a one-dimensional DOA estimate indicates an angle (in the 180-degree range of +90 degrees to −90 degrees) relative to a plane that is orthogonal to the axis of the array. Although implementations of methods M200 and M300 and task TB200 are described below with reference to a context as shown in FIG. 11B, it will be recognized that such implementations are not limited to this context and that corresponding implementations with reference to other contexts (e.g., in which the DOA estimate indicates an angle of 0 to 180 degrees relative to the axis in the direction of microphone MC10 or, alternatively, in the direction away from microphone MC10) are expressly contemplated and hereby disclosed.

The desired angular span may be arbitrary within the 180-degree range. For example, the DOA estimates may be limited to selected sectors of interest within that range. The desired angular resolution may also be arbitrary (e.g. uniformly distributed over the range, or nonuniformly distributed, as described herein with reference to FIGS. 6B-6D). Additionally or alternatively, the desired frequency span may be arbitrary (e.g., limited to a voice range) and/or the desired frequency resolution may be arbitrary (e.g. linear, logarithmic, mel-scale, Bark-scale, etc.).

FIG. 15B shows an example of an ambiguity that results from the one-dimensionality of a DOA estimate from a linear array. In this example, a DOA estimate from microphone pair MC10, MC20 (e.g., as a candidate direction as produced by selector 300, or a DOA estimate as produced by indicator 400) indicates an angle $\theta$ with reference to the array axis. Even if this estimate is very accurate, however, it does not indicate whether the source is located along line d1 or along line d2.

As a consequence of its one-dimensionality, a DOA estimate from a linear microphone array actually describes a right circular conical surface around the array axis in space (assuming that the responses of the microphones are perfectly omnidirectional) rather than any particular direction in space. The actual location of the source on this conical surface (also called a "cone of confusion") is indeterminate. FIG. 15C shows one example of such a surface.

Figure 16:
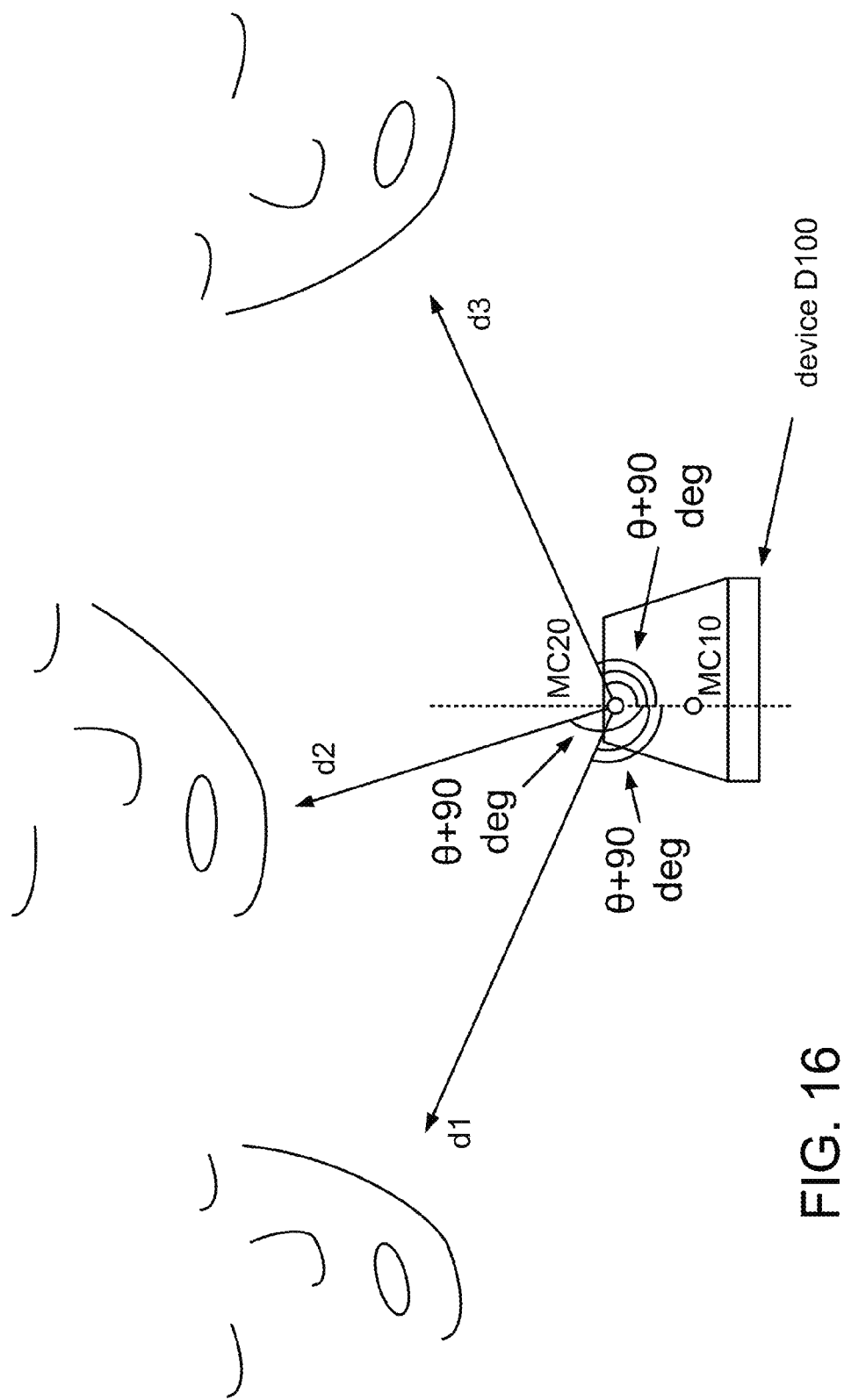
FIG. 16 shows an example of source confusion in a speakerphone application.

FIG. 16 shows an example of source confusion in a speakerphone application in which three sources (e.g., mouths of human speakers) are located in different respective directions relative to device D100 (e.g., a smartphone) having a linear microphone array. In this example, the source directions d1, d2, and d3 all happen to lie on a cone of confusion that is defined at microphone MC20 by an angle ($\theta$+90 degrees) relative to the array axis in the direction of microphone MC10. Because all three source directions have the same angle relative to the array axis, the microphone pair produces the same DOA estimate for each source and fails to distinguish among them.

To provide for an estimate having a higher dimensionality, it may be desirable to extend the DOA estimation principles described herein to a two-dimensional (2-D) array of microphones. FIG. 17A shows a 2-D microphone array that includes two microphone pairs having orthogonal axes. In this example, the axis of the first pair MC10, MC20 is the x axis and the axis of the second pair MC20, MC30 is the y axis. An instance of an implementation of method M10 may be performed for the first pair to produce a corresponding 1-D DOA estimate $\theta_x$, and an instance of an implementation of method M10 may be performed for the second pair to produce a corresponding 1-D DOA estimate $\theta_y$. For a signal that arrives from a source located in the plane defined by the microphone axes, the cones of confusion described by $\theta_x$ and $\theta_y$ coincide at the direction of arrival d of the signal to indicate a unique direction in the plane.

FIG. 17B shows a flowchart of a method M200 according to a general configuration that includes tasks TB100a, TB100b, and TB200. Task TB100a calculates a first DOA estimate for a multichannel signal with respect to an axis of a first linear array of microphones, and task TB100a calculates a second DOA estimate for the multichannel signal with respect to an axis of a second linear array of microphones. Each of tasks TB100a and TB100b may be implemented, for example, as an instance of an implementation of method M10 (e.g., method M20, MA20, M30, M100, or M110) as described herein. Based on the first and second DOA estimates, task TB200 calculates a combined DOA estimate.

The range of the combined DOA estimate may be greater than the range of either of the first and second DOA estimates. For example, task TB200 may be implemented to combine 1-D DOA estimates, produced by tasks TB100a and TB100b and having individual ranges of up to 180 degrees, to produce a combined DOA estimate that indicates the DOA as an angle in a range of up to 360 degrees. Task TB200 may be implemented to map 1-D DOA estimates $\theta_x$, $\theta_y$ to a direction in a larger angular range by applying a mapping, such as $$\theta_c = \begin{cases} \theta_y, & \theta_x > 0 \\ 180° - \theta_y, & \text{otherwise,} \end{cases} \quad (4)$$

to combine one angle with information (e.g., sign information) from the other angle. For the 1-D estimates $(\theta_x, \theta_y) = (45°, 45°)$ as shown in FIG. 17A, for example, TB200 may be implemented to apply such a mapping to obtain a combined estimate $\theta_c$ of 45 degrees relative to the x-axis. For a case in which the range of the DOA estimates is 0 to 180 degrees rather than −90 to +90 degrees, it will be understood that the axial polarity (i.e., positive or negative) condition in expression (4) would be expressed in terms of whether the DOA estimate under test is less than or greater than 90 degrees.

It may be desirable to show the combined DOA estimate $\theta_c$ on a 360-degree-range display. For example, it may be desirable to display the DOA estimate as an angle on a planar polar plot. Planar polar plot display is familiar in applications such as radar and biomedical scanning, for example. FIG. 17C shows an example of a DOA estimate shown on such a display. In this example, the direction of the line indicates the DOA estimate and the length of the line indicates the current strength of the component arriving from that direction. As shown in this example, the polar plot may also include one or more concentric circles to indicate intensity of the directional component on a linear or logarithmic (e.g., decibel) scale. For a case in which more than one DOA estimate is available at one time (e.g., for sources that are disjoint in frequency), a corresponding line for each DOA estimate may be displayed.

Figure 18C:
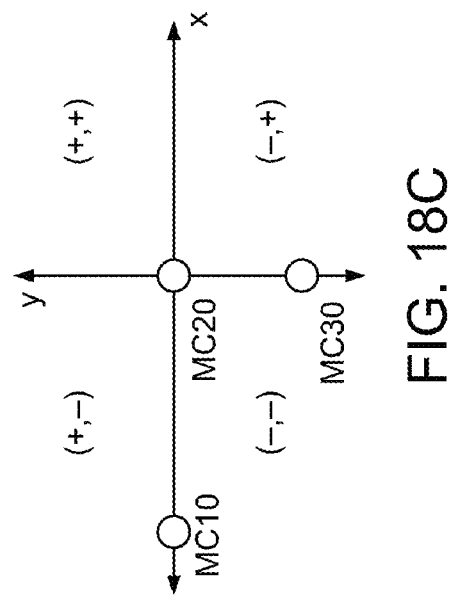
FIG. 18C shows a correspondence between the four values of a tuple of signs and the quadrants of a plane.
Figure 18D:
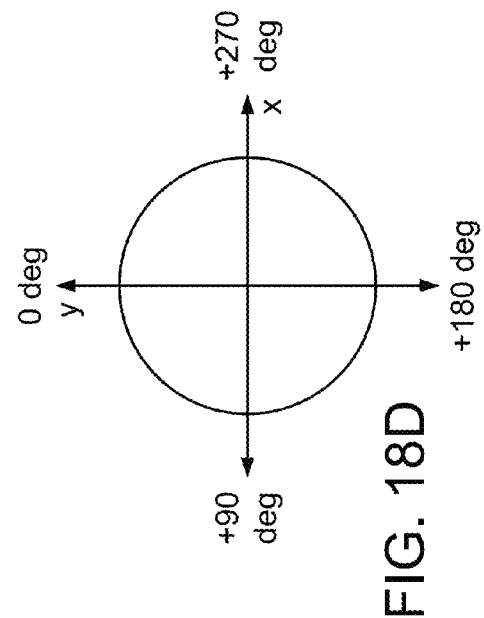
FIG. 18D shows a 360-degree display according to an alternate mapping.
Figure 18A:
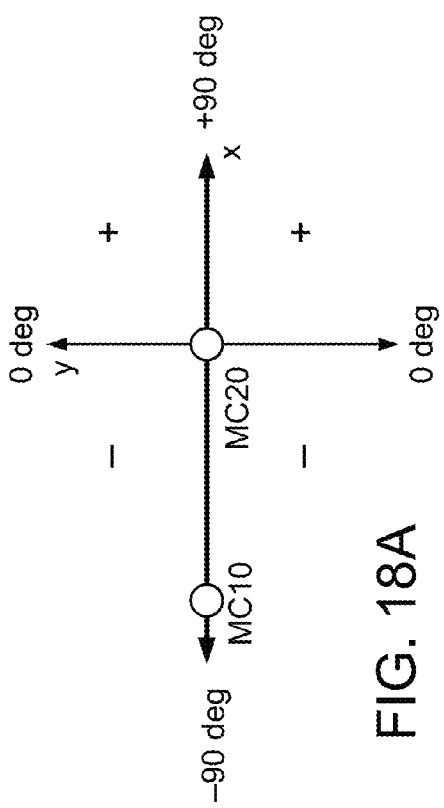
FIGS. 18A and 18B show correspondences between signs of 1-D estimates and corresponding quadrants of a plane.
Figure 18B:
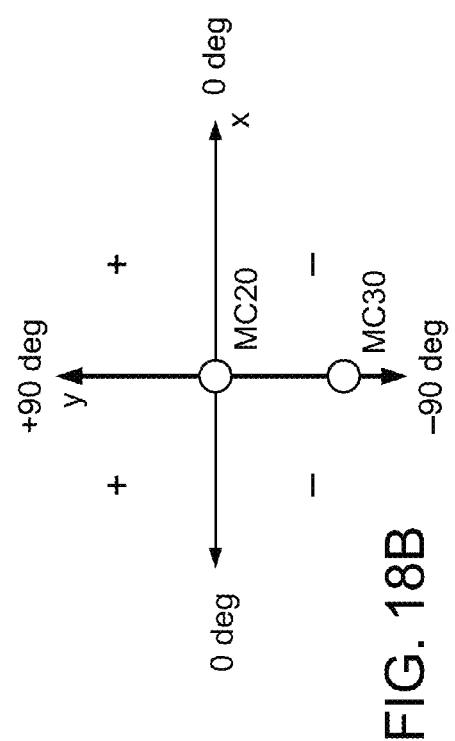

FIGS. 18A and 18B show correspondences between the signs of the 1-D estimates $\theta_x$ and $\theta_y$, respectively, and corresponding quadrants of the plane defined by the array axes. FIG. 18C shows a correspondence between the four values of the tuple $(\text{sign}(\theta_x), \text{sign}(\theta_y))$ and the quadrants of the plane. FIG. 18D shows a 360-degree display according to an alternate mapping (e.g., relative to the y-axis)

$$\theta_c = \begin{cases} -\theta_x, & \theta_y > 0 \\ \theta_x + 180, & \text{otherwise.} \end{cases} \quad (5)$$

It is noted that FIG. 17A illustrates a special case in which the source is located in the plane defined by the microphone axes, such that the cones of confusion described by $\theta_x$ and $\theta_y$ indicate a unique direction in this plane. For most practical applications, it may be expected that the cones of confusion of nonlinear microphone pairs of a 2-D array typically will not coincide in a plane defined by the array, even for a far-field point source. For example, source height relative to the plane of the array (e.g., displacement of the source along the z-axis) may play an important role in 2-D tracking.

It may be desirable to produce an accurate 2-D representation of directions of arrival for signals that are received from sources at arbitrary locations in a three-dimensional space. For example, it may be desirable for the combined DOA estimate produced by task TB200 to indicate the DOA of a source signal in a plane that does not include the DOA (e.g., a plane defined by the microphone array or by a display surface of the device). Such indication may be used, for example, to support arbitrary placement of the audio sensing device relative to the source and/or arbitrary relative movement of the device and source (e.g., for speakerphone and/or source tracking applications).

FIG. 19A shows an example that is similar to FIG. 17A but depicts a more general case in which the source is located above the x-y plane. In such case, the intersection of the cones of confusion of the arrays indicate two possible directions of arrival: a direction d1 that extends above the x-y plane, and a direction d2 that extends below the x-y plane. In many applications, this ambiguity may be resolved by assuming that direction d1 is correct and ignoring the second direction d2. For a speakerphone application in which the device is placed on a tabletop, for example, it may be assumed that no sources are located below the device. In any case, the projections of directions d1 and d2 on the x-y plane are the same.

While a mapping of 1-D estimates $\theta_x$ and $\theta_y$ to a range of 360 degrees (e.g., as in expression (4) or (5)) may produce an appropriate DOA indication when the source is located in the microphone plane, it may produce an inaccurate result for the more general case of a source that is not located in that plane. For a case in which $\theta_x = \theta_y$, as shown in FIG. 17B, for example, it may be understood that the corresponding direction in the x-y plane is 45 degrees relative to the x axis. Applying the mapping of expression (4) to the values $(\theta_x, \theta_y) = (30°, 30°)$, however, produces a combined estimate $\theta_c$ of 30 degrees relative to the x axis, which does not correspond to the source direction as projected on the plane.

FIG. 19B shows another example of a 2-D microphone array whose axes define an x-y plane and a source that is located above the x-y plane (e.g., a speakerphone application in which the speaker's mouth is above the tabletop). With respect to the x-y plane, the source is located along the y axis (e.g., at an angle of 90 degrees relative to the x axis). The x-axis pair MC10, MC20 indicates a DOA of zero degrees relative to the y-z plane (i.e., broadside to the pair axis), which agrees with the source direction as projected onto the x-y plane. Although the source is located directly above the y axis, it is also offset in the direction of the z axis by an elevation angle of 30 degrees. This elevation of the source from the x-y plane causes the y-axis pair MC20, MC30 to indicate a DOA of sixty degrees (i.e., relative to the x-z plane) rather than ninety degrees. Applying the mapping of expression (4) to the values $(\theta_x, \theta_y)=(0°, 60°)$ produces a combined estimate $\theta_c$ of 60 degrees relative to the x axis, which does not correspond to the source direction as projected on the plane.

In a typical use case, the source will be located in a direction that is neither within a plane defined by the array axes nor directly above an array axis. FIG. 19C shows an example of such a general case in which a point source (i.e., a speaker's mouth) is elevated above the plane defined by the array axes. In order to obtain a correct indication in the array plane of a source direction that is outside that plane, it may be desirable to implement task TB200 to convert the 1-D DOA estimates into an angle in the array plane to obtain a corresponding DOA estimate in the plane.

Figure 20A:
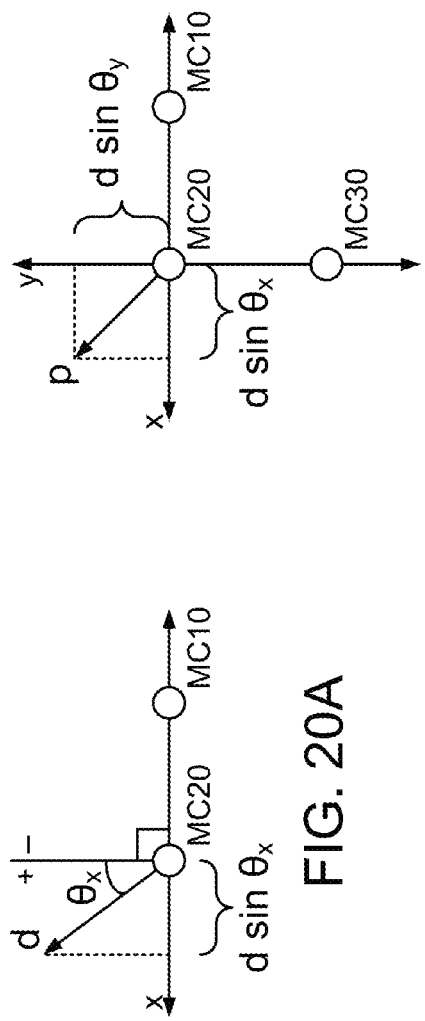
FIGS. 20A-20D show a derivation of a conversion of a pair of DOA estimates into an angle in the array plane.
Figure 20B:
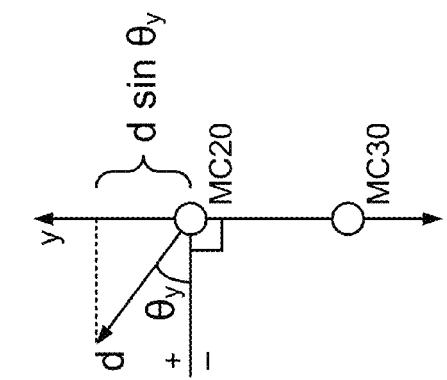
Figure 20C:
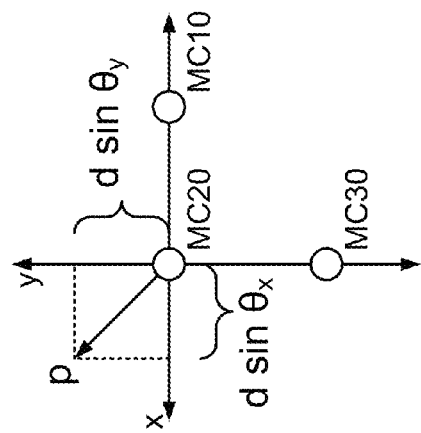
Figure 20D:
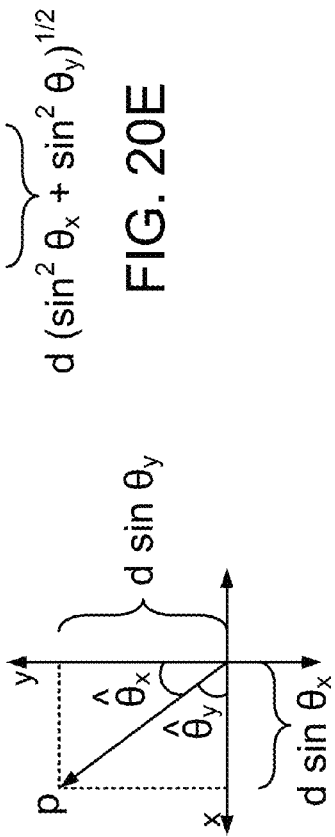
Figure 20E:
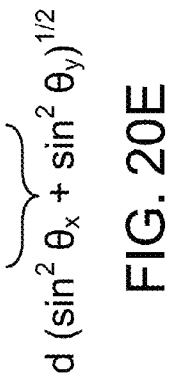
FIG. 20E shows a calculation of an estimated angle of elevation.

FIGS. 20A-20D show a derivation of such a conversion of $(\theta_x, \theta_y)$ into an angle in the array plane. In FIGS. 20A and 20B, the source vector d is projected onto the x axis and onto the y axis, respectively. The lengths of these projections (d sin $\theta_x$ and d sin $\theta_y$, respectively) are the dimensions of the projection p of source vector d onto the x-y plane, as shown in FIG. 20C. These dimensions are sufficient to determine conversions of DOA estimates $(\theta_x, \theta_y)$ into angles $(\hat{\theta}_x, \hat{\theta}_y)$ of p in the x-y plane relative to the y-axis and relative to the x-axis, respectively, as shown in FIG. 20D:

$$\hat{\theta}_x = \tan^{-1}\left(\frac{\sin\theta_x}{|\sin\theta_y|+\varepsilon}\right), \hat{\theta}_y = \tan^{-1}\left(\frac{\sin\theta_y}{|\sin\theta_x|+\varepsilon}\right) \quad (6)$$

where $\varepsilon$ is a small value as may be included to avoid a divide-by-zero error. (It is noted with reference to FIGS. 19B, 19C, 20A-E, and also 22A-E as discussed below, that the relative magnitude of d as shown is only for convenience of illustration, and that the magnitude of d should be large enough relative to the dimensions of the microphone array for the far-field assumption of planar wavefronts to remain valid.)

Task TB200 may be implemented to convert the DOA estimates according to such an expression into a corresponding angle in the array plane and to apply a mapping (e.g., as in expression (4) or (5)) to the converted angle to obtain a combined DOA estimate $\theta_c$ in that plane. It is noted that such an implementation of task TB200 may omit calculation of $\hat{\theta}_y$ (alternatively, of $\hat{\theta}_x$) as included in expression (6), as the value $\theta_c$ may be determined from $\hat{\theta}_x$ as combined with $\text{sign}(\hat{\theta}_y)=\text{sign}(\theta_y)$ (e.g., as shown in expressions (4) and (5)). For such a case in which the value of $|\hat{\theta}_y|$ is also desired, it may be calculated as $|\hat{\theta}_y|=90°-|\hat{\theta}_x|$ (and likewise for $|\hat{\theta}_x|$).

FIG. 19C shows an example in which the DOA of the source signal passes through the point (x,y,z)=(5,2,5). In this case, the DOA observed by the x-axis microphone pair MC10-MC20 is $\theta_x=\tan^{-1}(5/\sqrt{25+4})\approx42.9°$, and the DOA observed by the y-axis microphone pair MC20-MC30 is $\theta_y=\tan^{-1}(2/\sqrt{25+25})\approx15.8°$. Using expression (6) to convert these angles into corresponding angles in the x-y plane produces the converted DOA estimates $(\hat{\theta}_x, \hat{\theta}_y)=(21.8°, 68.2°)$, which correspond to the given source location (x,y)=(5,2).

Applying expression (6) to the values $(\theta_x, \theta_y)=(30°, 30°)$ as shown in FIG. 17B produces the converted estimates $(\hat{\theta}_x, \hat{\theta}_y)=(45°, 45°)$, which are mapped by expression (4) to the expected value of 45 degrees relative to the x axis. Applying expression (6) to the values $(\theta_x, \theta_y)=(0°, 60°)$ as shown in FIG. 19B produces the converted estimates $(\hat{\theta}_x, \hat{\theta}_y)=(0°, 90°)$, which are mapped by expression (4) to the expected value of 90 degrees relative to the x axis.

Task TB200 may be implemented to apply a conversion and mapping as described above to project a DOA, as indicated by any such pair of DOA estimates from a 2-D orthogonal array, onto the plane in which the array is located. Such projection may be used to enable tracking directions of active speakers over a 360° range around the microphone array, regardless of height difference. FIG. 21A shows a plot obtained by applying an alternate mapping $$\theta_c = \begin{cases} -\hat{\theta}_y, & \theta_x < 0 \\ \hat{\theta}_y + 180°, & \text{otherwise} \end{cases}$$

to the converted estimates $(\hat{\theta}_x, \hat{\theta}_y)=(0°, 90°)$ from FIG. 19B to obtain a combined directional estimate (e.g., an azimuth) of 270 degrees. In this figure, the labels on the concentric circles indicate relative magnitude in decibels.

Task TB200 may also be implemented to include a validity check on the observed DOA estimates prior to calculation of the combined DOA estimate. It may be desirable, for example, to verify that the value $(|\theta_x|+|\theta_y|)$ is at least equal to 90 degrees (e.g., to verify that the cones of confusion associated with the two observed estimates will intersect along at least one line).

In fact, the information provided by such DOA estimates from a 2D microphone array is nearly complete in three dimensions, except for the up-down confusion. For example, the directions of arrival observed by microphone pairs MC10-MC20 and MC20-MC30 may also be used to estimate the magnitude of the angle of elevation of the source relative to the x-y plane. If d denotes the vector from microphone MC20 to the source, then the lengths of the projections of vector d onto the x-axis, the y-axis, and the x-y plane may be expressed as d $\sin(\theta_x)$, d $\sin(\theta_y)$, and $d\sqrt{\sin^2(\theta_x)+\sin^2(\theta_y)}$, respectively (e.g., as shown in FIGS. 20A-20E). The magnitude of the angle of elevation may then be estimated as $\theta_h=\cos^{-1}\sqrt{\sin^2(\theta_x)+\sin^2(\theta_y)}$.

Although the linear microphone arrays in the particular examples of FIGS. 10A-10B and 12A-12D have orthogonal axes, it may be desirable to implement method M200 for a more general case in which the axes of the microphone arrays are not orthogonal. FIG. 21B shows an example of the intersecting cones of confusion associated with the responses of linear microphone arrays having non-orthogonal axes x and r to a common point source. FIG. 21C shows the lines of intersection of these cones, which define the two possible directions d1 and d2 of the point source with respect to the array axes in three dimensions.

Figure 22A:
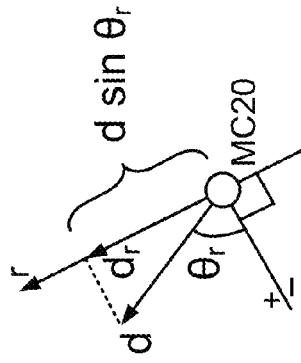
FIG. 22A shows an example of a microphone array MC10-MC20-MC30.
Figure 22B:
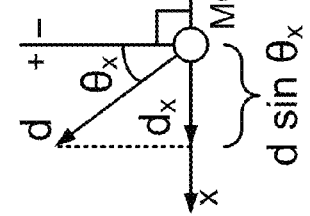
FIGS. 22B-22E show a derivation of a conversion of a pair of DOA estimates into an angle in the array plane.
Figure 22C:
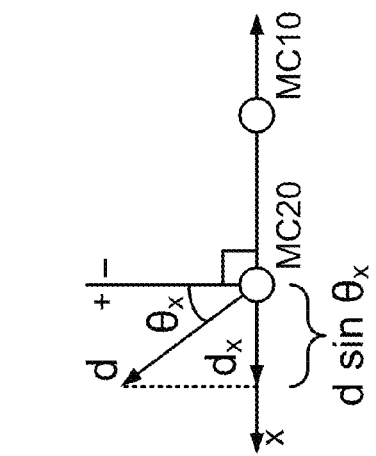

FIG. 22A shows an example of a microphone array MC10-MC20-MC30 in which the axis of pair MC10-MC20 is the x axis, and the axis r of pair MC20-MC30 lies in the x-y plane and is skewed relative to the y axis by a skew angle α. FIG. 22B shows an example of obtaining a combined directional estimate in the x-y plane with respect to orthogonal axes x and y with observations $(\theta_x, \theta_r)$ from an array as shown in FIG. 22A. If d denotes the vector from microphone MC20 to the source, then the lengths of the projections of vector d onto the x-axis ($d_x$) and onto the axis r ($d_r$) may be expressed as d $\sin(\theta_x)$ and d $\sin(\theta_r)$, respectively, as shown in FIGS. 22B and 22C. The vector $p=(p_x, p_y)$ denotes the projection of vector d onto the x-y plane. The estimated value of $p_x=d \sin \theta_x$ is known, and it remains to determine the value of $p_y$.

Figure 22D:
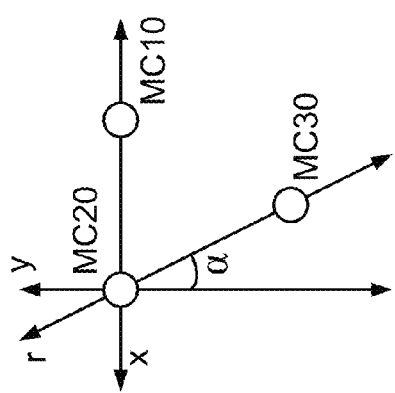
Figure 22E:
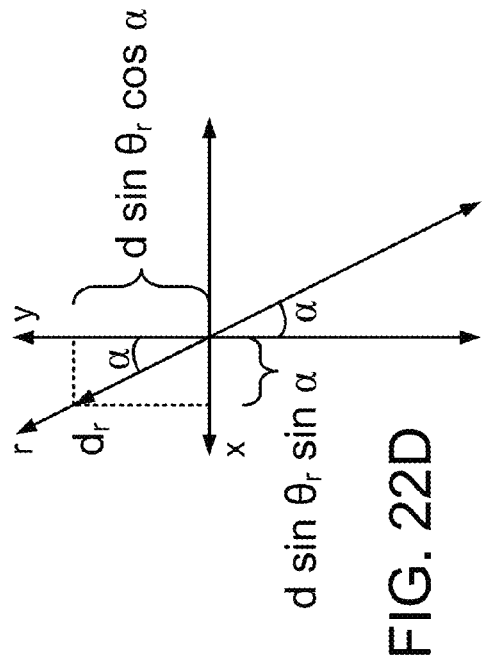

We assume that the value of α is in the range (−90°, +90°), as an array having any other value of α may easily be mapped to such a case. The value of $p_y$ may be determined from the dimensions of the projection vector $d_r=(d \sin \theta_r \sin \alpha, d \sin \theta_r \cos \alpha)$ as shown in FIGS. 22D and 22E. Observing that the difference between vector p and vector $d_r$ is orthogonal to $d_r$ (i.e., that the inner product $\langle (p-d_r), d_r \rangle$ is equal to zero), we calculate $p_y$ as $$p_y = d \frac{\sin\theta_r - \sin\theta_x \sin\alpha}{\cos\alpha}$$

(which reduces to $p_y = d \sin \theta_r$ for α=0). The desired angles of arrival in the x-y plane, relative to the orthogonal x and y axes, may then be expressed respectively as $$(\hat{\theta}_x, \hat{\theta}_y) = \left( \tan^{-1}\left( \frac{\sin\theta_x \cos\alpha}{|\sin\theta_r - \sin\theta_x \sin\alpha| + \varepsilon} \right), \tan^{-1}\left( \frac{\sin\theta_r - \sin\theta_x \sin\alpha}{|\sin\theta_x| \cos\alpha + \varepsilon} \right) \right). \quad (7)$$

It is noted that expression (6) is a special case of expression (7) in which α=0. The dimensions $(p_x, p_y)$ of projection p may also be used to estimate the angle of elevation $\theta_h$ of the source relative to the x-y plane (e.g., in a similar manner as described above with reference to FIG. 20E).

FIG. 23A shows a flowchart of a method M300 according to a general configuration that includes instances of tasks TB100a and TB100b. Method M300 also includes an implementation TB300 of task TB200 that calculates a projection of the direction of arrival into a plane that does not include the direction of arrival (e.g., a plane defined by the array axes). In such manner, a 2-D array may be used to extend the range of source DOA estimation from a linear, 180-degree estimate to a planar, 360-degree estimate.

FIG. 23B shows a flowchart of an implementation TB302 of task TB300 that includes subtasks TB310 and TB320. Task TB310 converts the first DOA estimate (e.g., $\theta_x$) to an angle in the projection plane (e.g., $\hat{\theta}_x$). For example, task TB310 may perform a conversion as shown in, e.g., expression (6) or (7). Task TB320 combines the converted angle with information (e.g., sign information) from the second DOA estimate to obtain the projection of the direction of arrival. For example, task TB320 may perform a mapping according to, e.g., expression (4) or (5).

Figure 24A:
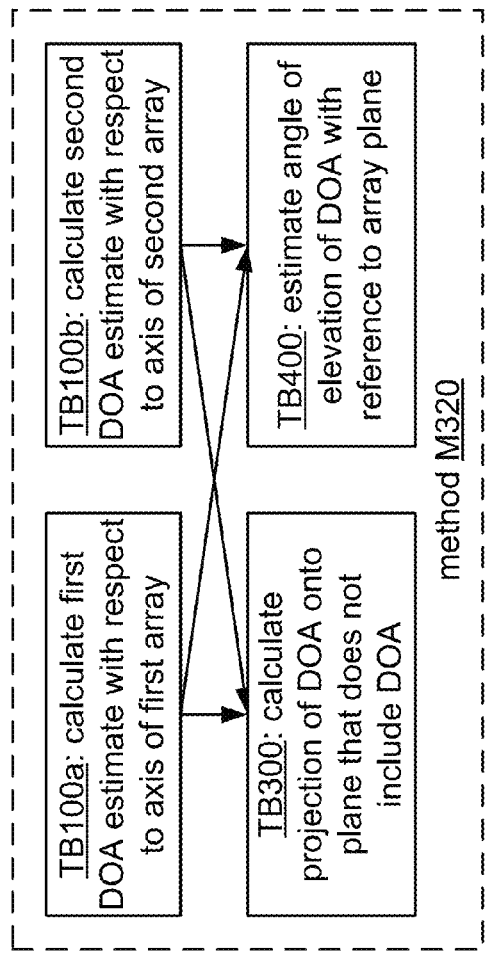
FIG. 24A shows a flowchart of an implementation M320 of method M300.

As described above, extension of source DOA estimation to two dimensions may also include estimation of the angle of elevation of the DOA over a range of 90 degrees (e.g., to provide a measurement range that describes a hemisphere over the array plane). FIG. 24A shows a flowchart of such an implementation M320 of method M300 that includes a task TB400. Task TB400 calculates an estimate of the angle of elevation of the DOA with reference to a plane that includes the array axes (e.g., as described herein with reference to FIG. 20E). Method M320 may also be implemented to combine the projected DOA estimate with the estimated angle of elevation to produce a three-dimensional vector.

It may be desirable to perform an implementation of method M300 within an audio sensing device that has a 2-D array including two or more linear microphone arrays. Examples of a portable audio sensing device that may be implemented to include such a 2-D array and may be used to perform such a method for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, tablet computer, or other portable computing device. The class of portable computing devices currently includes devices having names such as laptop computers, notebook computers, netbook computers, ultra-portable computers, tablet computers, mobile Internet devices, smartbooks, and smartphones. Such a device may have a top panel that includes a display screen and a bottom panel that may include a keyboard, wherein the two panels may be connected in a clamshell or other hinged relationship. Such a device may be similarly implemented as a tablet computer that includes a touchscreen display on a top surface.

Extension of DOA estimation to a 2-D array (e.g., as described herein with reference to implementations of method M200 and implementations of method M300) is typically well-suited to and sufficient for a speakerphone application. However, further extension of such principles to an N-dimensional array (wherein N>=2) is also possible and may be performed in a straightforward manner. For example, FIGS. 17A-22E illustrate use of observed DOA estimates from different microphone pairs in an x-y plane to obtain an estimate of a source direction as projected into the x-y plane. In the same manner, an instance of method M200 or M300 may be implemented to combine observed DOA estimates from an x-axis microphone pair and a z-axis microphone pair (or other pairs in the x-z plane) to obtain an estimate of the source direction as projected into the x-z plane, and likewise for the y-z plane or any other plane that intersects three or more of the microphones. The 2-D projected estimates may then be combined to obtain the estimated DOA in three dimensions. For example, a DOA estimate for a source as projected onto the x-y plane may be combined with a DOA estimate for the source as projected onto the x-z plane to obtain a combined DOA estimate as a vector in (x, y, z) space.

For tracking applications in which one target is dominant, it may be desirable to select N linear microphone arrays (e.g., pairs) for representing N respective dimensions. Method M200 or M300 may be implemented to combine a 2-D result, obtained with a particular pair of such linear arrays, with a DOA estimate from each of one or more linear arrays in other planes to provide additional degrees of freedom.

Estimates of DOA error from different dimensions may be used to obtain a combined likelihood estimate, for example, using an expression such as $$\frac{1}{\max(|\theta - \theta_{0,1}|^2_{f,1}, |\theta - \theta_{0,2}|^2_{f,2}) + \lambda} \text{ or }$$

$$\frac{1}{\operatorname{mean}(|\theta - \theta_{0,1}|^2_{f,1}, |\theta - \theta_{0,2}|^2_{f,2}) + \lambda},$$

where $\theta_{0,i}$ denotes the DOA candidate selected for pair i. Use of the maximum among the different errors may be desirable to promote selection of an estimate that is close to the cones of confusion of both observations, in preference to an estimate that is close to only one of the cones of confusion and may thus indicate a false peak. Such a combined result may be used to obtain a (frame, angle) plane, as shown in FIG. 8 and described herein, and/or a (frame, frequency) plot, as shown at the bottom of FIG. 9 and described herein.

Figure 24B:
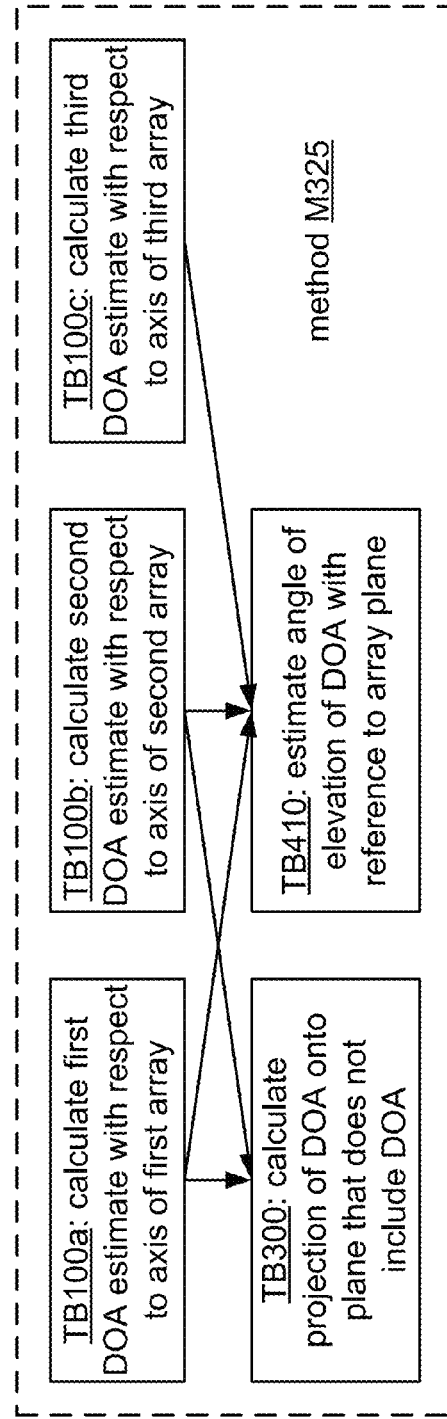
FIG. 24B shows a flowchart for an implementation M325 of method M320.

FIG. 24B shows a flowchart for an implementation M325 of method M320 that includes tasks TB100c and an implementation TB410 of task T400. Task TB100c calculates a third estimate of the direction of arrival with respect to an axis of a third microphone array. Task TB410 estimates the angle of elevation based on information from the DOA estimates from tasks TB100a, TB100b, and TB100c.

It is expressly noted that methods M200 and M300 may be implemented such that task TB100a calculates its DOA estimate based on one type of difference between the corresponding microphone channels (e.g., a phase-based difference), and task TB100b (or TB100c) calculates its DOA estimate based on another type of difference between the corresponding microphone channels (e.g., a gain-based difference). In one application of such an example of method M325, an array that defines an x-y plane is expanded to include a front-back pair (e.g., a fourth microphone located at an offset along the z axis with respect to microphone MC10, MC20, or MC30). The DOA estimate produced by task TB100c for this pair is used in task TB400 to resolve the front-back ambiguity in the angle of elevation, such that the method provides a full spherical measurement range (e.g., 360 degrees in any plane). In this case, method M325 may be implemented such that the DOA estimates produced by tasks TB100a and TB100b are based on phase differences, and the DOA estimate produced by task TB100c is based on gain differences. In a particular example (e.g., for tracking of only one source), the DOA estimate produced by task TB100c has two states: a first state indicating that the source is above the plane, and a second state indicating that the source is below the plane.

FIG. 25A shows a flowchart of an implementation M330 of method M300. Method M330 includes a task TB500 that displays the calculated projection to a user of the audio sensing device. Task TB500 may be configured, for example, to display the calculated projection on a display screen of the device in the form of a polar plot (e.g., as shown in FIGS. 17C, 18D, and 21A). Examples of such a display screen, which may be a touchscreen as shown in FIG. 1, include a liquid crystal display (LCD), an organic light-emitting diode (OLED) display, an electrowetting display, an electrophoretic display, and an interferometric modulator display. Such display may also include an indication of the estimated angle of elevation (e.g., as shown in FIG. 25B).

Figure 26B:
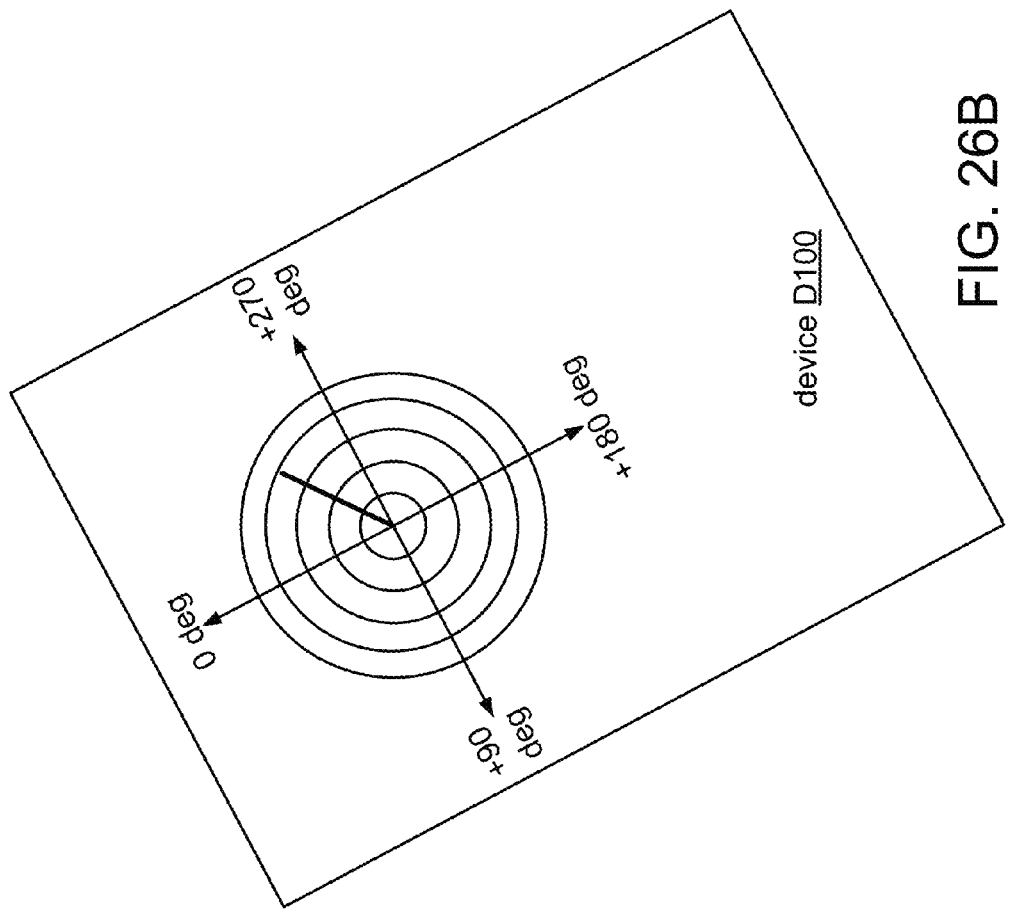
FIGS. 26A and 26B show examples of a display before and after rotation, respectively.
Figure 26A:
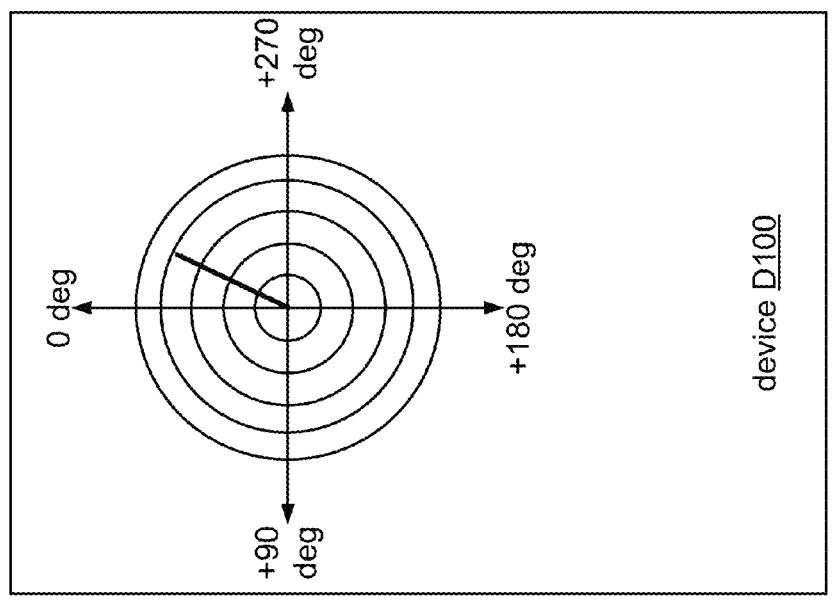

Task TB500 may be implemented to display the projected DOA with respect to a reference direction of the device (e.g., a principal axis of the device). In such case, the direction as indicated will change as the device is rotated relative to a stationary source, even if the position of the source does not change. FIGS. 26A and 26B show examples of such a display before and after such rotation, respectively.

Figure 27B:
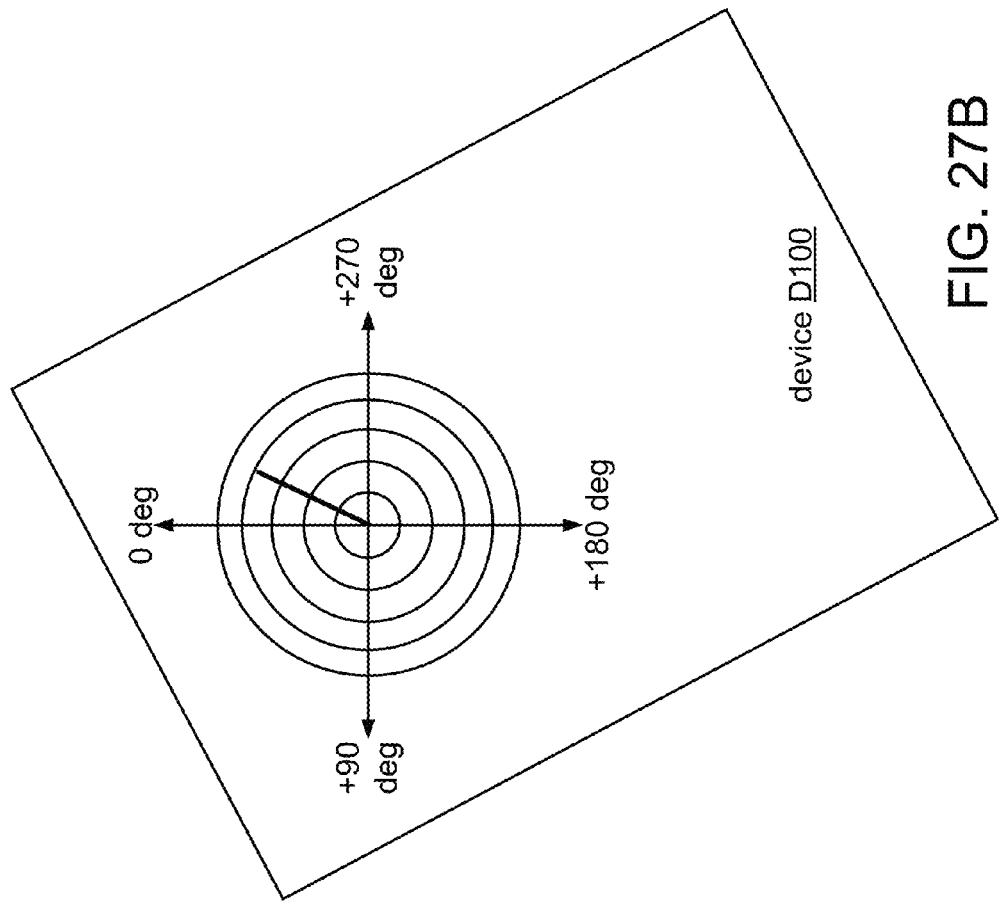
FIGS. 27A and 27B show examples of a display before and after rotation, respectively.
Figure 27A:
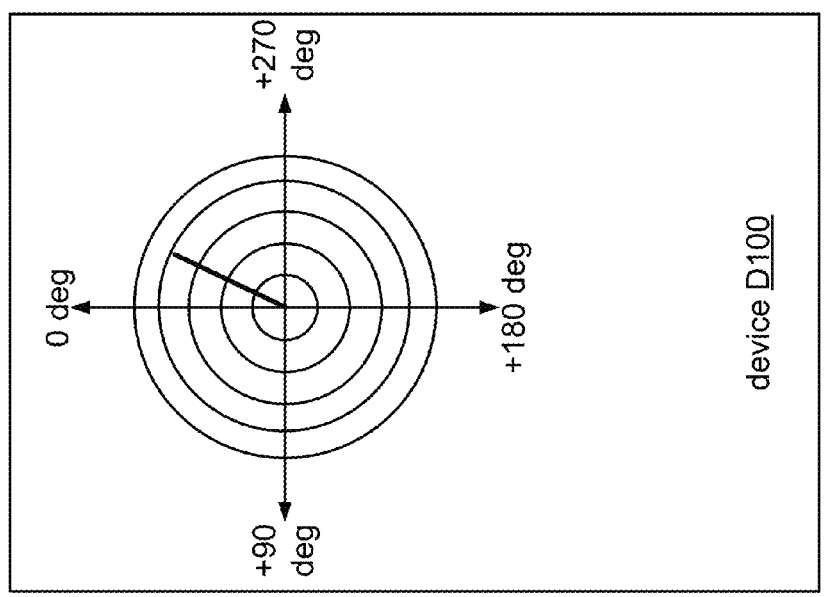

Alternatively, it may be desirable to implement task TB500 to display the projected DOA relative to an external reference direction, such that the direction as indicated remains constant as the device is rotated relative to a stationary source. FIGS. 27A and 27B show examples of such a display before and after such rotation, respectively.

To support such an implementation of task TB500, device D100 may be configured to include an orientation sensor (not shown) that indicates a current spatial orientation of the device with reference to an external reference direction, such as a gravitational axis (e.g., an axis that is normal to the earth's surface) or a magnetic axis (e.g., the earth's magnetic axis). The orientation sensor may include one or more inertial sensors, such as gyroscopes and/or accelerometers. A gyroscope uses principles of angular momentum to detect changes in orientation about an axis or about each of two or three (typically orthogonal) axes (e.g., changes in pitch, roll and/or twist). Examples of gyroscopes, which may be fabricated as micro-electromechanical systems (MEMS) devices, include vibratory gyroscopes. An accelerometer detects acceleration along an axis or along each of two or three (typically orthogonal) axes. An accelerometer may also be fabricated as a MEMS device. It is also possible to combine a gyroscope and an accelerometer into a single sensor. Additionally or alternatively, the orientation sensor may include one or more magnetic field sensors (e.g., magnetometers), which measure magnetic field strength along an axis or along each of two or three (typically orthogonal) axes. In one example, device D100 includes a magnetic field sensor that indicates a current orientation of the device relative to a magnetic axis (e.g., of the earth). In such case, task TB500 may be implemented to display the projected DOA on a grid that is rotated into alignment with that axis (e.g., as a compass).

FIG. 25C shows a flowchart of such an implementation M340 of method M330 that includes a task TB600 and an implementation TB510 of task TB500. Task TB600 determines an orientation of the audio sensing device with reference to an external reference axis (e.g., a gravitational or magnetic axis). Task TB510 displays the calculated projection based on the determined orientation.

Task TB500 may be implemented to display the DOA as the angle projected onto the array plane. For many portable audio sensing devices, the microphones used for DOA estimation will be located at the same surface of the device as the display (e.g., microphones ME10, MV10-1, and MV10-3 in FIG. 1) or much closer to that surface than to each other (e.g., microphones ME10, MR10, and MV10-3 in FIG. 1). The thickness of a tablet computer or smartphone, for example, is typically small relative to the dimensions of the display surface. In such cases, any error between the DOA as projected onto the array plane and the DOA as projected onto the display plane may be expected to be negligible, and it may be acceptable to configure task TB500 to display the DOA as projected onto the array plane.

For a case in which the display plane differs noticeably from the array plane, task TB500 may be implemented to project the estimated DOA from a plane defined by the axes of the microphone arrays into a plane of a display surface. For example, such an implementation of task TB500 may display a result of applying a projection matrix to the estimated DOA, where the projection matrix describes a projection from the array plane onto a surface plane of the display. Alternatively, task TB300 may be implemented to include such a projection.

Figure 29B:
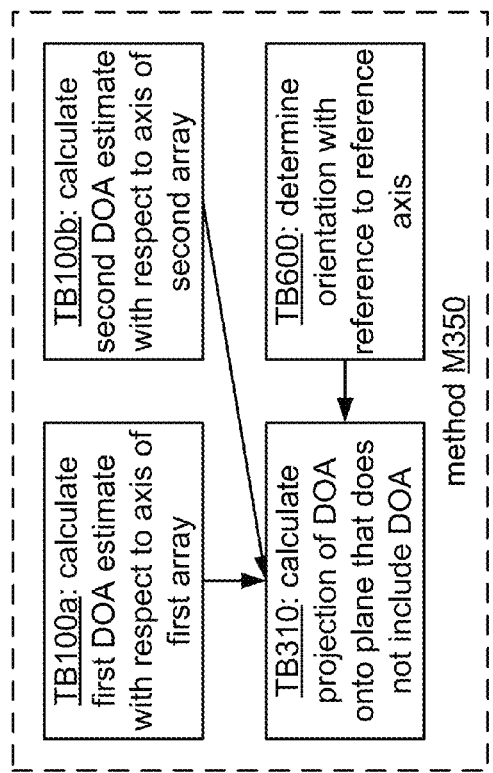
FIG. 29B shows a flowchart of an implementation M350 of method M300.

As described above, the audio sensing device may include an orientation sensor that indicates a current spatial orientation of the device with reference to an external reference direction. It may be desirable to combine a DOA estimate as described herein with such orientation information to indicate the DOA estimate with reference to the external reference direction. FIG. 29B shows a flowchart of such an implementation M350 of method M300 that includes an instance of task TB600 and an implementation TB310 of task TB300. Method M350 may also be implemented to include an instance of display task TB500 as described herein.

FIG. 28A shows an example in which the device coordinate system E is aligned with the world coordinate system. FIG. 28A also shows a device orientation matrix F that corresponds to this orientation (e.g., as indicated by the orientation sensor). FIG. 28B shows an example in which the device is rotated (e.g., for use in browse-talk mode) and the matrix F (e.g., as indicated by the orientation sensor) that corresponds to this new orientation.

Task TB310 may be implemented to use the device orientation matrix F to project the DOA estimate into any plane that is defined with reference to the world coordinate system. In one such example, the DOA estimate is a vector g in the device coordinate system. In a first operation, vector g is converted into a vector h in the world coordinate system by an inner product with device orientation matrix F. Such a conversion may be performed, for example, according to an expression such as $\vec{h}=(\vec{g}^T E)^T F$. In a second operation, the vector h is projected into a plane P that is defined with reference to the world coordinate system by the projection $A(A^T A)^{-1} A^T \vec{h}$, where A is a basis matrix of the plane P in the world coordinate system.

Figure 29C:
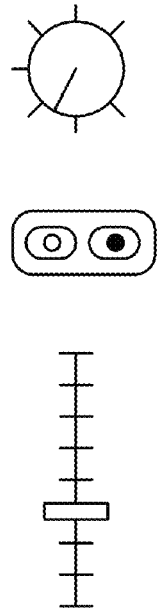
FIG. 29C shows examples of user interface elements for input.
Figure 29A:
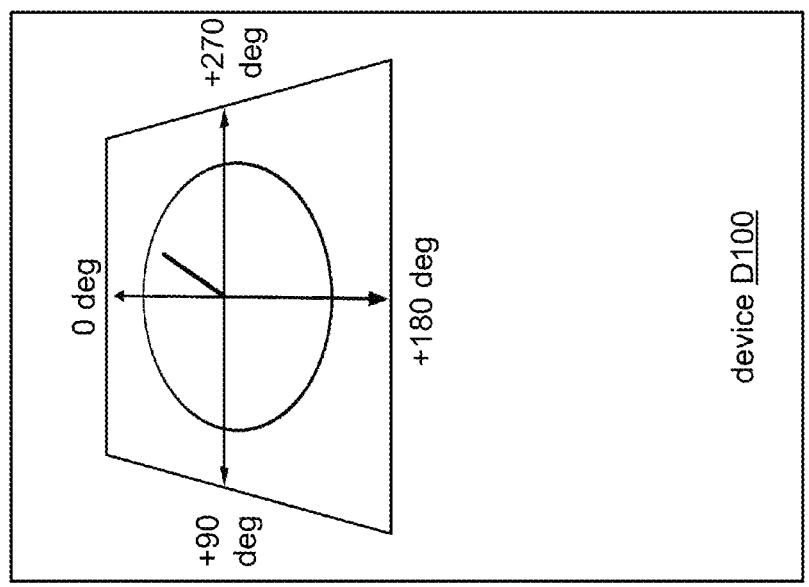
FIG. 29A shows an example of a perspective-mapped display of a DOA as projected onto the world reference plane.

In a typical example, the plane P is parallel to the x-y plane of the world coordinate system (i.e., the "world reference plane"). FIG. 28C shows a perspective mapping, onto a display plane of the device, of a projection of a DOA onto the world reference plane as may be performed by task TB500, where the orientation of the display plane relative to the world reference plane is indicated by the device orientation matrix F. FIG. 29A shows an example of such a mapped display of the DOA as projected onto the world reference plane.

In another example, task TB310 is configured to project DOA estimate vector g into plane P using a less complex interpolation among component vectors of g that are projected into plane P. In this case, the projected DOA estimate vector $P_g$ may be calculated according to an expression such as $$P_g = \alpha g_{x\text{-}y(p)} + \beta g_{x\text{-}z(p)} + \gamma g_{y\text{-}z(p)},$$

where $[\vec{e}_x\ \vec{e}_y\ \vec{e}_z]$ denote the basis vectors of the device coordinate system; $g = g_x \vec{e}_x + g_y \vec{e}_y + g_z \vec{e}_z$; $\theta_\alpha, \theta_\beta, \theta_\gamma$ denote the angles between plane P and the planes spanned by $[\vec{e}_x\ \vec{e}_y]$, $[\vec{e}_x\ \vec{e}_z]$, $[\vec{e}_y\ \vec{e}_z]$, respectively, and $\alpha, \beta, \gamma$ denote their respective cosines ($\alpha^2 + \beta^2 + \gamma^2 = 1$); and $g_{x\text{-}y(p)}, g_{x\text{-}z(p)}, g_{y\text{-}z(p)}$ denote the projections into plane P of the component vectors $g_{x\text{-}y}, g_{x\text{-}z}, g_{y\text{-}z} = [g_x \vec{e}_x g_y \vec{e}_y\ 0]^T, [g_x \vec{e}_x\ 0\ g_z \vec{e}_z]^T, [0\ g_y \vec{e}_y g_z \vec{e}_z]^T$, respectively. The plane corresponding to the minimum among $\alpha, \beta$, and $\gamma$ is the plane that is closest to P, and an alternative implementation of task TB310 identifies this minimum and produces the corresponding one of the projected component vectors as an approximation of $P_g$.

It may be desirable to configure an audio sensing device to discriminate among source signals having different DOAs. For example, it may be desirable to configure the audio sensing device to perform a directionally selective filtering operation on the multichannel signal to pass directional components that arrive from directions within an angular pass range and/or to block or otherwise attenuate directional components that arrive from directions within an angular stop range.

Figure 30B:
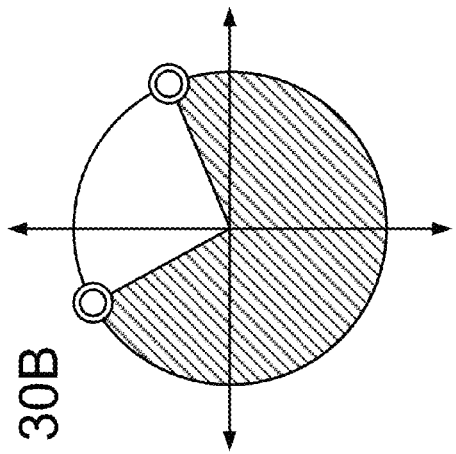
FIGS. 30A-30C show examples of a user interface.

It may be desirable to use a display as described herein to support a graphical user interface to enable a user of an audio sensing device to configure a directionally selective processing operation (e.g., a beamforming operation as described herein). FIG. 30A shows an example of such a user interface, in which the unshaded portion of the circle indicates a range of directions to be passed and the shaded portion indicates a range of directions to be blocked. The circles indicate points on a touch screen that the user may slide around the periphery of the circle to change the selected range. The touch points may be linked such that moving one causes the other to move by an equal angle in the same angular direction or, alternatively, in the opposite angular direction. Alternatively, the touch points may be independently selectable (e.g., as shown in FIG. 30B). It is also possible to provide one or more additional pairs of touch points to support selection of more than one angular range (e.g., as shown in FIG. 30C).

Figure 30C:
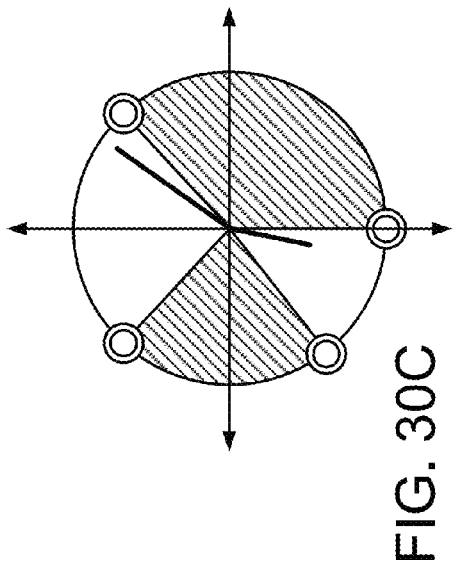
Figure 30A:
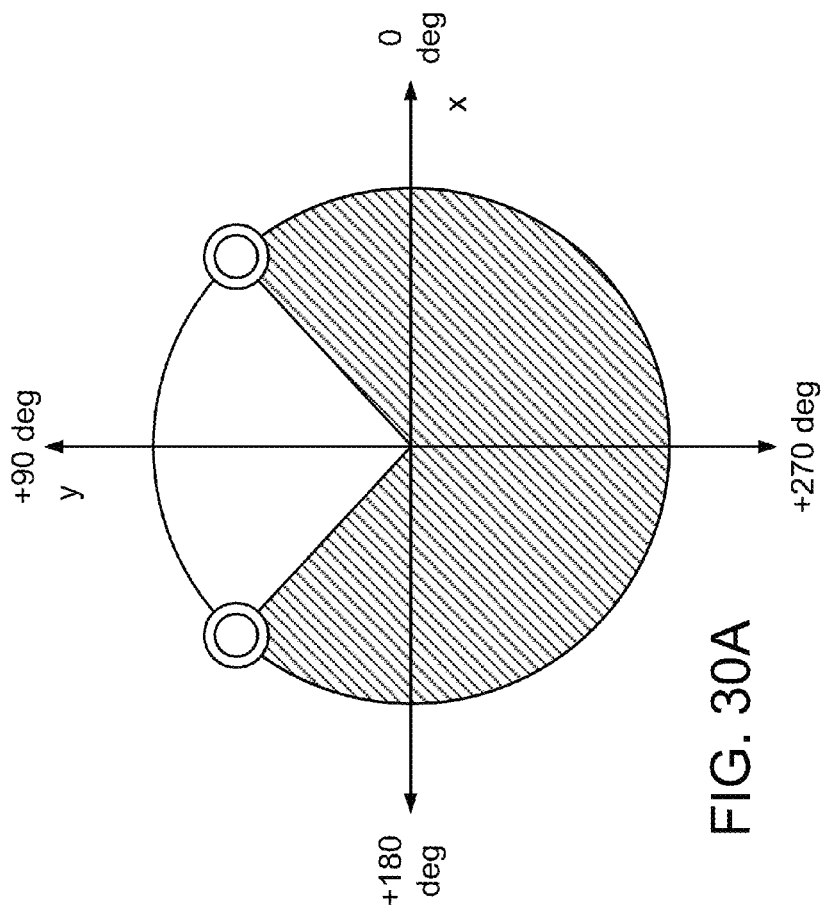

As alternatives to touch points as shown in FIGS. 30A-C, the user interface may include other physical or virtual selection interfaces (e.g., clickable or touchable icons on a screen) to obtain user input for selection of pass/stop band location and/or width. Examples of such interfaces include a linear slider potentiometer, a rocker switch (for binary input to indicate, e.g., up-down, left-right, clockwise/counter-clockwise), and a wheel or knob as shown in FIG. 29C.

Figure 31B:
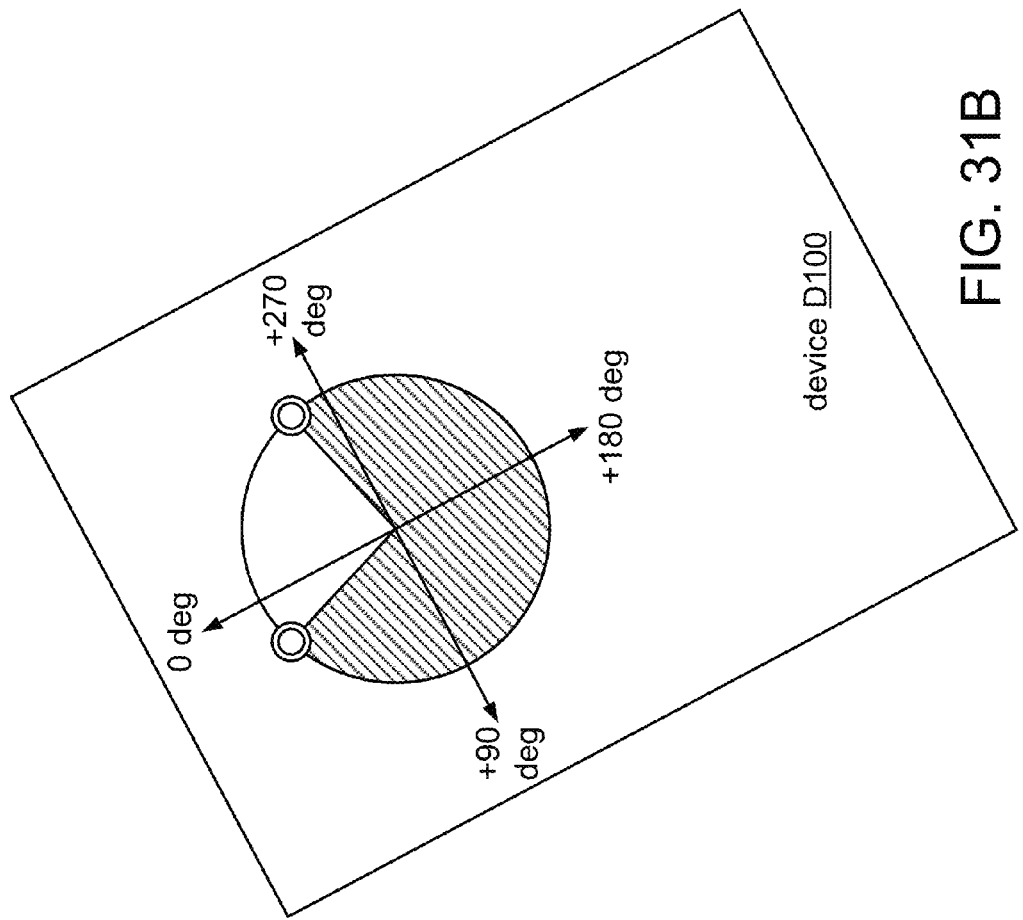
FIGS. 31A and 31B show an example in which an orientation sensor is used to track an orientation of a device.
Figure 31A:
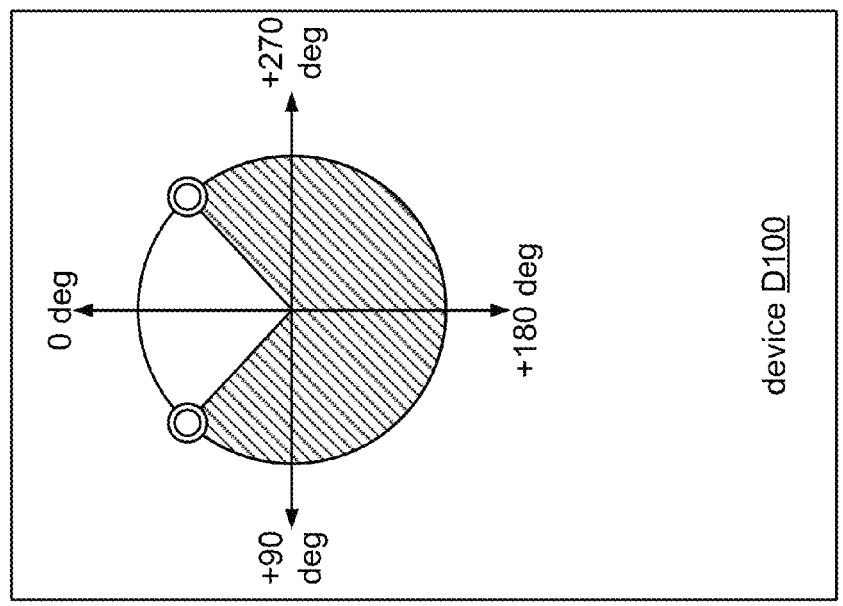

For use cases in which the audio sensing device is expected to remain stationary during use (e.g., the device is placed on a flat surface for speakerphone use), it may be sufficient to indicate a range of selected directions that is fixed relative to the device. If the orientation of the device relative to a desired source changes during use, however, components arriving from the direction of that source may no longer be admitted. FIGS. 31A and 31B show a further example in which an orientation sensor is used to track an orientation of the device. In this case, a directional displacement of the device (e.g., as indicated by the orientation sensor) is used to update the directional filtering configuration as selected by the user (and to update the corresponding display) such that the desired directional response may be maintained despite a change in orientation of the device.

It may be desirable for the array to include a number of microphones that is at least equal to the number of different source directions to be distinguished (e.g., the number of beams to be formed) at any one time. The microphones may be omnidirectional (e.g., as may be typical for a cellular telephone or a dedicated conferencing device) or directional (e.g., as may be typical for a device such as a set-top box).

The DOA estimation principles described herein may be used to support selection among multiple speakers. For example, location of multiple sources may be combined with a manual selection of a particular speaker (e.g., push a particular button, or touch a particular screen area, to select a particular corresponding speaker or active source direction) or automatic selection of a particular speaker (e.g., by speaker recognition). In one such application, an audio sensing device (e.g., a telephone) is configured to recognize the voice of its owner and to automatically select a direction corresponding to that voice in preference to the directions of other sources.

FIG. 32A shows a block diagram of an implementation MF320 of apparatus MF300. Apparatus MF320 includes means FB400 for calculating an estimate of the angle of elevation of the DOA with reference to a plane that includes the array axes (e.g., as described herein with reference to task TB400). Apparatus MF320 may also be implemented to combine the projected DOA estimate with the estimated angle of elevation to produce a three-dimensional vector. FIG. 32B shows a block diagram of an implementation MF325 of apparatus MF320. Apparatus MF325 includes means FB100c for calculating a third estimate of the direction of arrival with respect to an axis of a third microphone array (e.g., as described herein with reference to task TB100c). Apparatus MF325 also includes an implementation FB410 of means FB400 configured to estimate the angle of elevation based on information from the DOA estimates from means FB100a, FB100b, and FB100c.

FIG. 32C shows a block diagram of an implementation A320 of apparatus A300 that includes an elevation calculator B400. Elevation calculator B400 is configured to calculate an estimate of the angle of elevation of the DOA with reference to a plane that includes the array axes (e.g., as described herein with reference to task TB400). Apparatus A320 may also be implemented to combine the projected DOA estimate with the estimated angle of elevation to produce a three-dimensional vector. Apparatus MF320 may also be implemented to include a third DOA estimator configured to calculate a third estimate of the direction of arrival with respect to an axis of a third microphone array (e.g., as described herein with reference to task TB100c), and in such case elevation calculator B400 may be configured to estimate the angle of elevation based on information from the three DOA estimates.

FIG. 33A shows a block diagram of an implementation MF330 of apparatus MF300. Apparatus MF320 includes means FB500 for displaying the calculated projection (e.g., as described herein with reference to task TB500). FIG. 33B shows a block diagram of an implementation MF340 of apparatus MF330. Apparatus MF340 includes means FB600 for determining an orientation of the audio sensing device with reference to an external reference axis (e.g., as described herein with reference to task TB600). Apparatus MF340 also includes an implementation FB510 of means FB500 configured to display the calculated projection based on the determined orientation. FIG. 33C shows a block diagram of an implementation MF350 of apparatus MF300 that includes an instance of means FB600 and an implementation FB310 of means FB300 that is configured to use an orientation determination as produced by means FB600 (e.g., device orientation matrix F) to project the DOA estimate into a plane that is defined with reference to the world coordinate system, such as the world reference plane (e.g., as described herein with reference to task TB310).

FIG. 33D shows a block diagram of an implementation A330 of apparatus A300 that includes a display B500 configured to display the calculated projection (e.g., as described herein with reference to task TB500). FIG. 33E shows a block diagram of an implementation A350 of apparatus A300 that includes an orientation sensor B600 configured to determine an orientation of the audio sensing device with reference to an external reference axis (e.g., as described herein with reference to task TB600). Apparatus A350 also includes an implementation B310 of projection calculator B300 that is configured to use an orientation determination as produced by sensor B600 (e.g., device orientation matrix F) to project the DOA estimate into a plane that is defined with reference to the world coordinate system, such as the world reference plane (e.g., as described herein with reference to task TB310). Display 500 may also be configured to display the calculated projection based on the determined orientation (e.g., as described herein with reference to task TB510).

Figure 34A:
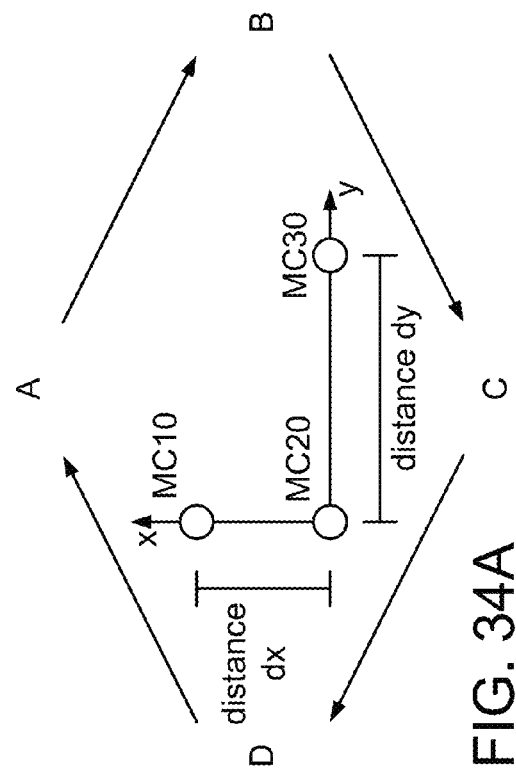
FIGS. 34A and 34B illustrate scenarios in which a source moves relative to a 2-D microphone array.
Figure 35:
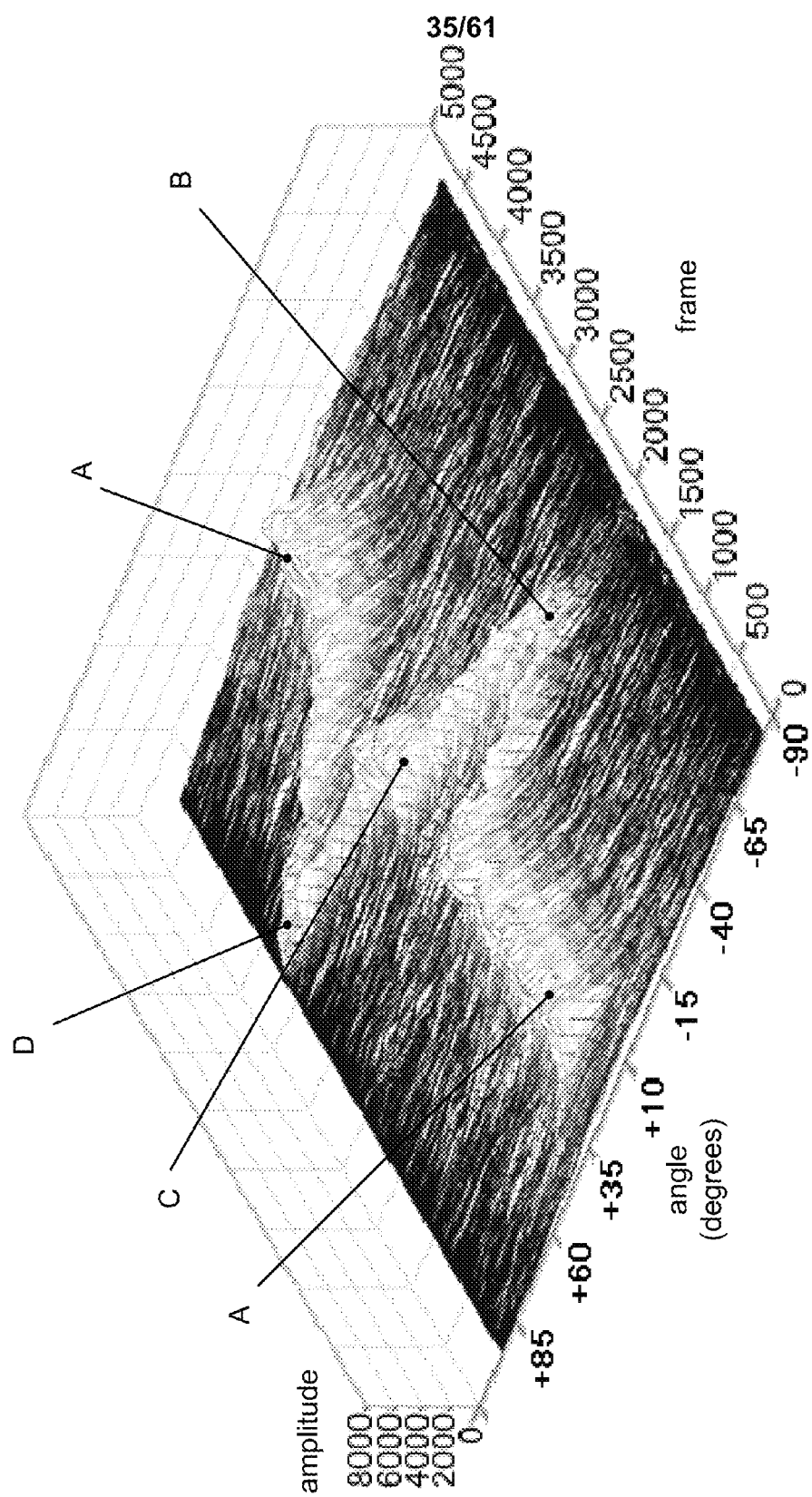
FIGS. 35 and 36 show examples of observations obtained with a 2-D microphone array in a scenario as shown in FIG. 34A.
Figure 36:
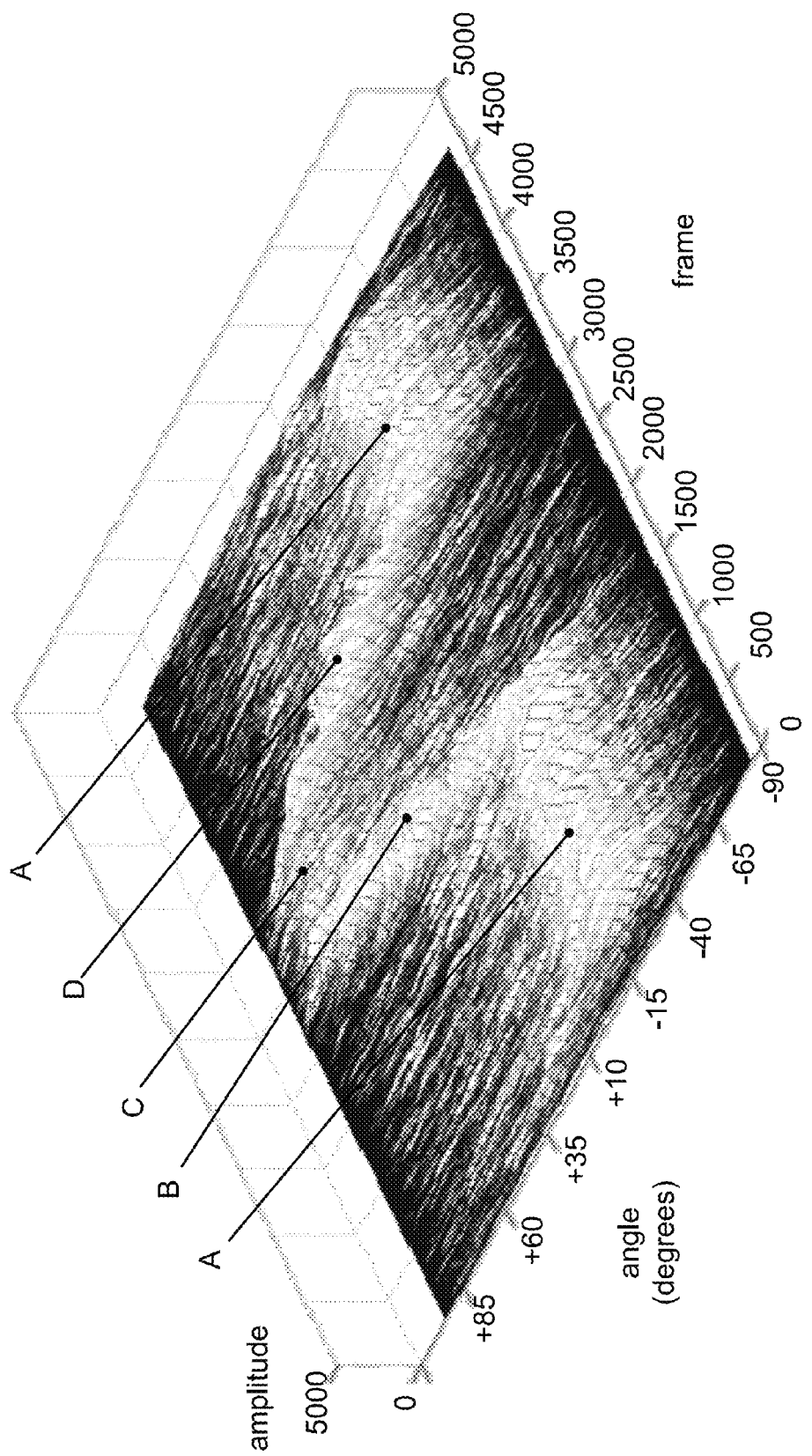

FIG. 34A illustrates a first scenario in which a source (e.g., a human speaker) moves among directions A-B-C-D relative to a 2-D microphone arrangement. FIGS. 35 and 36 show examples of observations obtained in such a scenario using instances of an implementation of method M10. In this example, FIG. 35 shows observations by the y-axis pair MC20-MC30, where distance dx is 3.6 centimeters; FIG. 36 shows observations by the x-axis pair MC10-MC20, where distance dy is 7.3 centimeters; and the inventory of DOA estimates covers the range of −90 degrees to +90 degrees at a resolution of five degrees.

It may be understood that when the source is in an endfire direction of a microphone pair, elevation of a source above or below the plane of the microphones limits the observed angle. Consequently, when the source is outside the plane of the microphones, it is typical that no real endfire is observed. It may be seen in FIGS. 35 and 36 that due to elevation of the source with respect to the microphone plane, the observed directions do not reach −90 degrees even as the source passes through the corresponding endfire direction (i.e., direction A for the x-axis pair MC10-MC20, and direction B for the y-axis pair MC20-MC30).

Figure 34B:
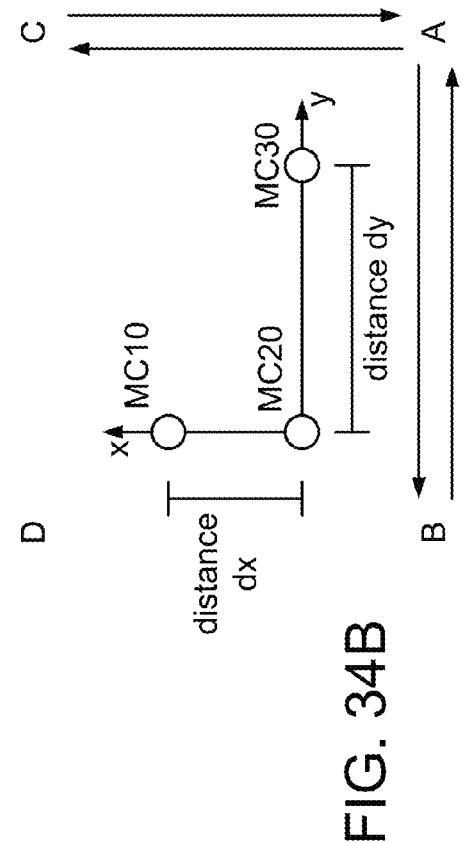
Figure 37:
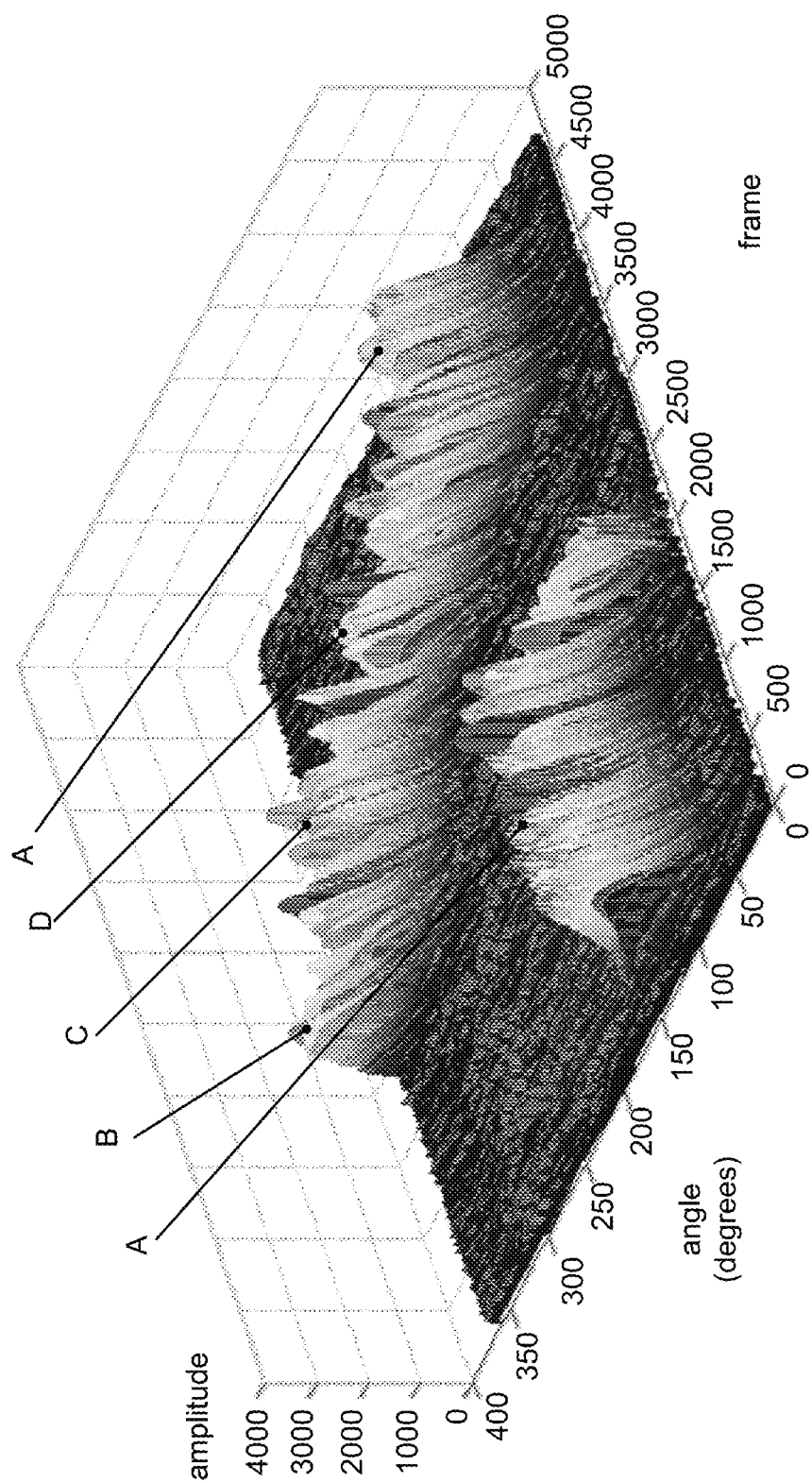
FIG. 37 shows an example in which observations as shown in FIGS. 35 and 36 are combined.
Figure 38:
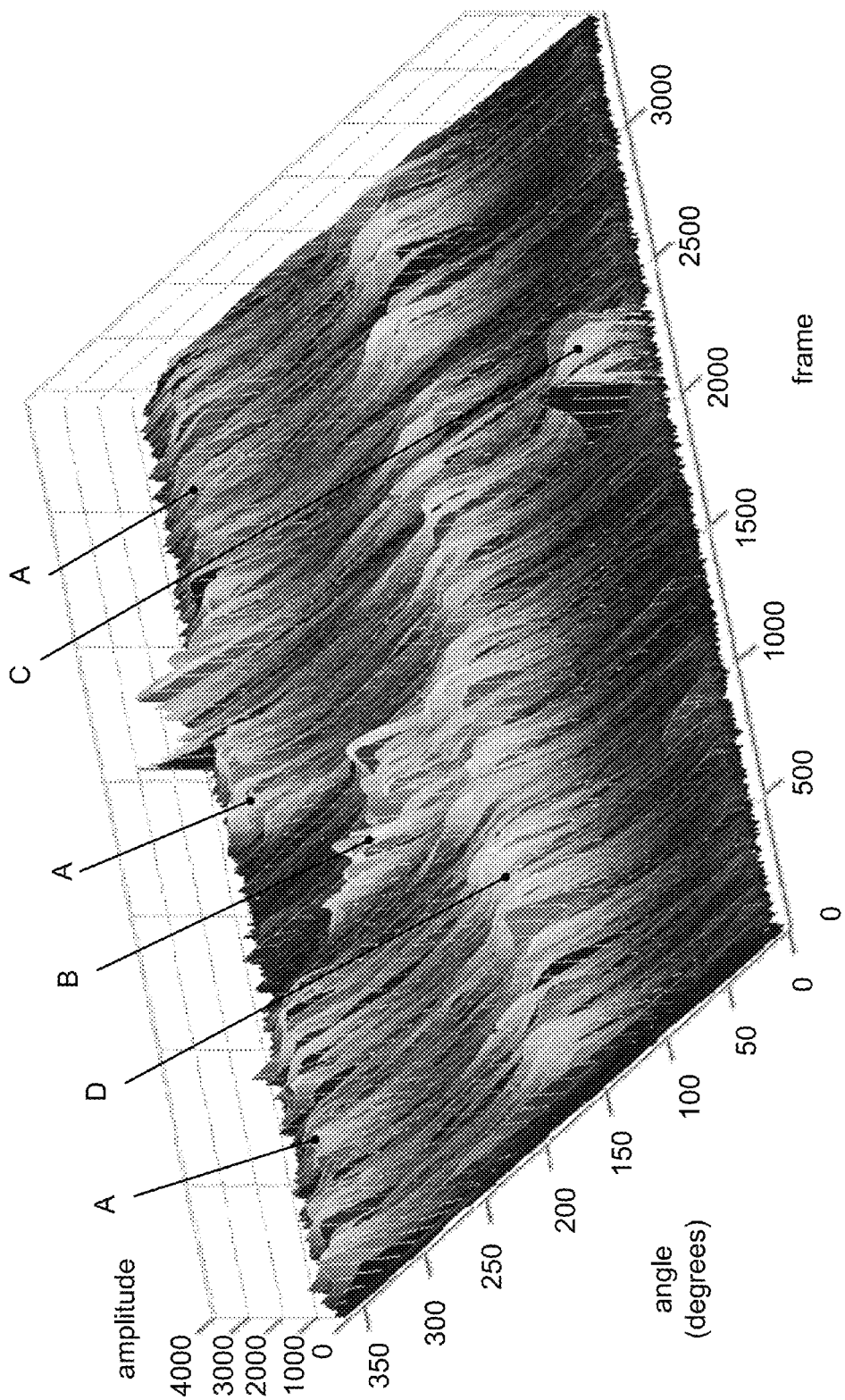
FIG. 38 shows an example in which observations in a scenario as shown in FIG. 34B are combined.

FIG. 37 shows an example in which observations from orthogonal axes over a range of +/−90 degrees, as shown in FIGS. 35 and 36 for a scenario as shown in FIG. 34A, are combined using instances of an implementation of method M200 to produce DOA estimates in the microphone plane over a range of zero to 360 degrees. In this example, a one-degree resolution is used. FIG. 38 shows an example in which observations from a 2-D microphone arrangement are combined using instances of an implementation of method M200, where distance dx is 3.6 centimeters and distance dy is 7.3 centimeters, to track movement of a source (e.g., a human speaker) among directions A-B-C as shown in FIG. 34B in the presence of another source (e.g., a stationary human speaker) at direction D.

As described above, a DOA estimate may be calculated based on a sum of likelihoods. When method M200 or M300 is used to combine observations from different microphone axes (e.g., as shown in FIG. 37), it may be desirable to perform the combination for each frequency bin rather than first calculating a combined direction for each axis, especially if more than one directional source may be present (e.g., two speakers, or a speaker and an interferer). Assuming that no more than one of the sources is dominant at each frequency bin, calculating a combined observation for each frequency component preserves the distinction between dominance of different sources at different corresponding frequencies. If a summation (e.g., a sum of likelihoods) over frequency bins dominated by different sources is performed on the observations before they are combined, then this distinction may be lost, and the combined observations may indicate spurious peaks at directions which do not correspond to the location of any actual source. For example, summing observations from orthogonal microphone pairs of a first source at 45 degrees and a second source at 225 degrees, and then combining the summed observations, may produce spurious peaks at 135 and 315 degrees in addition to the desired peaks at 45 and 225 degrees.

Figure 39:
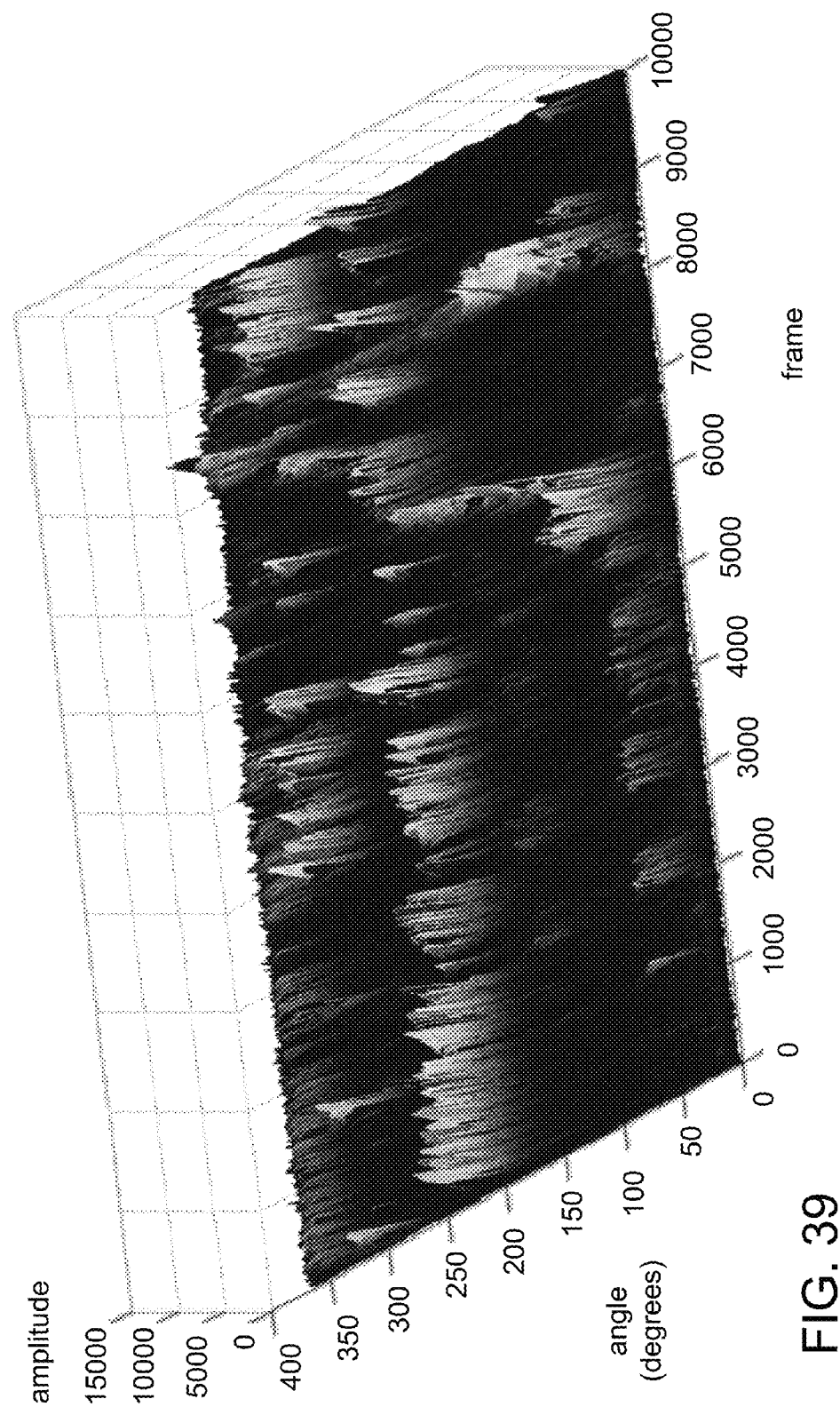
FIGS. 39 and 40 show an example of combined observations for a conference-call scenario as shown in FIG. 41.
Figure 40:
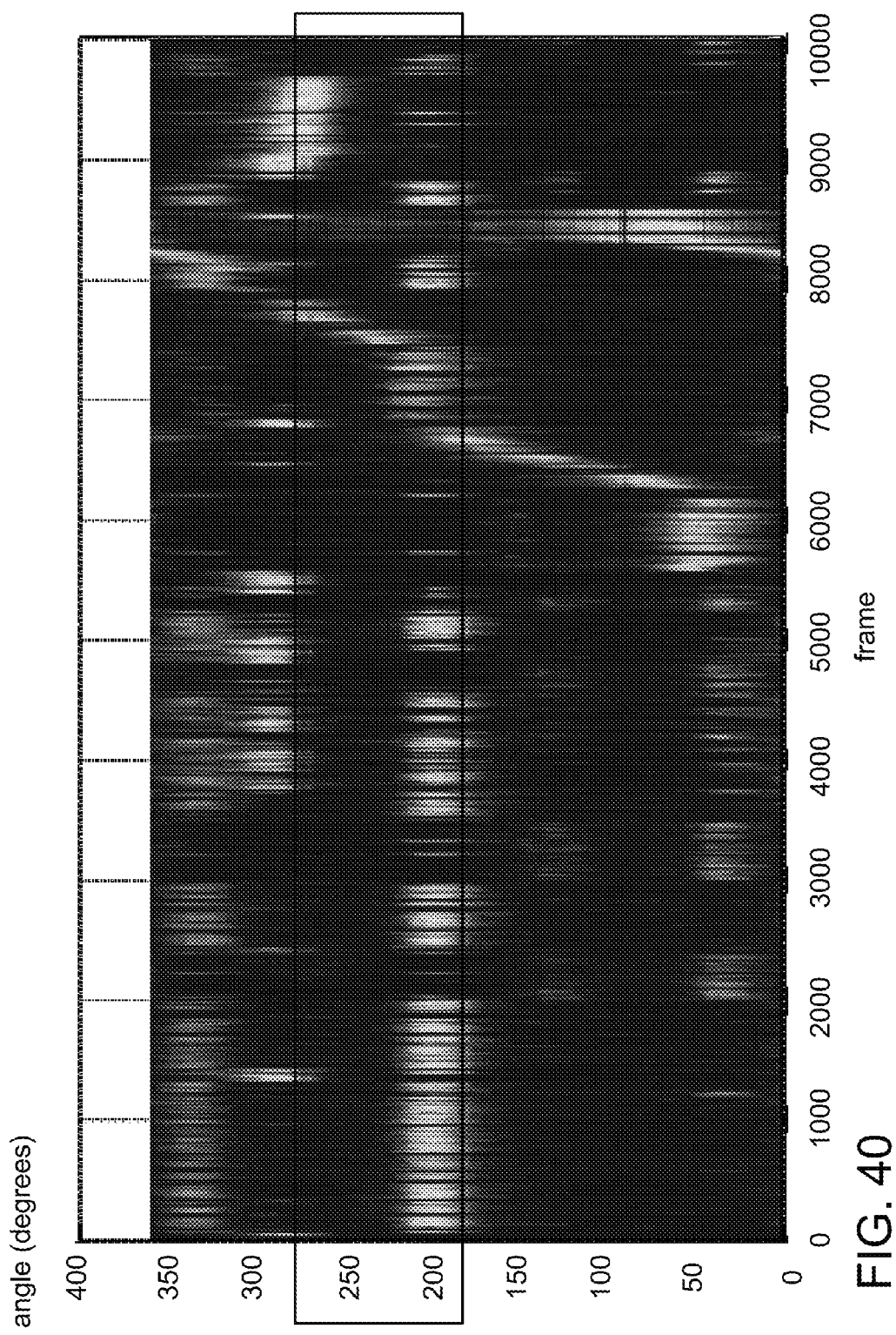
Figure 41:
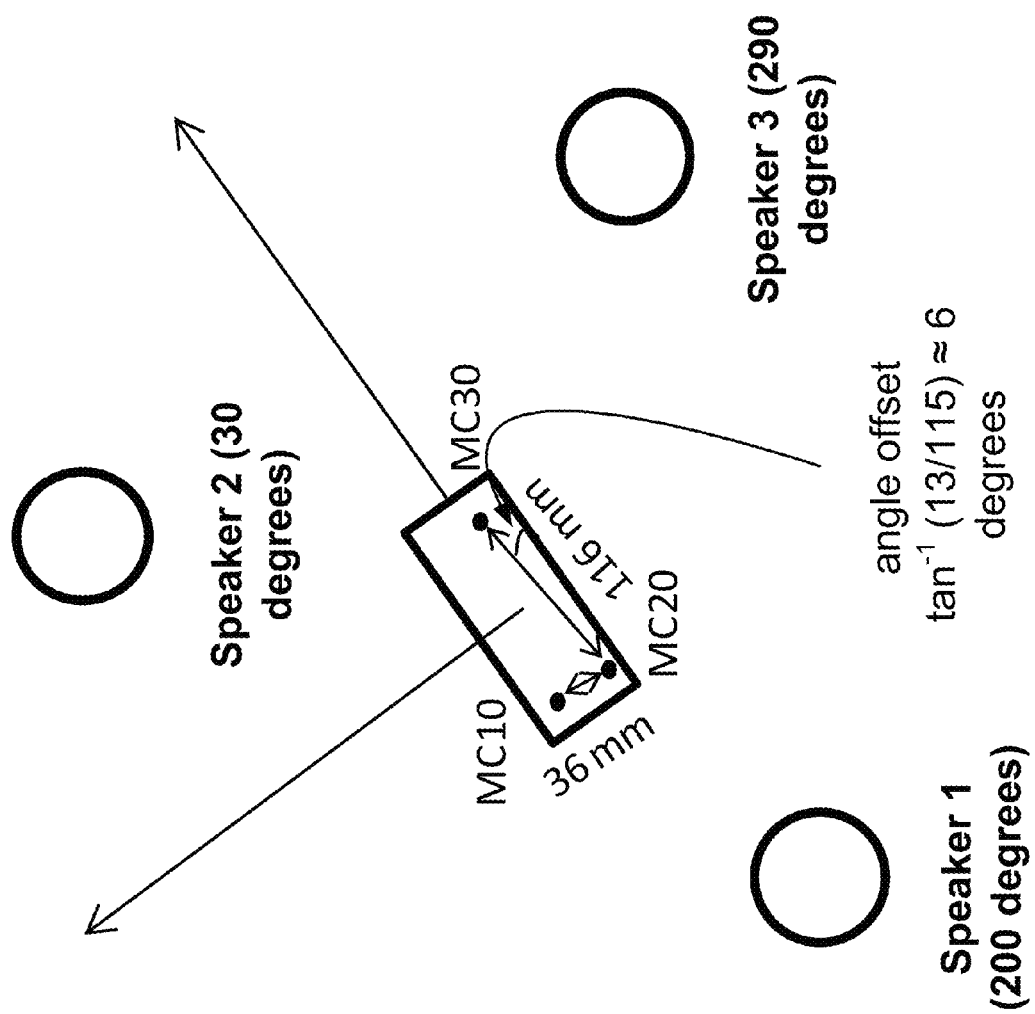

FIGS. 39 and 40 show an example of combined observations for a conference-call scenario, as shown in FIG. 41, in which the phone is stationary on a table top. At about frame 5500, speaker 1 stands up, and movement of speaker 1 is evident to about frame 9000. Movement of speaker 3 near frame 9500 is also visible. The rectangle in FIG. 40 indicates a target sector selection, such that frequency components arriving from directions outside this sector may be rejected or otherwise attenuated, or otherwise processed differently from frequency components arriving from directions within the selected sector. In this example, the target sector is the quadrant of 180-270 degrees and is selected by the user from among the four quadrants of the microphone plane. This example also includes acoustic interference from an air conditioning system.

Figure 42:
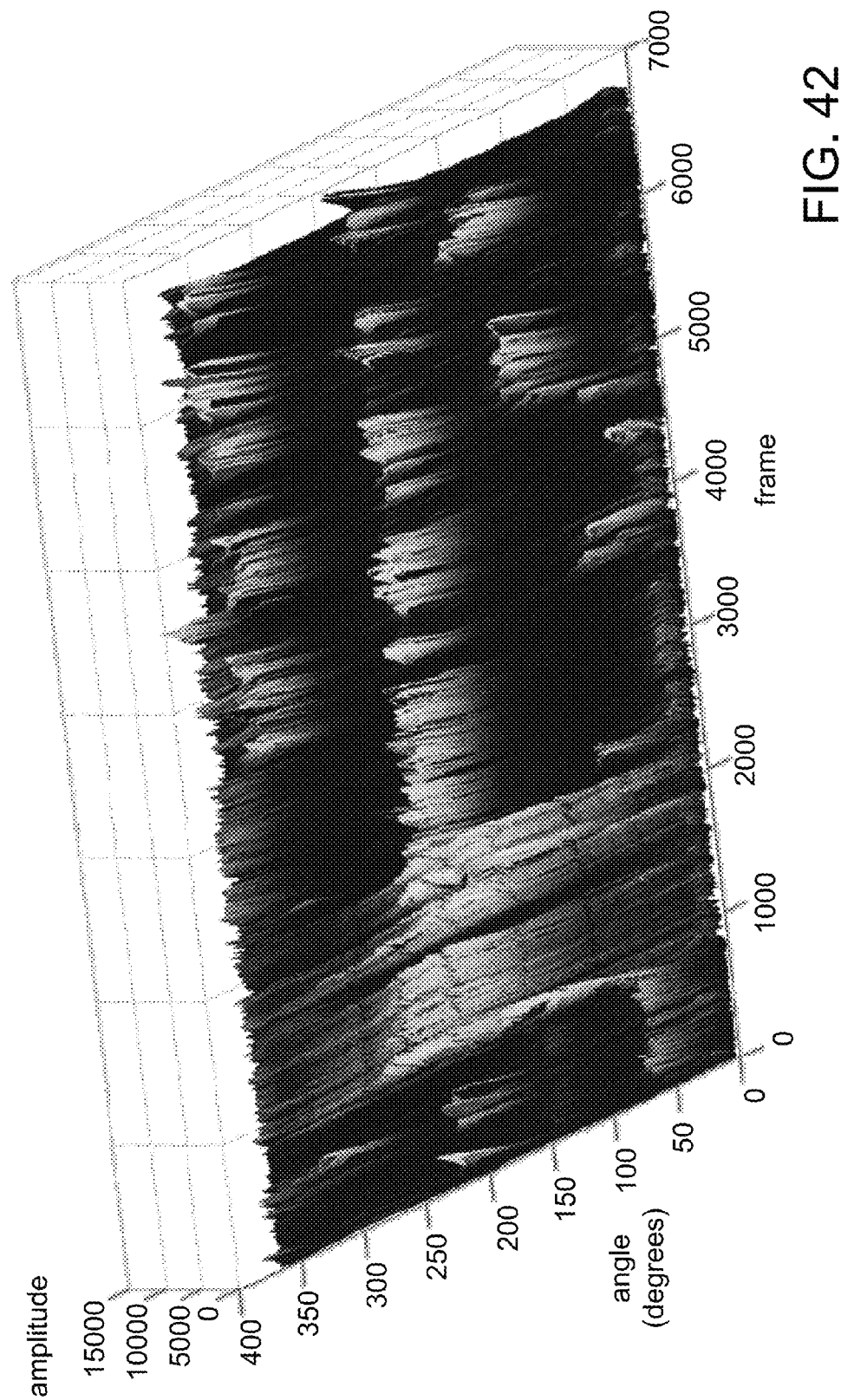
FIGS. 42 and 43 show an example of combined observations for a dynamic scenario as shown in FIG. 44A.
Figure 43:
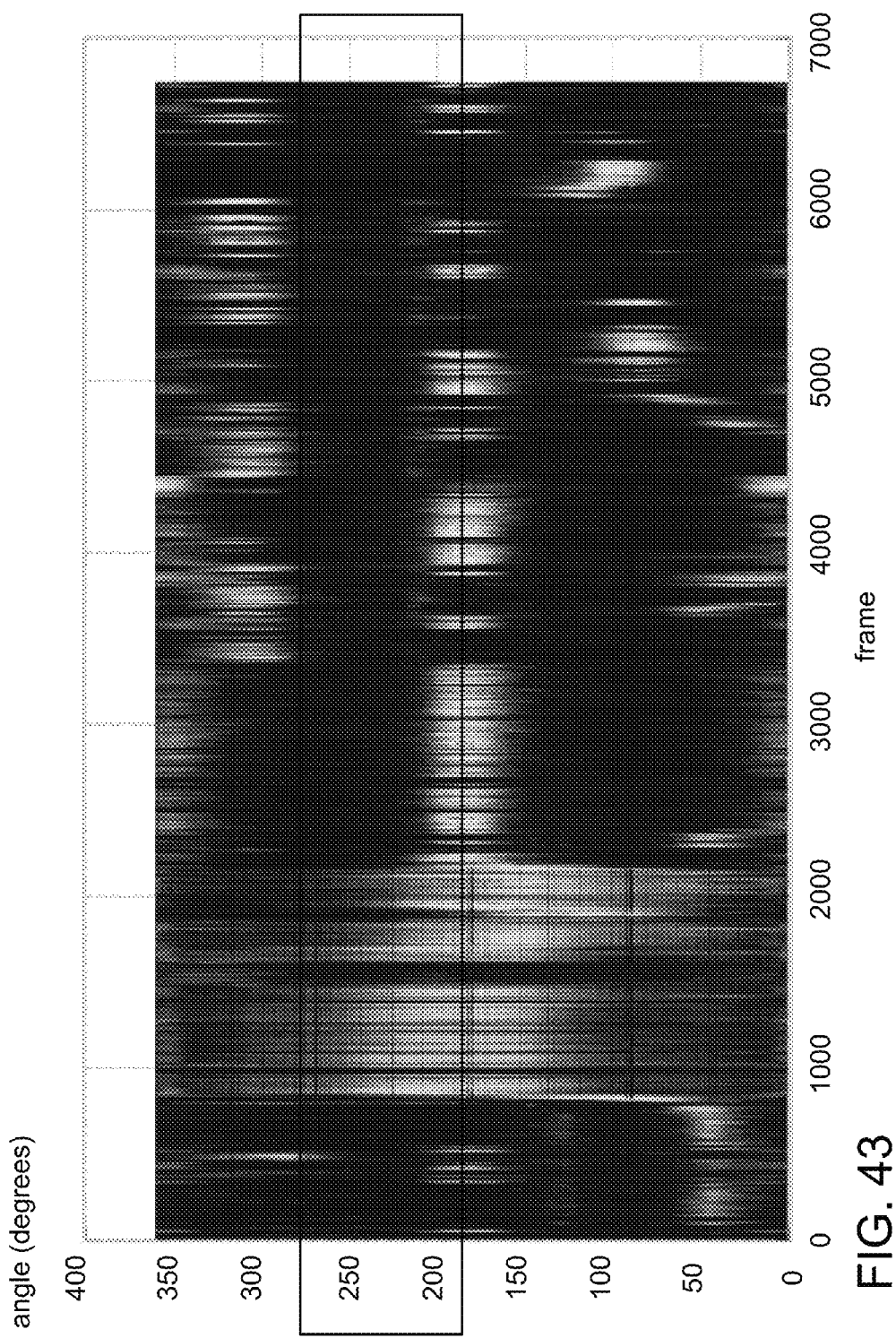
Figure 44:
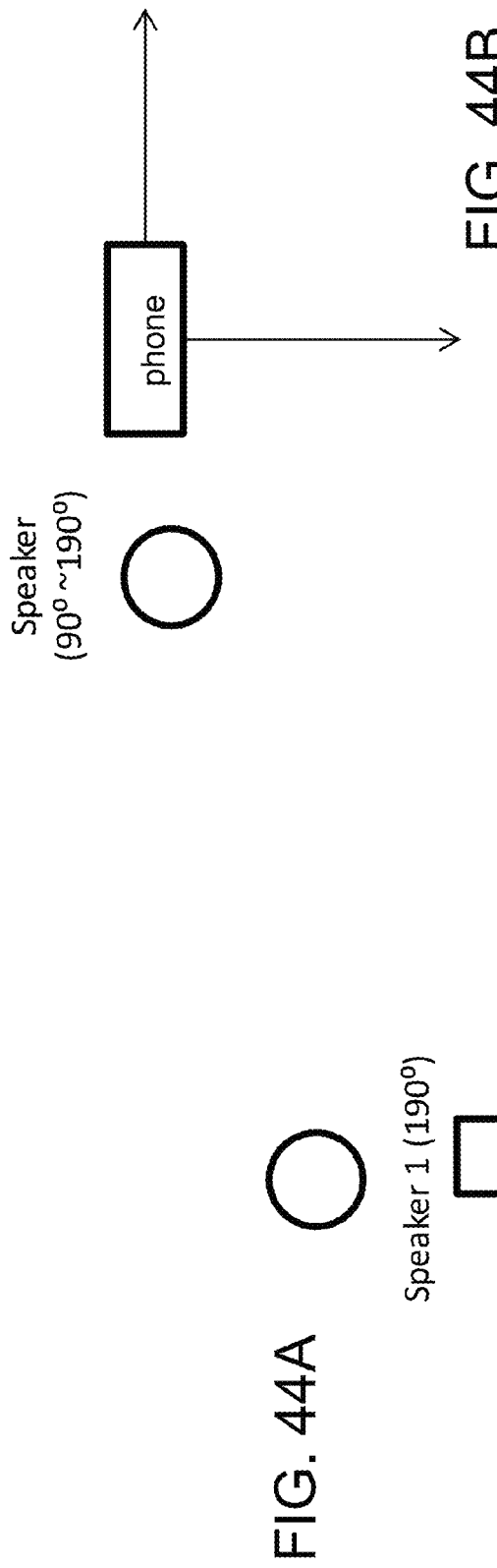

FIGS. 42 and 43 show an example of combined observations for a dynamic scenario, as shown in FIG. 44A. In this scenario, speaker 1 picks up the phone at about frame 800 and replaces it on the table top at about frame 2200. Although the angle span is broader when the phone is in this browsetalk position, it may be seen that the spatial response is still centered in a designated DOA. Movement of speaker 2 after about frame 400 is also evident. As in FIG. 40, the rectangle in FIG. 42 indicates user selection of the quadrant of 180-270 degrees as the target sector.

Figure 45:
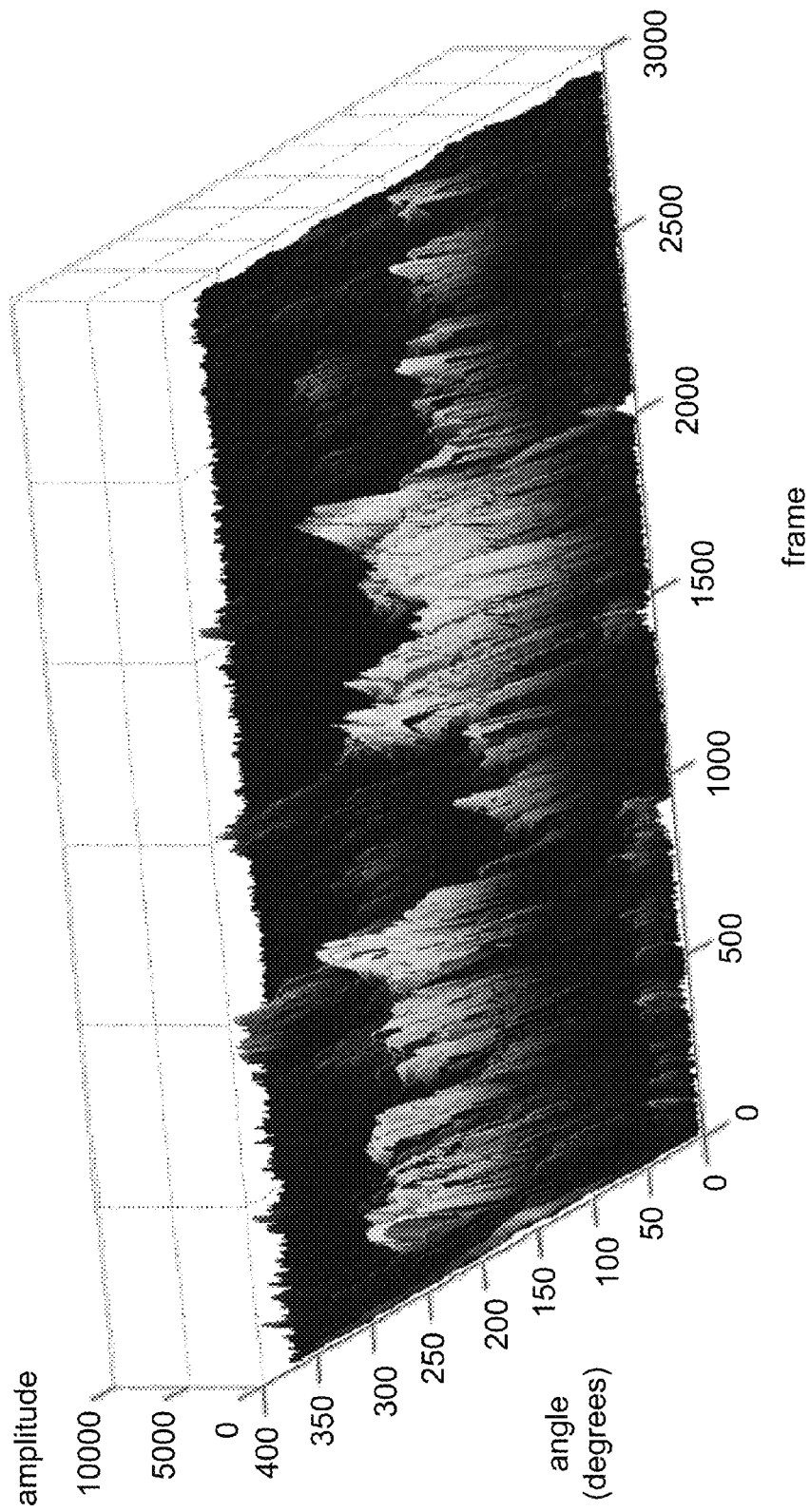
FIGS. 45 and 46 show an example of combined observations for a dynamic scenario with road noise as shown in FIG. 44B.
Figure 46:
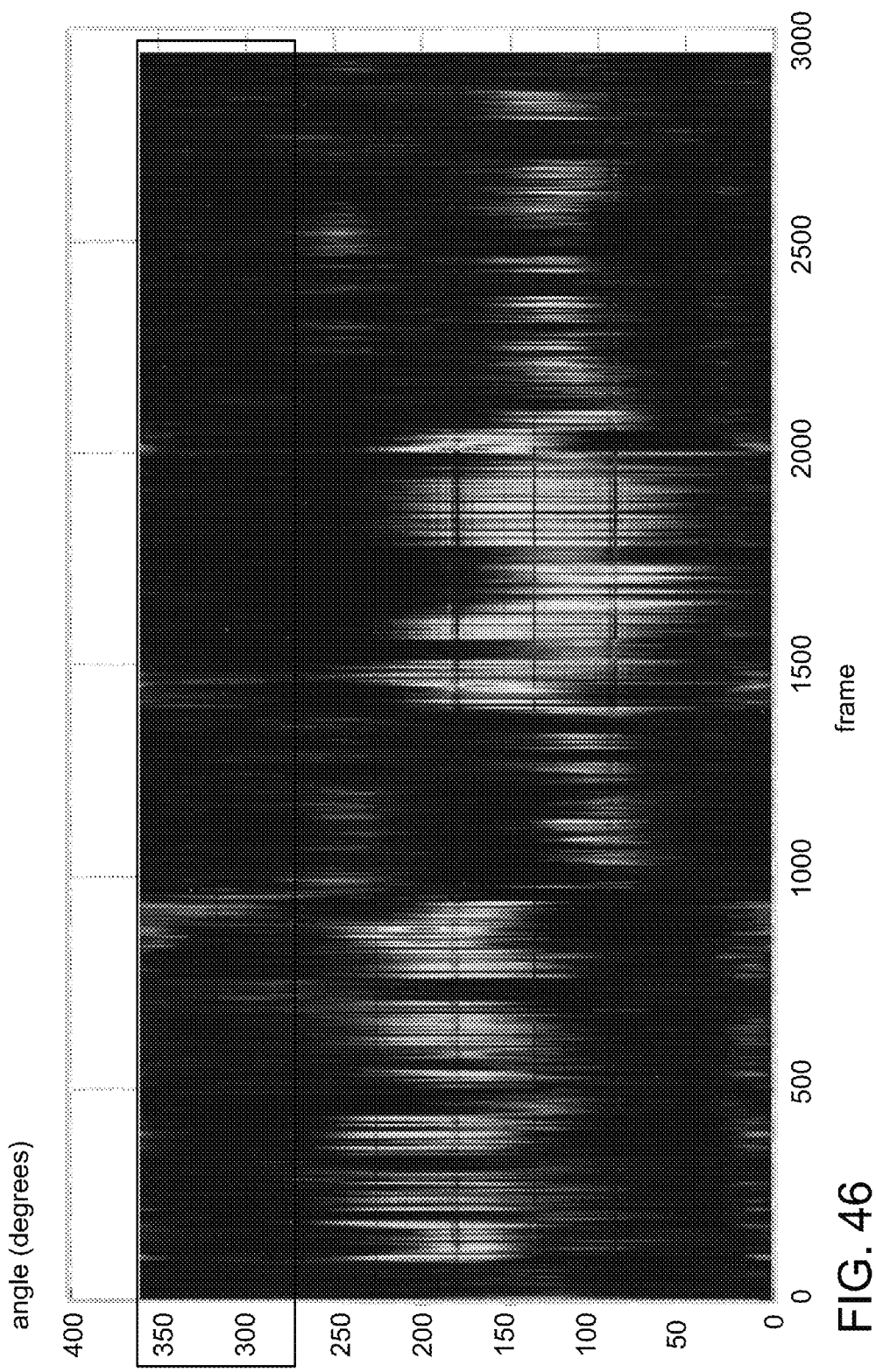
Figure 47:
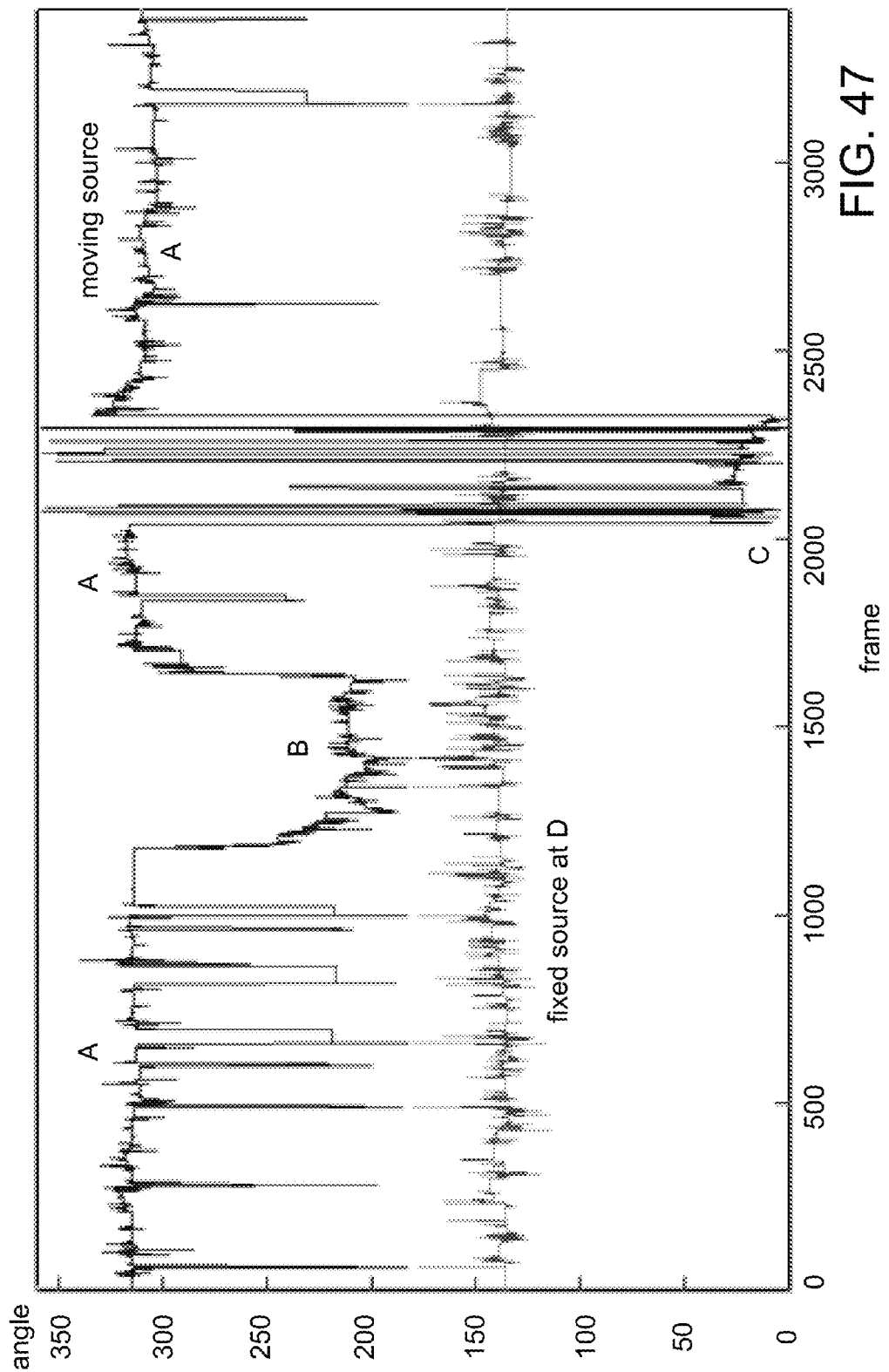
FIG. 47 shows an example of DOA tracking.

FIGS. 45 and 46 show an example of combined observations for a dynamic scenario with road noise, as shown in FIG. 44B. In this scenario, the speaker picks up the phone between about frames 200 and 100 and again between about frames 1400 and 2100. In this example, the rectangle in FIG. 46 indicates user selection of the quadrant of 270-360 degrees as an interference sector. FIG. 47 shows an example of DOA tracking as performed by an implementation of method M300 over a 360-degree range for a target and a moving interferer for a scenario as shown in FIGS. 34B and 38.

It may be desirable to use the directional capability of a microphone array to discriminate among sound components of the multichannel signal that arrive from different directions. For example, it may be desirable to apply a spatially directive filter (e.g., a beamformer and/or null beamformer) to the multichannel signal to concentrate the energies of sound components arriving from different directions into different corresponding output channels of the spatially directive filter and/or to attenuate energy of a sound component arriving from a particular direction.

For a one-dimensional (1-D) array of microphones, a direction of arrival (DOA) for a source may be easily defined as an angle relative to the axis of the array. It is easy to obtain a closed-form solution for this angle as a function of phase differences among the signals produced by the various microphones of the array, such that the same function applies as the angle changes (for example, from a case as shown in FIG. 48A to a case as shown in FIG. 48B).

As noted above, however, a 1-D array does not discriminate among signals that have the same angle of arrival but arrive from different directions in space (e.g., as shown in FIG. 16). In order to support discrimination between such source components, therefore, it may be desirable to use an array of microphones that extends into at least two dimensions.

For an array that includes more than two microphones at arbitrary relative locations (e.g., a non-coaxial array), it may be difficult or impractical to obtain a closed-form solution for the DOA, as a function of phase differences among the signals produced by the various microphones of the array, that remains valid across a range of angles (e.g., from a case as shown in FIG. 48C to a case as shown in FIG. 48D).

It may be desirable to update a spatially directive filter in response to a detected change in the angle of arrival of one or more of the source components over time. If the process of generating the filter coefficients is too complicated, however, it may not be practical to recalculate the filter coefficients in real time. Consequently, design of such a system for a non-coaxial array may include a tradeoff between the amount of storage needed to store different sets of filter coefficients and the number of such sets that are needed to support a desired spatial resolution. For a case in which it is desired to track three independent sources with a resolution of ten degrees in each of the x, y, and +z directions, for example, the corresponding number of different filter configurations is over 8700 (i.e., 3*180/10*180/10*90/10).

For an array that includes more than two microphones at arbitrary relative locations (e.g., a non-coaxial array), it may be desirable to use a straightforward extension of one-dimensional principles as described above. A key problem is how to apply spatial filtering to such a combination of pairwise 1-D DOA estimates. As described below, it may be desirable to use pairwise steering vectors based on robust 1-D DOA estimates to model the mixing matrix.

FIG. 49A shows a flowchart for a method MC100, according to a general configuration, for processing a multichannel audio signal that includes a first source component and a second source component. Method MC100 includes tasks TC100a, TC100b, and TC200. Task TC100a calculates a first angle of arrival, relative to an axis of a first pair of microphones, for the first source component and a first angle of arrival, relative to the axis of the first pair of microphones, for the second source component. Task TC100b calculates a second angle of arrival, relative to an axis of a second pair of microphones, for the first source component and a second angle of arrival, relative to the axis of the second pair of microphones, for the second source component. Based on the first angles of arrival and the second angles of arrival, task TC200 applies a spatially directive filter to the multichannel audio signal to produce an output signal.

Method MC100 may be implemented such that each channel of the multichannel signal is based on a signal produced by a corresponding microphone. For example, task TC100a may be implemented to calculate the first angles of arrival based on information from a first pair of channels of the multichannel audio signal, wherein each channel of the first pair of channels is based on a signal produced by a corresponding microphone of the first pair of microphones. Similarly, task TC100b may be implemented to calculate the second angles of arrival based on information from a second pair of channels of the multichannel audio signal, wherein each channel of the second pair of channels is based on a signal produced by a corresponding microphone of the second pair of microphones.

Task TC100a may be implemented to calculate the angle of arrival of each source component for each pair based on a difference between the channels. Examples of such differences between the channels include a gain difference or ratio, a time difference of arrival, and a phase difference (e.g., as described above with reference to method M10). For example, task TC100a may be implemented as two subtasks (i.e., one for each source component), where each subtask is an instance of any among method M10 (such that the angle of arrival is the candidate direction selected by task T30), method M20 (such that the angle of arrival is the candidate direction selected by task T300), method MA20 (such that the angle of arrival is the candidate direction selected by task TA300), method M25 (such that the angle of arrival is the direction of arrival indicated by task T400), method M30 (such that the angle of arrival is the candidate direction selected by task T35), method M100 (such that the angle of arrival is the candidate direction selected by task T350), and method M110 (such that the angle of arrival is the direction of arrival indicated by task T400). Task TC100b may be similarly implemented as two subtasks (i.e., one for each source component), where each subtask is an instance of any among methods M10, M20, MA20, M25, M30, M100, and M110.

Method MC100 may be extended arbitrarily to accommodate more source components and microphone pairs (with the number of microphone pairs P being at least equal to (N−1), where N is the number of source components). For example, tasks TC100a and TC100b may be extended to calculate, for each source component, an additional angle of arrival for each additional microphone pair, and an additional such instance of task TC100a or TC100b for each source component. For a case in which the device includes an orientation sensor as described herein (e.g., with reference to task TB600), task TC100a and/or TC100b may be implemented to select channels of the multichannel signal from among the available microphone channels according to a mapping that indicates which microphones are most likely to receive direct path signals, and/or to not be occluded, for the current determined orientation. If the device is face up on a table top, for example, a rear microphone may be occluded.

Figures 50A, 50B, 50C, 50D:
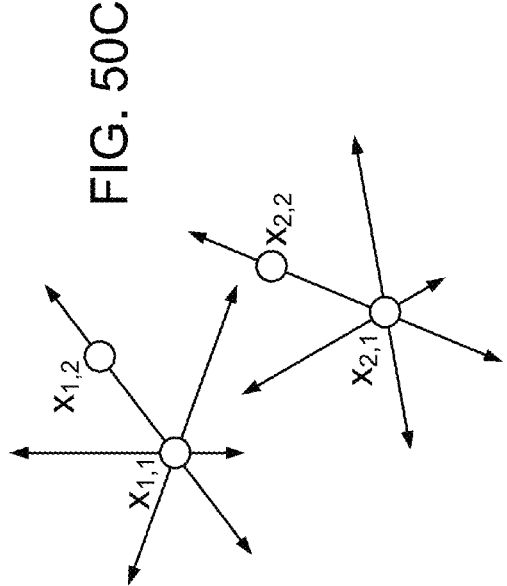
FIG. 50A shows a pairwise steering vector.
FIG. 50B shows index labels for elements of the vector of FIG. 50A.
FIG. 50C shows microphone pairs that are not coplanar.
FIG. 50D shows an example of an array steering matrix of pairwise steering vectors.

In a typical application (e.g., a speakerphone application), a direction of arrival of at least one source component among the first and second source components is outside (e.g., above) a plane defined by the axis of the first pair of microphones and the axis of the second pair of microphones (e.g., for coplanar pairs as shown in FIG. 49D). The microphone array may also be implemented such that one microphone of the first pair of microphones is also included in the second pair of microphones (e.g., as shown in FIG. 49E). In general, however, method MC100 is also applicable to pairs of microphones that do not lie in a common plane (e.g., as shown in FIG. 50C). The first number of the labels of the microphones in FIGS. 49D, 49E, and 50C indicates a pair index, and the second number indicates the index of the microphone within that pair. It may be seen that the common microphone in the array of FIG. 49E has two labels.

It may be desirable to implement task TC200 such that the spatially directive filter concentrates energy of the first source component into the output signal. For example, task TC200 may be implemented such that a proportion of energy of the first source component, relative to energy of the second source component, is greater in the output signal than in each channel of the multichannel audio signal (i.e., greater than in the first channel of the multichannel audio signal, greater than in the second channel of the multichannel audio signal, and greater than in the third channel of the multichannel audio signal). Task TC200 may also be implemented such that a proportion of energy of the second source component, relative to energy of the first source component, is less in the output signal than in each channel of the multichannel audio signal.

Task TC200 may be implemented to calculate the spatially directive filter (e.g., to calculate a set of filter coefficients of the spatially directive filter). FIG. 49B shows a flowchart of such an implementation TC202 of task TC200 that includes subtasks TC210, TC220, and TC230. Based on the calculated angles of arrival produced by tasks TC100a and TC100b, task TC210 calculates steering vectors for each pair of microphones and for each source component. Task TC220 inverts a matrix that is based on the steering vectors. Task TC230 applies the spatially directive filter, which is based on the inverted matrix, to the multichannel signal to produce the output signal.

The multichannel signal as produced by the microphone array (i.e., the microphone channel vector x) may be modeled as the product of a mixing matrix A (also called the array manifold matrix or the array steering matrix) and a vector y' of the source components. In such case, it may be desirable to solve the problem of recovering the source components by multiplying the vector x by an inverse $A^{-1}$ of the mixing matrix to produce a vector of spatially filtered channels $y \approx y'$.

It may be desirable to use a straightforward extension of robust one-dimensional DOA estimation principles as described above. In the case of a two-dimensional array of two pairs of microphones having axes in different directions, for example, it may be desirable to indicate the DOA of each source component in terms of the one-dimensional angles of arrival with respect to each of the two pair axes. In the case of a three-dimensional array of three pairs of microphones having axes in different directions and planes, it may be desirable to indicate the DOA of each source component in terms of the one-dimensional angles of arrival with respect to each of the three pair axes, and so on. A key problem is how to apply spatial filtering to such a combination of one-dimensional DOA estimates.

In one approach, the model $Ay'=x$ is combined with 1-D DOA estimation principles by using pairwise steering vectors to construct the array steering matrix A, where each steering vector is based on a corresponding angle of arrival. Task TC210 may be implemented to calculate, for each microphone pair p and each source component n, a corresponding pairwise steering vector as shown in FIG. 50A that is based on the angle of arrival $\theta_{n,p}$ of source component n with respect to the axis of pair p. In this example, the indices of the vector elements on the left-hand side are as labeled in FIG. 50B, and $l_p$ indicates the spacing between the microphones of pair p. It may be seen that this vector indicates a propagation delay of source component n at pair p (e.g., a phase delay of the source component as seen at microphone 1 of the pair, relative to the source component as seen at microphone 2 of the pair). FIG. 50D shows an example of an array steering matrix A of pairwise steering vectors for a case in which a three-microphone (i.e., two-pair) array is used to track three different sources.

Task TC220 inverts a matrix that is based on the steering vectors. Because the non-square matrix A shown in FIG. 50D is not invertible, task TC220 may be implemented to calculate a pseudoinverse $A^+$ of matrix A instead, where $A^+ = (A^H A)^{-1} A^H$, and $A^H$ denotes the conjugate transpose of matrix A. FIG. 51A shows an example of the expression $A^+ x = y$ for the matrix A shown in FIG. 50D. In this case, task TC230 may be configured to apply a spatially directive filter, whose coefficients are the first row of matrix $A^+$, to the microphone channel vector x (where each element corresponds to a microphone of the same label in, e.g., FIG. 49D, 49E, or 50C) to obtain an output signal $y_1$ in which energy of source component 1 is concentrated and energy of source component 2 is reduced. If desired, task TC230 may also be implemented to perform a corresponding filtering operation using the second row of matrix $A^+$ to obtain an output signal in which energy of source component 2 is concentrated and energy of source component 1 is reduced. As shown in FIG. 51B, such implementations of task TC200 may be generalized to an arbitrary number of sources N that is not greater than the number of microphones M and an arbitrary number of microphone pairs P that is not greater than (M−1).

FIGS. 51A and 51B show examples of a straightforward one-dimensional (1-D) pairwise beamforming-nullforming (BFNF) configuration for spatially selective filtering that is based on robust 1-D DOA estimation. As this approach is based on robust 1-D DOA estimation, complete knowledge of the microphone geometry is not required (e.g., knowledge of the spacing between the microphones of each pair may be sufficient), and DOA estimation using all microphones at the same time is also not required. Such an approach is well-suited for use with DOA estimates as produced by the methods described herein (e.g., any of methods M10, M20, MA20, M25, M30, M100, and M110), although tasks TC100 and TC100b may also be implemented to use any other 1-D DOA estimation method instead.

Method MC100 may be implemented to perform an instance of task TC200 for each frequency bin. In such case, the various instances of task TC200 may be implemented to use the calculated angles of arrival provided by tasks TC100a and TC100b and to produce a corresponding output signal for each frequency bin. One DOA may be fixed across all frequencies, or a slightly mismatched alignment across frequencies (e.g., from different respective instances of tasks TC100a and/or TC100b) may be permitted (e.g., +/−5, 6, 10, 12, or 15 degrees). If the microphone array includes more than one pair along an axis, task TC100a and/or task TC100b may be implemented to calculate angles of arrival from different pairs of channels (i.e., microphones along the same axis but having a different spacing) in different frequency bins. In such cases, the various instances of task TC200 may be implemented to use the calculated angles of arrival provided by tasks TC100a and TC100b for the corresponding frequency bin. For example, the various instances of task TC210 may be implemented to calculate the steering vectors using the DOA estimates from the appropriate microphone pairs for the corresponding frequency.

Method MC100 may be configured to process the multichannel signal as a series of segments (e.g., frames) as described above with reference to method M10. For example, task TC200 may be implemented to apply the same spatially directive filter to each of a sequence of frames of the multichannel signal. Method MC100 may also be implemented to update the spatially directive filter at some interval (e.g., every five, ten, or twenty frames) and/or in response to a change in an angle of arrival calculated by task TC100a or TC100b.

If the matrix $A^H A$ is ill-conditioned, its inversion may become unreliable. Matrix $A^H A$ may become ill-conditioned, for example, at frequencies that are close to the spatial aliasing frequency of the microphone pair (i.e., the frequency $f=c/2l_p$ whose wavelength is twice the distance $l_p$ between the microphones of the pair). FIG. 52A shows an example in which the pseudoinverse operation is modified such that task TC220 is implemented instead to invert a matrix obtained by adding the product of a regularization factor L>0 and the identity matrix to the matrix $A^H A$ (i.e., by adding the regularization value L>0 to each element of the diagonal of matrix $A^H A$). The value of L may be fixed or may change from one frame to another (e.g., based on the condition number and/or determinant of matrix $A^H A$).

Another approach to avoiding error caused by inversion of an ill-conditioned matrix is to normalize the product $A^+ x$ by $A^+ d_{max}$, where $d_{max}$ is the column $d_j$ of matrix A for which the product $A^+ d_j$ is maximum. FIG. 52B shows an example in which task TC220 is implemented to perform such a normalization of the regularized example as shown in FIG. 51A. Task TC220 may also be implemented to perform such normalization in the absence of regularization.

In some cases, it may be desirable to avoid the computational complexity of calculating a denominator for a normalization operation as described above. In such cases, task TC220 may be implemented to determine whether the matrix $A^H A$ is ill-conditioned. For example, task TC220 may determine that the matrix $A^H A$ is ill-conditioned if its condition number is large and/or the magnitude of its determinant is very small or zero. If the matrix is ill-conditioned, such an implementation of task TC220 bypasses one of the microphone channels (e.g., a channel corresponding to a primary microphone of the sensing device, or to a microphone otherwise expected to receive the user's voice most directly) for that frequency bin for use as the output signal for that bin, while continuing to apply corresponding spatially directive filters to produce the output signal for other frequency bins in which the matrix $A^H A$ is not ill-conditioned.

It may be understood that for a case in which one of the microphones is common to more than one pair (e.g., as shown in the array of FIG. 49E), the pairwise array steering matrix A (e.g., as shown in FIG. 50D) will include a redundant row. It may be desirable to implement task TC220 to overlap steering vectors in matrix A to remove redundant rows. FIGS. 53A-D and 54A-D show two different examples of such overlapping that differ according to the sign convention used in calculating the angle of arrival for one of the pairs. In the first example, the angle of arrival of a source component arriving at microphone MC20 before microphone MC10 is assigned a positive sign as shown in FIG. 53C and as indicated in FIG. 53B. In this case, the second and fourth rows of the matrix A in FIG. 53A correspond to the same microphone channel, and the steering vectors are overlapped at the second row to produce the matrix A shown in FIG. 53D. In the second example, the angle of arrival of a source component arriving at microphone MC20 before microphone MC10 is assigned a negative sign as shown in FIG. 54C and as indicated in FIG. 54B. In this case, the second and fourth rows of the matrix A in FIG. 54A correspond to the same microphone channel, and the steering vectors are overlapped at the second row to produce the matrix A shown in FIG. 54D. Although such overlapping may not always cause matrix A to become square, it may be understood that for a case in which matrix A is square, task TC220 may be implemented to use a technique for calculating the inverse $A^{-1}$ other than the pseudoinverse (e.g., Gauss-Jordan elimination, LU decomposition, etc.). FIG. 55A shows several examples of other microphone array configurations in which pairwise steering vectors may be similarly overlapped at common microphone channels.

Task TC200 may also be implemented to use a pairwise model for matrix A as described above to apply other beamforming approaches, such as adaptive and/or superdirective beamforming techniques. FIG. 55B shows an example of a pair-wise (PW) normalized MVDR (minimum variance distortionless response) BFNF, in which the manner in which the steering vector (array manifold vector) is obtained differs from the conventional approach. In this case, a common channel is eliminated due to sharing of a microphone between the two pairs (e.g., the microphone labeled as $x_{1,2}$ and $x_{2,1}$ in FIG. 49E). The noise coherence matrix $\Gamma$ may be obtained either by measurement or by theoretical calculation using a sinc function. It is noted that the BFNF examples described herein may be generalized to an arbitrary number of sources N such that N<=M, where M is the number of microphones.

Alternatively, task TC200 may be implemented to select from among a plurality of spatially directive filters, based on the calculated angles of arrival. In such case, task TC200 may be implemented to select a filter according to the pair of first and second angles of arrival for each source. FIG. 49C shows a flowchart of such an implementation TC204 of task TC200 that includes subtasks TC240 and TC250. Based on the first and second angles of arrival from tasks TC100a and TC100b, task TC240 selects the spatially directive filter from among a plurality of spatially directive filters (e.g., selects a set of filter coefficients from among a plurality of sets of filter coefficients). Task TC250 applies the selected spatially directive filter to the multichannel audio signal to produce the output signal.

In method MC100 as described above, the angles of arrival for each source component and each microphone pair are calculated based on information from the multichannel signal. An alternative method uses the same principles for selecting or calculating the spatially directive filter, but in this case the desired angles of arrival are otherwise provided. The same principles may also be used to produce a beamformer and/or nullformer for a loudspeaker array in two or more dimensions, based on desired angles of departure for each source component with respect to the axes of each of two or more loudspeaker pairs. In general, it may be desirable to apply the principles described herein to obtain a method for spatially directive filtering based on specified one-dimensional angles of arrival.

FIG. 56A shows a flowchart of a method MD100 of processing a multichannel signal according to such a general configuration that includes tasks TD100, TD200, and TD300. Task TD100 calculates a plurality of steering vectors (e.g., as described herein with reference to task TC210). The plurality of steering vectors includes a first steering vector that is based on a first designated angle of arrival (or departure) relative to an axis of a first pair of transducers, a second steering vector that is based on a second designated angle of arrival (or departure) relative to the axis of the first pair of transducers, a third steering vector that is based on a first designated angle of arrival (or departure) relative to an axis of a second pair of transducers, and a fourth steering vector that is based on a second designated angle of arrival (or departure) relative to the axis of the second pair of transducers. Task TD200 inverts a matrix that is based on the plurality of steering vectors (e.g., as described herein with reference to task TC220). Task TD300 applies a spatially directive filter that is based on the inverted matrix to the multichannel signal (e.g., as described herein with reference to task TC230).

For a case in which the transducers are microphones, such a method may be used for microphone beamforming and/or nullforming. In such case, method MD100 may be implemented to receive an angle of arrival relative to each pair axis, or alternatively may be configured to calculate pairwise angles of arrival from a given DOA in space (e.g., by performing an inverse of a projection as described above with reference to FIG. 20A-20E or 22A-22E). For a case in which the transducers are loudspeakers, such a method may be used for loudspeaker beamforming and/or nullforming. In such case, method MD100 may be implemented to receive an angle of departure relative to each pair axis, or alternatively may be configured to calculate pairwise angles of departure from a given beam direction in space (e.g., by performing an inverse of a projection as described above).

A pairwise beamforming/nullforming (PWBFNF) scheme, as described herein with reference to implementations of methods MC100 and MD100, may be used for suppressing direct paths of interferers up to the available degrees of freedom. Applications for such methods include instantaneous suppression (e.g., suppression of non-stationary noise) without a smooth trajectory assumption, using directional masking to obtain additional noise-suppression gain, and using bandwidth extension to obtain additional noise-suppression gain. Single-channel post-processing (e.g., of a quadrant framework) may be used for stationary noise and noise-reference handling (e.g., calculating a noise reference by time-averaging inactive frames).

It may be desirable to obtain instantaneous suppression but also to minimize artifacts such as musical noise. It may be desirable to maximally use the available degrees of freedom for BFNF. For a case of two microphone pairs, one desired source, and one directional interferer, for example, method MC100 or MD100 may be implemented to provide a wider null by directing the remaining column of an array steering matrix as shown in FIG. 50D to angles that are close to but different from the angles of arrival of the interferer (e.g., five or ten degrees away), or to direct two columns of the matrix to angles of arrival on each side of the interferer to provide a wider null centered in the interferer's direction.

Methods MC100 and MD100 may be implemented to filter each frame separately, or a feed-forward network may be implemented. The BFNF may be set for all frequencies in the range up to the Nyquist rate (e.g., except ill-conditioned frequencies). A natural masking approach may be used (e.g., to obtain a smooth natural seamless transition of aggressiveness), such that the dynamic range of the filter is greater when the desired target source (e.g., the first source component) is strong and lesser when the desired target source is weak.

As noted above, task T400 (e.g., of methods M25 and M110) may be implemented to indicate a direction of arrival (e.g., an angle of arrival) for each among more than one source. For example, task T400 may be implemented to calculate a distribution (e.g., a histogram) that indicates, for each candidate direction, the number of frequency bins at which the candidate direction is selected, and to indicate the source directions as the modes of this distribution. Such a task may include indicating a source direction as the peak, mean, or center of gravity of each cluster in the distribution, where the sample point at each frequency bin is the directional error (alternatively, the likelihood) of the selected candidate direction. Each among tasks TB100a and TB100b of implementations of methods M200 and M300 as described herein may be implemented to include an instance of such an implementation of task T400. Likewise, each among tasks TC100a and TC100b of implementations of method MC100 as described herein may be implemented to include an instance of such an implementation of task T400, in which case it may be desirable to limit the maximum number of source directions to the number of columns in the array steering matrix. Such clustering may also be used to partition the set F into a different set of frequency components for each active source (e.g., into disjoint sets) for use in other processing operations.

FIG. 56B shows a block diagram of an apparatus MFC100, according to a general configuration, for processing a multichannel audio signal that includes a first source component and a second source component. Apparatus MFC100 includes means FC100a for calculating a first angle of arrival, relative to an axis of a first pair of microphones, for the first source component and a first angle of arrival, relative to the axis of the first pair of microphones, for the second source component (e.g., as described herein with reference to task TC100a). Apparatus MFC100 also includes means FC100b for calculating a second angle of arrival, relative to an axis of a second pair of microphones, for the first source component and a second angle of arrival, relative to the axis of the second pair of microphones, for the second source component (e.g., as described herein with reference to task TC100b). Each among means FC100a and FC100b may be implemented as two submeans (i.e., one for each source component), where each submeans is an instance of any among apparatus MF5, MF10, and MF15, for example. Apparatus MFC100 also includes means FC200 for applying, based on the first angles of arrival and the second angles of arrival, a spatially directive filter to the multichannel audio signal to produce an output signal (e.g., as described herein with reference to task TC200).

FIG. 56C shows a block diagram of an implementation FC202 of means FC200. Means FC202 includes means TC210 for calculating steering vectors for each pair of microphones and for each source component, based on the calculated angles of arrival produced by means FC100a and FC100b. Means FC202 also includes means FC220 for inverting a matrix that is based on the steering vectors. Means FC202 also includes means FC230 for applying the spatially directive filter, which is based on the inverted matrix, to the multichannel signal to produce the output signal.

FIG. 56D shows a block diagram of an implementation FC204 of means FC200. Means FC204 includes means FC240 for selecting the spatially directive filter from among a plurality of spatially directive filters (e.g., selecting a set of filter coefficients from among a plurality of sets of filter coefficients), based on the first and second angles of arrival from means FC100a and FC100b. Means FC204 also includes means FC250 for applying the selected spatially directive filter to the multichannel audio signal to produce the output signal.

Figure 57B:
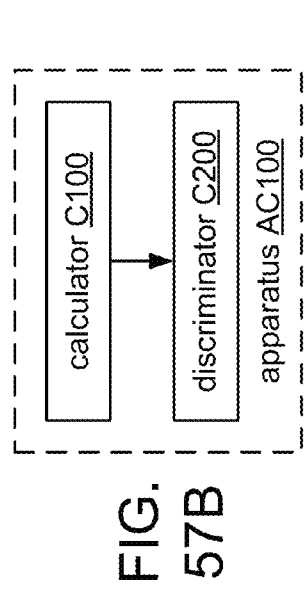
FIG. 57B shows a block diagram of an apparatus AC100 according to a general configuration.
Figure 57C:
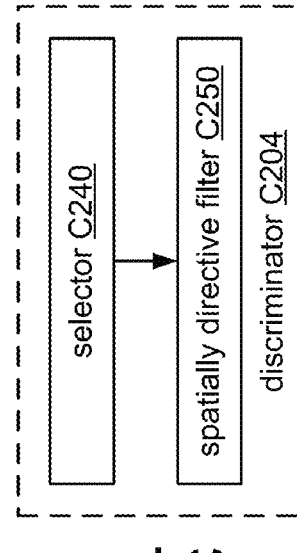
FIG. 57C shows a block diagram of an implementation C204 of discriminator C200.
Figure 57D:
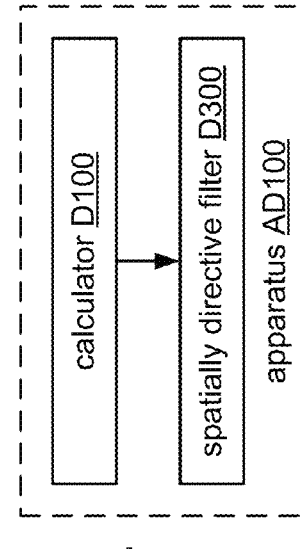
FIG. 57D shows a block diagram of an apparatus AD100 for processing a multichannel signal according to a general configuration.
Figure 57A:
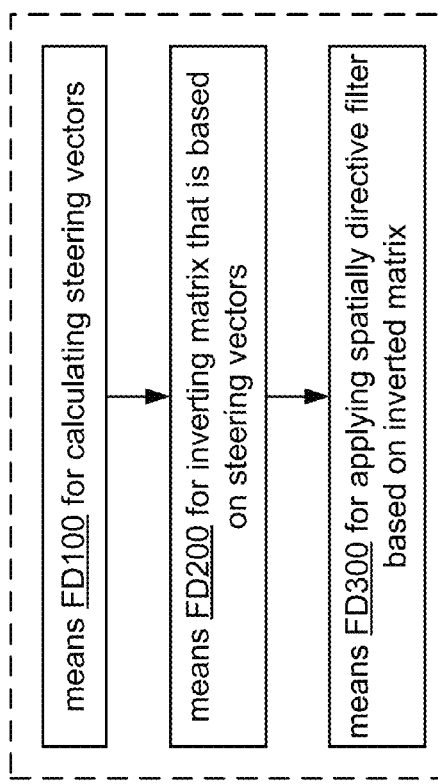
FIG. 57A shows a block diagram of an apparatus MFD100 for processing a multichannel signal according to a general configuration.

FIG. 57A shows a block diagram of an apparatus MFD100 for processing a multichannel signal according to a general configuration. Apparatus MFD100 includes means FD100 for calculating a plurality of steering vectors (e.g., as described herein with reference to task TC210). The plurality of steering vectors includes a first steering vector that is based on a first designated angle of arrival (or departure) relative to an axis of a first pair of transducers, a second steering vector that is based on a second designated angle of arrival (or departure) relative to the axis of the first pair of transducers, a third steering vector that is based on a first designated angle of arrival (or departure) relative to an axis of a second pair of transducers, and a fourth steering vector that is based on a second designated angle of arrival (or departure) relative to the axis of the second pair of transducers. Apparatus MFD100 also includes means FD200 for inverting a matrix that is based on the plurality of steering vectors (e.g., as described herein with reference to task TC220). Apparatus MFD100 also includes means FD300 for applying a spatially directive filter that is based on the inverted matrix to the multichannel signal (e.g., as described herein with reference to task TC230). Apparatus MFD100 may be implemented to receive an angle of arrival relative to each pair axis, or alternatively may be configured to calculate pairwise angles of arrival from a given DOA in space (e.g., by performing an inverse of a projection as described above with reference to FIG. 20A-20E or 22A-22E).

FIG. 57B shows a block diagram of an apparatus AC100, according to a general configuration, for processing a multichannel audio signal that includes a first source component and a second source component. Apparatus AC100 includes a calculator C100 configured to calculate a first angle of arrival, relative to an axis of a first pair of microphones, for the first source component and a first angle of arrival, relative to the axis of the first pair of microphones, for the second source component (e.g., as described herein with reference to task TC100a). Calculator C100 is also configured to calculate a second angle of arrival, relative to an axis of a second pair of microphones, for the first source component and a second angle of arrival, relative to the axis of the second pair of microphones, for the second source component (e.g., as described herein with reference to task TC100b). Calculator C100 may be implemented as instances (i.e., for each microphone pair and for each source component) of any among apparatus A5, A10, and A15, for example. Apparatus AC100 also includes a discriminator C200 configured to apply, based on the first angles of arrival and the second angles of arrival, a spatially directive filter to the multichannel audio signal to produce an output signal (e.g., as described herein with reference to task TC200).

FIG. 57C shows a block diagram of an implementation C204 of discriminator C200 that includes a selector C240 and a spatially directive filter C250. Selector C240 is configured to select spatially directive filter C250 from among a plurality of spatially directive filters (e.g., to select the filter coefficients of spatially directive filter C250 from among a plurality of sets of filter coefficients), based on the first and second angles of arrival from calculator C100. Spatially directive filter C250 is configured to filter the multichannel audio signal (e.g., according to the selected set of filter coefficients) to produce the output signal.

FIG. 57D shows a block diagram of an apparatus AD100 for processing a multichannel signal according to a general configuration. Apparatus AD100 includes a calculator D100 configured to calculate a plurality of steering vectors (e.g., as described herein with reference to task TC210). The plurality of steering vectors includes a first steering vector that is based on a first designated angle of arrival (or departure) relative to an axis of a first pair of transducers, a second steering vector that is based on a second designated angle of arrival (or departure) relative to the axis of the first pair of transducers, a third steering vector that is based on a first designated angle of arrival (or departure) relative to an axis of a second pair of transducers, and a fourth steering vector that is based on a second designated angle of arrival (or departure) relative to the axis of the second pair of transducers. Calculator D100 is also configured to invert a matrix that is based on the plurality of steering vectors (e.g., as described herein with reference to task TC220). Apparatus AD100 also includes a spatially directive filter D300 that is based on the inverted matrix (e.g., as described herein with reference to task TC230) and is arranged to filter the multichannel signal to produce an output signal. Apparatus AD100 may be implemented to receive an angle of arrival relative to each pair axis, or alternatively may be configured to calculate pairwise angles of arrival from a given DOA in space (e.g., by performing an inverse of a projection as described above with reference to FIG. 20A-20E or 22A-22E). In another example, discriminator C200 is implemented as an instance of apparatus AD100.

FIG. 58A shows a flowchart for one example of an integrated method as described herein. This method includes inventory matching for phase delay estimation, error calculation to obtain DOA error values, dimension-matching and/or pair-selection, and mapping DOA error for the selected DOA candidate to a source activity likelihood estimate. Such operations may be performed, for example, by an implementation of method M20, MA20, M25, M30, M100, or M110 as described herein. The pair-wise DOA estimation results may also be used to track one or more active speakers (e.g., using an implementation of method M200 or M300 as described herein), to perform a pair-wise spatial filtering operation (e.g., using an implementation of method MC100 or MD100 as described herein), and or to perform time- and/or frequency-selective masking. The activity likelihood estimation and/or spatial filtering operation may also be used to obtain a noise estimate to support a single-channel noise suppression operation.

Figure 57E:
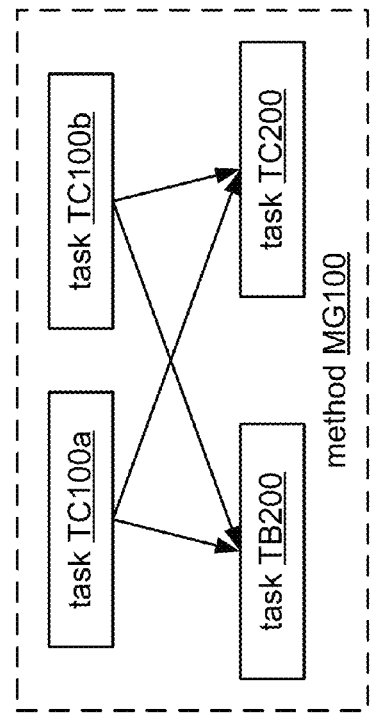
FIG. 57E shows a flowchart of an integrated method MG100 according to a general configuration.

FIG. 57E shows a flowchart of an integrated method MG100 according to a general configuration that is an implementation of method M200 (e.g., method M300) and also of method MC100. Method MG100 includes instances of tasks TC100a, TC100b, TB200, and TC200 as described herein. FIG. 58B shows a flowchart of an implementation MG110 of method MG100 in which each of tasks TC100a and TC100b is implemented as a respective instance M20a, M20b of an implementation of method M20 (e.g., M25, M30, M100, or M110) as described herein. FIG. 58C shows a flowchart of an implementation MG120 of method MG110 that includes multiple instances TB200a, TB200b of task TB200 (e.g., task TB300), such that each instance calculates a combined DOA estimate for a different corresponding source component.

A method of selecting a candidate direction (e.g., an implementation of method M10, M20, MA20, M25, M30, M100, or M110 as described herein) may be used to support voice activity detection (VAD), which may be applied for noise suppression in various use cases (e.g., a speakerphone). Such a technique, which may be implemented as a sector-based approach (i.e., modeling the environmental space as a discrete number of spatial sectors (e.g., four sectors for a quadrant framework)), may include a "vadall" statistic based on a maximum likelihood ("likelihood_max") of all sectors. For example, if the maximum is significantly larger than a noise-only threshold, then the value of the vadall statistic is TRUE (otherwise FALSE). It may be desirable to update the noise-only threshold only during a noise-only period. Such a period may be indicated, for example, by a single-channel VAD (e.g., from a primary microphone channel) and/or a VAD based on detection of speech onsets and/or offsets (e.g., based on a time-derivative of energy for each of a set of frequency components as described, for example, in U.S. Publ. Pat. Appls. Nos. 2011/0264447 A1, publ. Oct. 27, 2011, and 2012/0130713, publ. May 24, 2012).

Additionally or alternatively, such a technique may include a per-sector "vad[sector]" statistic based on a maximum likelihood of each sector. Such a statistic may be implemented to have a value of TRUE only when the single-channel VAD and the onset-offset VAD are TRUE, vadall is TRUE, and the maximum for the sector is greater than some portion (e.g., 95%) of likelihood_max. This information can be used to select a sector with maximum likelihood. Applicable scenarios include a user-selected target sector with a moving interferer, and a user-selected interference sector with a moving target.

may be desirable to select a tradeoff between instantaneous tracking (PWBFNF performance) and prevention of too-frequent switching of the interference sector. For example, it may be desirable to combine the vadall statistic with one or more other VAD statistics. The vad[sector] statistic may be used to specify the interference sector and/or to trigger updating of a non-stationary noise reference. It may also be desirable to normalize the vadall statistic and/or a vad[sector] statistic using, for example, a minimum-statistics-based normalization technique (e.g., as described in U.S. Publ. Pat. Appl. No. 2012/0130713, published May 24, 2012).

A method of selecting a candidate direction (e.g., an implementation of method M10, M20, MA20, M25, M30, M100, or M110 as described herein) may be used to support directional masking, which may be applied for noise suppression in various use cases (e.g., a speakerphone). Such a technique may be used to obtain additional noise-suppression gain by using the DOA estimates to control a directional masking technique (e.g., to pass a target quadrant and/or to block an interference quadrant). Such a method may be useful for handling reverberation and may produce an additional 6-12 dB of gain. The selected candidate directions may be used for quadrant masking (e.g., by assigning an angle with maximum likelihood per each frequency bin). It may be desirable to control the masking aggressiveness based on target dominancy (e.g., as indicated by a distribution of the candidate directions for the various frequency bins that is strongly concentrated at the direction of the desired target source). Such a technique may be designed to obtain a natural masking response (e.g., a smooth natural seamless transition of aggressiveness), such that the dynamic range of the filter is greater when the desired target source (e.g., the first source component) is strong and lesser when the desired target source is weak.

Figure 59A:
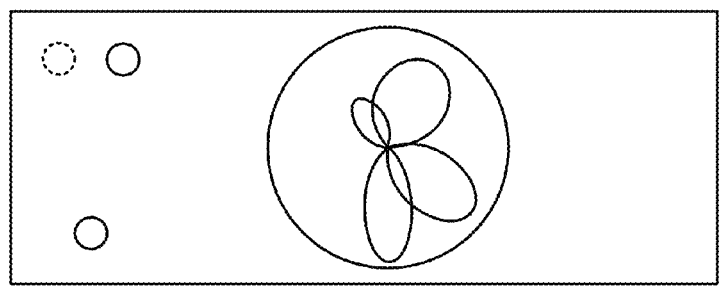
FIG. 59A shows a telephone design.

It may be desirable to provide a multi-view graphical user interface (GUI) for source tracking and/or for extension of PW BFNF with directional masking. Various examples are presented herein of three-microphone (two-pair) two-dimensional (e.g., 360°) source tracking and enhancement schemes which may be applied to a desktop handsfree speakerphone use case. However, it may be desirable to practice a universal method to provide seamless coverage of use cases ranging from the desktop handsfree to handheld handsfree or even to handset use cases. While a three-microphone scheme may be used for a handheld handsfree use case, it may be desirable to also use a fourth microphone (if already there) on the back of the device. For example, it may be desirable for at least four microphones (three microphone pairs) to be available to represent (x, y, z) dimension. A design as shown in FIG. 1 has this feature, as does the design shown in FIG. 59A, with three frontal microphones (indicated by the open circles) and a back microphone (not visible, indicated by the dotted circle).

It may be desirable to provide a visualization of an active source on a display screen of such a device. The extension principles described herein may be applied to obtain a straightforward extension from 2D to 3D by using a front-back microphone pair. To support a multi-view GUI, we can determine the user's holding pattern by utilizing any of a variety of position detection methods, such as an orientation sensor as described herein (e.g., one or more accelerometers, gyrometers, and/or proximity sensors) and/or a variance of likelihood given by 2D anglogram per each holding pattern. Depending on the current holding pattern, we can switch to two non-coaxial microphone pairs as appropriate to such a holding pattern and can also provide a corresponding 360° 2D representation on the display if desired. Such a GUI may also be implemented to allow a user to configure a desired directional masking pattern (e.g., as described herein with reference to FIGS. 29C-31B).

Figure 59B:
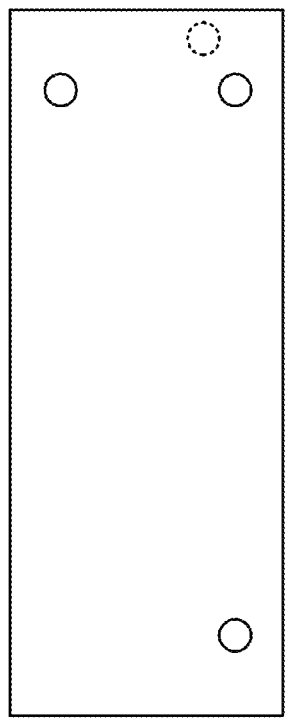
FIGS. 59B-59D show use of such a design in various modes with corresponding visualization displays.
Figure 59C:
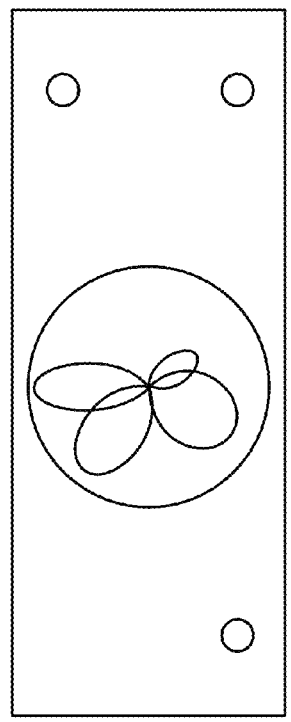
Figure 59D:
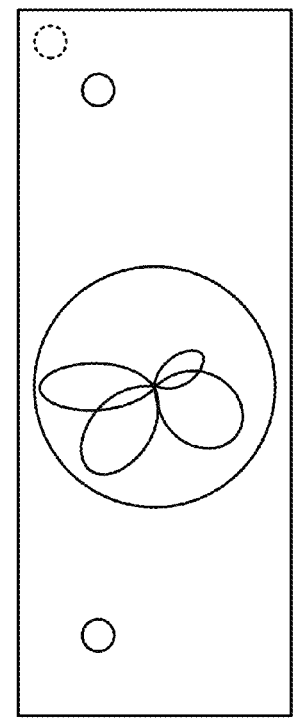

For example, such a method may be implemented to support switching among a range of modes that may include a desktop handsfree (e.g., speakerphone) mode, a portrait browsetalk mode, a landscape browsetalk mode, and a handset mode (i.e. held to the ear and directed at the mouth). FIG. 59B shows an example of a desktop handsfree mode with three frontal microphones and a corresponding visualization on a display screen of the device. FIG. 59C shows an example of a handheld handsfree (portrait) mode, with two frontal microphones and one back microphone being activated, and a corresponding display. FIG. 59D shows an example of a handheld handsfree (landscape) mode, with a different pair of frontal microphones and one back microphone being activated, and a corresponding display.

It may be desirable to provide an enhancement of a target source. The extension principles described herein may be applied to obtain a straightforward extension from 2D to 3D by also using a front-back microphone pair. Instead of DOA estimates ($\theta_1$, $\theta_2$) from only two dimensions, we obtain an additional estimate from another dimension for a total of three DOA estimates ($\theta_1$, $\theta_2$, $\theta_3$). In this case, the PWBFNF array steering matrix as shown in FIG. 50D may be expanded to six rows (with the added microphone pair), and the masking gain function may be expanded from $f(\theta_1)f(\theta_2)$ to $f(\theta_1)f(\theta_2)f(\theta_3)$. Using a position-sensitive selection as described above, we can use all three microphone pairs optimally, regardless of the current holding pattern, to obtain a seamless transition among the modes in terms of the source enhancement performance. Of course, more than three pairs may be used at one time as well.

Each of the microphones for direction estimation as discussed herein (e.g., with reference to location and tracking of one or more users or other sources) may have a response that is omnidirectional, bidirectional, or unidirectional (e.g., cardioid). The various types of microphones that may be used include (without limitation) piezoelectric microphones, dynamic microphones, and electret microphones. It is expressly noted that the microphones may be implemented more generally as transducers sensitive to radiations or emissions other than sound. In one such example, the microphone array is implemented to include one or more ultrasonic transducers (e.g., transducers sensitive to acoustic frequencies greater than fifteen, twenty, twenty-five, thirty, forty, or fifty kilohertz or more).

Figure 60A:
FIG. 60A shows a block diagram of an audio preprocessing stage AP10.

An apparatus as disclosed herein may be implemented as a combination of hardware (e.g., a processor) with software and/or with firmware. Such apparatus may also include an audio preprocessing stage AP10 as shown in FIG. 60A that performs one or more preprocessing operations on signals produced by each of the microphones MC10 and MC20 (e.g., of an implementation of one or more microphone arrays) to produce preprocessed microphone signals (e.g., a corresponding one of a left microphone signal and a right microphone signal) for input to task T10 or difference calculator 100. Such preprocessing operations may include (without limitation) impedance matching, analog-to-digital conversion, gain control, and/or filtering in the analog and/or digital domains.

Figure 60B:
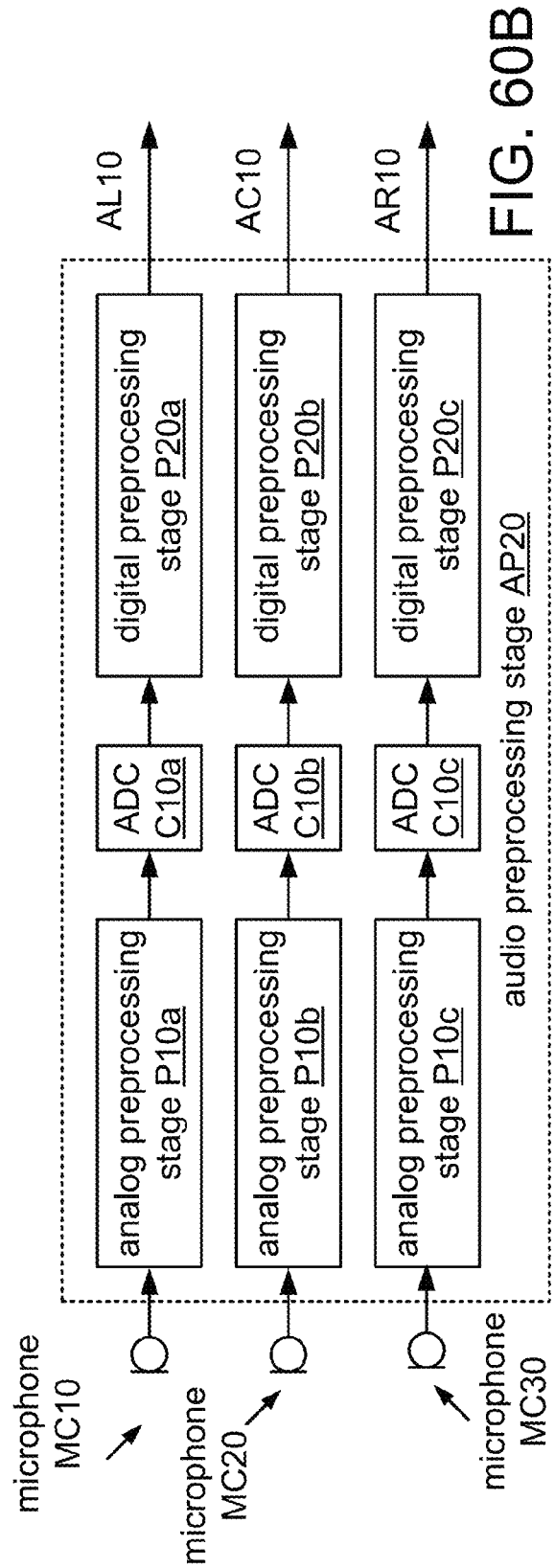
FIG. 60B shows a block diagram of a three-channel implementation AP20 of audio preprocessing stage AP10.

FIG. 60B shows a block diagram of a three-channel implementation AP20 of audio preprocessing stage AP10 that includes analog preprocessing stages P10a, P10b, and P10c. In one example, stages P10a, P10b, and P10c are each configured to perform a highpass filtering operation (e.g., with a cutoff frequency of 50, 100, or 200 Hz) on the corresponding microphone signal. Typically, stages P10a, P10b, and P10c will be configured to perform the same functions on each signal.

It may be desirable for audio preprocessing stage AP10 to produce each microphone signal as a digital signal, that is to say, as a sequence of samples. Audio preprocessing stage AP20, for example, includes analog-to-digital converters (ADCs) C10a, C10b, and C10c that are each arranged to sample the corresponding analog signal. Typical sampling rates for acoustic applications include 8 kHz, 12 kHz, 16 kHz, and other frequencies in the range of from about 8 to about 16 kHz, although sampling rates as high as about 44.1, 48, or 192 kHz may also be used. Typically, converters C10a, C10b, and C10c will be configured to sample each signal at the same rate.

In this example, audio preprocessing stage AP20 also includes digital preprocessing stages P20a, P20b, and P20c that are each configured to perform one or more preprocessing operations (e.g., spectral shaping) on the corresponding digitized channel to produce a corresponding one of a left microphone signal AL10, a center microphone signal AC10, and a right microphone signal AR10 for input to task T10 or difference calculator 100. Typically, stages P20a, P20b, and P20c will be configured to perform the same functions on each signal. It is also noted that preprocessing stage AP10 may be configured to produce a different version of a signal from at least one of the microphones (e.g., at a different sampling rate and/or with different spectral shaping) for content use, such as to provide a near-end speech signal in a voice communication (e.g., a telephone call). Although FIGS. 60A and 60B show two-channel and three-channel implementations, respectively, it will be understood that the same principles may be extended to an arbitrary number of microphones.

Figure 61A:
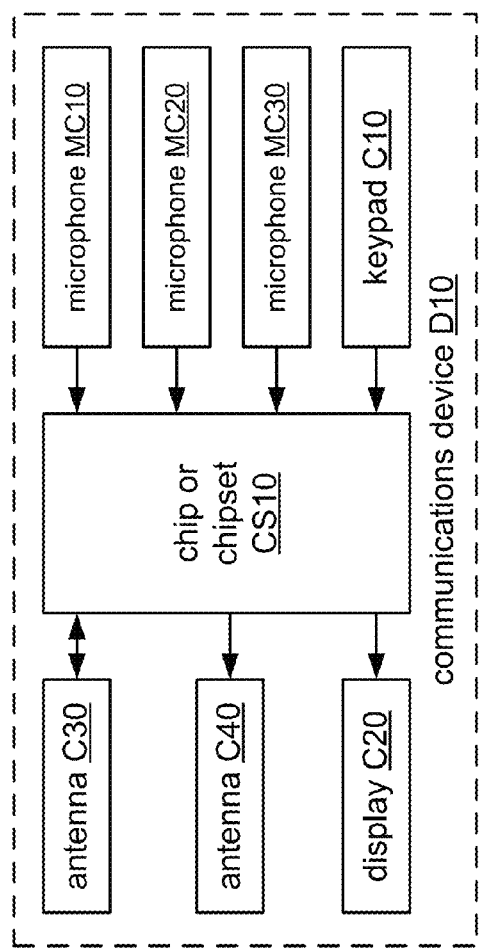
FIG. 61A shows a block diagram of a communications device D10.

FIG. 61A shows a block diagram of a communications device D10 that includes a chip or chipset CS10 (e.g., a mobile station modem (MSM) chipset) that may be implemented to embody the elements of any one or more of the implementations of apparatus A5, A10, A15, A300, A320, A330, A350, AC100, AD100, MF5, MF10, MF15, MF300, MF320, MF325, MF330, MF340, MF350, MFC100, and MFD100 as described herein. Chip/chipset CS10 may include one or more processors, which may be configured to execute a software and/or firmware part of such apparatus (e.g., as instructions).

Chip/chipset CS10 includes a radio receiver, which is configured to receive a radio-frequency (RF) communications signal and to decode and reproduce an audio signal encoded within the RF signal, and a radio transmitter, which is configured to transmit an encoded audio signal which is based on audio information received via microphone MC10, MC20, and/or MC30 (e.g., based on an output signal produced by a spatially directive filter of apparatus AC100, AD100, MFC100, or MFD100) into a transmission channel as an RF communications signal that describes the encoded audio signal. Such a device may be configured to transmit and receive voice communications data wirelessly via any one or more of the codecs referenced herein.

Device D10 is configured to receive and transmit the RF communications signals via an antenna C30. Device D10 may also include a diplexer and one or more power amplifiers in the path to antenna C30. Chip/chipset CS10 is also configured to receive user input via keypad C10 and to display information via display C20. In this example, device D10 also includes one or more antennas C40 to support Global Positioning System (GPS) location services and/or short-range communications with an external device such as a wireless (e.g., Bluetooth™) headset. In another example, such a communications device is itself a Bluetooth™ headset and lacks keypad C10, display C20, and antenna C30.

Communications device D10 may be embodied in a variety of communications devices, including smartphones and laptop and tablet computers. FIG. 1 shows front, rear, and side views of one such example: a handset H100 (e.g., a smartphone) having two voice microphones MV10-1 and MV10-3 arranged on the front face, a voice microphone MV10-2 arranged on the rear face, another microphone ME10 (e.g., for enhanced directional selectivity and/or to capture acoustic error at the user's ear for input to an active noise cancellation operation) located in a top corner of the front face, and another microphone MR10 (e.g., for enhanced directional selectivity and/or to capture a background noise reference) located on the back face. A loudspeaker LS10 is arranged in the top center of the front face near error microphone ME10, and two other loudspeakers LS20L, LS20R are also provided (e.g., for speakerphone applications). A maximum distance between the microphones of such a handset is typically about ten or twelve centimeters. The various microphones of device H100 may be used as microphones MC10, MC20, MC30, etc. of an array as described herein, depending on the desired axis configurations of the particular application.

Figure 61B:
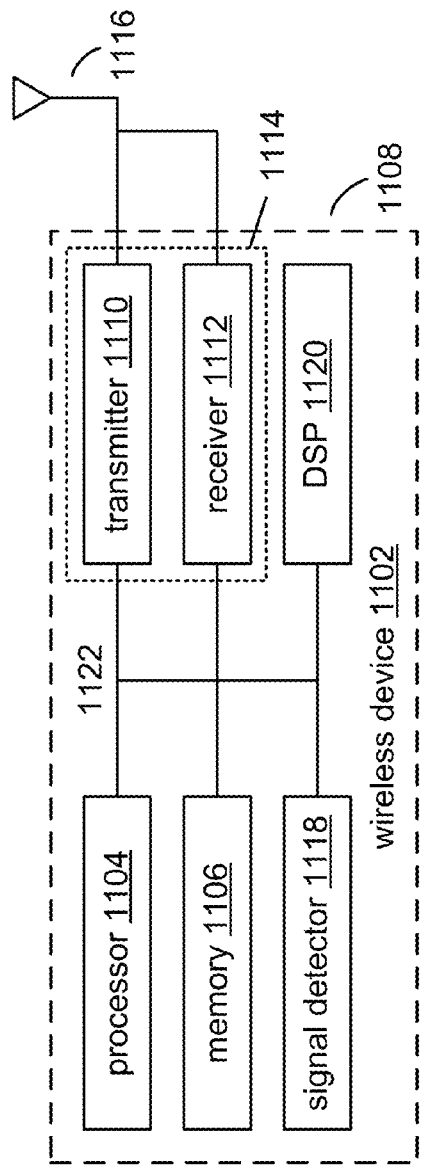

FIG. 61B shows a block diagram of a wireless device 1102 that may be implemented to perform a method as described herein (e.g., any one or more of methods M10, M20, MA20, M25, M30, M100, M110, M200, M300, M320, M325, M330, M340, M350, MC100, MD100, MG100, MG110, and MG120). Wireless device 1102 may be a remote station, access terminal, handset, personal digital assistant (PDA), cellular telephone, etc.

Wireless device 1102 includes a processor 1104 which controls operation of the device. Processor 1104 may also be referred to as a central processing unit (CPU). Memory 1106, which may include both read-only memory (ROM) and random access memory (RAM), provides instructions and data to processor 1104. A portion of memory 1106 may also include non-volatile random access memory (NVRAM). Processor 1104 typically performs logical and arithmetic operations based on program instructions stored within memory 1106. The instructions in memory 1106 may be executable to implement the method or methods as described herein.

Wireless device 1102 includes a housing 1108 that may include a transmitter 1110 and a receiver 1112 to allow transmission and reception of data between wireless device 1102 and a remote location. Transmitter 1110 and receiver 1112 may be combined into a transceiver 1114. An antenna 1116 may be attached to the housing 1108 and electrically coupled to the transceiver 1114. Wireless device 1102 may also include (not shown) multiple transmitters, multiple receivers, multiple transceivers and/or multiple antennas.

In this example, wireless device 1102 also includes a signal detector 1118 that may be used to detect and quantify the level of signals received by transceiver 1114. Signal detector 1118 may detect such signals as total energy, pilot energy per pseudonoise (PN) chips, power spectral density, and other signals. Wireless device 1102 also includes a digital signal processor (DSP) 1120 for use in processing signals.

The various components of wireless device 1102 are coupled together by a bus system 1122 which may include a power bus, a control signal bus, and a status signal bus in addition to a data bus. For the sake of clarity, the various busses are illustrated in FIG. 61B as the bus system 1122.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

Examples of codecs that may be used with, or adapted for use with, transmitters and/or receivers of communications devices as described herein include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). Such a codec may be used, for example, to recover the reproduced audio signal from a received wireless communications signal.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any of apparatus A5, A10, A15, A300, A320, A330, A350, AC100, AD100, MF5, MF10, MF15, MF300, MF320, MF325, MF330, MF340, MF350, MFC100, and MFD100) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (any of apparatus A5, A10, A15, A300, A320, A330, A350, AC100, AD100, MF5, MF10, MF15, MF300, MF320, MF325, MF330, MF340, MF350, MFC100, and MFD100) may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips).

Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of a method as disclosed herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (any of methods M10, M20, MA20, M25, M30, M100, M110, M200, M300, M320, M325, M330, M340, M350, MC100, MD100, MG100, MG110, and MG120) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein (e.g., any of methods M10, M20, MA20, M25, M30, M100, M110, M200, M300, M320, M325, M330, M340, M350, MC100, MD100, MG100, MG110, and MG120) may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of indicating a direction of arrival of a sound, said method comprising:
    calculating a first estimate, with respect to an axis of a first microphone array, of the direction of arrival;
    calculating a second estimate, with respect to an axis of a second microphone array that is different than the axis of the first microphone array, of the direction of arrival;
    determining an orientation, with reference to a world reference axis, of a device that includes the first and second microphone arrays; and
    based on the first and second estimates and the determined orientation, calculating a projection of the direction of arrival onto a projection plane that does not include the direction of arrival.

2. The method according to claim 1, wherein said sound is a component of a multichannel signal, and
    wherein said multichannel signal is based on signals produced by said first microphone array and on signals produced by said second microphone array.

3. The method according to claim 1, wherein said first estimate indicates a first angle with respect to the axis of the first microphone array, and
    wherein said calculating the projection includes converting the first angle to a second angle with respect to the axis of the first microphone array,
    wherein the second angle is in the projection plane and is based on at least a magnitude of the second estimate.

4. The method according to claim 3, wherein a magnitude of the second angle is less than a magnitude of the first angle.

5. The method according to claim 3, wherein said calculating the projection includes combining the second angle with information from the second estimate to obtain the calculated projection.

6. The method according to claim 1, wherein the projection plane includes the axis of the first microphone array and the axis of the second microphone array.

7. The method according to claim 1, wherein said first estimate is based on a plurality of phase differences between channels of a multichannel signal, and wherein each of said channels is based on a signal produced by a corresponding microphone of said first microphone array.

8. The method according to claim 1, wherein the axis of the first microphone array is not orthogonal to the axis of the second microphone array.

9. The method according to claim 1, wherein the axis of the first microphone array is at least five degrees from orthogonal to the axis of the second microphone array.

10. The method according to claim 1, wherein said method includes estimating an angle of elevation, with reference to a plane that includes the axes of the first and second microphone arrays, of the direction of arrival.

11. The method according to claim 1, wherein said world reference axis is one among a magnetic axis and a gravitational axis.

12. The method according to claim 1, wherein said first microphone array includes at least three microphones, and
wherein said first estimate is based on information from signals produced by each of said at least three microphones.

13. The method according to claim 1, wherein the sound is produced by a mouth of a human speaker.

14. The method according to claim 13, wherein said mouth is above the plane.

15. The method according to claim 1, wherein said method comprises indicating the projected direction of arrival in a display plane that is not more than ten degrees from parallel to the projection plane.

16. The method according to claim 1, wherein said method comprises:
calculating a first estimate, with respect to the axis of the first microphone array, of a direction of arrival of a second sound;
calculating a second estimate, with respect to the axis of the second microphone array, of the direction of arrival of the second sound;
based on the first and second estimates of the direction of arrival of the second sound, calculating a projection of the direction of arrival of the second sound into a plane that does not include the direction of arrival of the second sound; and
producing a display image that indicates both among the projected direction of arrival of the sound and the projected direction of arrival of the second sound.

17. The method according to claim 1, wherein said method comprises:
calculating a steering vector that is based on pair-wise phase delays; and
performing a spatially selective filtering operation on a signal that is based on a multichannel signal produced by at least one among the first and second microphone arrays,
wherein said spatially selective filtering operation is based on the calculated steering vector.

18. The method according to claim 1, wherein:
the first estimate indicates a first angle with respect to the axis of the first microphone array;
the second estimate indicates a second angle with respect to the axis of the second microphone array; and
calculating the projection comprises:
converting the first angle to an angle in the projection plane based on the second angle and a skew angle, and
combining the converted angle with information from the second estimate to obtain the projection of the direction of arrival.

19. An apparatus for indicating a direction of arrival of a sound, said apparatus comprising:
means for calculating a first estimate, with respect to an axis of a first microphone array, of the direction of arrival;
means for calculating a second estimate, with respect to an axis of a second microphone array that is different than the first microphone array, of the direction of arrival;
means for determining an orientation, with reference to a world reference axis, of a device that includes the first and second microphone arrays; and
means for calculating, based on the first and second estimates and the determined orientation, a projection of the direction of arrival onto a projection plane that does not include the direction of arrival.

20. The apparatus according to claim 19, wherein said sound is a component of a multichannel signal, and
wherein said multichannel signal is based on signals produced by said first microphone array and on signals produced by said second microphone array.

21. The apparatus according to claim 19, wherein said first estimate indicates a first angle with respect to the axis of the first microphone array, and
wherein said means for calculating the projection includes means for converting the first angle to a second angle with respect to the axis of the first microphone array,
wherein the second angle is in the projection plane and is based on at least a magnitude of the second estimate.

22. The apparatus according to claim 21, wherein a magnitude of the second angle is less than a magnitude of the first angle.

23. The apparatus according to claim 21, wherein said means for calculating the projection includes means for combining the second angle with information from the second estimate to obtain the calculated projection.

24. The apparatus according to claim 19, wherein the projection plane includes the axis of the first microphone array and the axis of the second microphone array.

25. The apparatus according to claim 19, wherein said first estimate is based on a plurality of phase differences between channels of a multichannel signal, and wherein each of said channels is based on a signal produced by a corresponding microphone of said first microphone array.

26. The apparatus according to claim 19, wherein the axis of the first microphone array is not orthogonal to the axis of the second microphone array.

27. The apparatus according to claim 19, wherein the axis of the first microphone array is at least five degrees from orthogonal to the axis of the second microphone array.

28. The apparatus according to claim 19, wherein said apparatus includes means for estimating an angle of elevation, with reference to a plane that includes the axes of the first and second microphone arrays, of the direction of arrival.

29. The apparatus according to claim 19, wherein said world reference axis is one among a magnetic axis and a gravitational axis.

30. The apparatus according to claim 19, wherein said first microphone array includes at least three microphones, and
wherein said first estimate is based on information from signals produced by each of said at least three microphones.

31. The apparatus according to claim 19, wherein said apparatus comprises means for indicating the projected direction of arrival in a display plane that is not more than ten degrees from parallel to the projection plane.

32. The apparatus according to claim 19, wherein said apparatus comprises:
means for calculating a first estimate, with respect to the axis of the first microphone array, of a direction of arrival of a second sound;
means for calculating a second estimate, with respect to the axis of the second microphone array, of the direction of arrival of the second sound;
means for calculating, based on the first and second estimates of the direction of arrival of the second sound, a projection of the direction of arrival of the second sound into a plane that does not include the direction of arrival of the second sound; and means for producing a display image that indicates both among the projected direction of arrival of the sound and the projected direction of arrival of the second sound.

33. The apparatus according to claim 19, wherein said apparatus comprises:
means for calculating a steering vector that is based on pair-wise phase delays; and
means for performing a spatially selective filtering operation on a signal that is based on a multichannel signal produced by at least one among the first and second microphone arrays,
wherein said spatially selective filtering operation is based on the calculated steering vector.

34. The apparatus according to claim 19, wherein:
the first estimate indicates a first angle with respect to the axis of the first microphone array;
the second estimate indicates a second angle with respect to the axis of the second microphone array; and
the means for calculating the projection comprises:
means for converting the first angle to an angle in the projection plane based on the second angle and a skew angle, and
means for combining the converted angle with information from the second estimate to obtain the projection of the direction of arrival.

35. An apparatus for indicating a direction of arrival of a sound, said apparatus comprising:
an orientation sensor in electrical communication with a processor;
wherein the orientation sensor is configured to determine an orientation, with reference to a world reference axis, of the apparatus; and
wherein the processor is configured to:
calculate a first estimate, with respect to an axis of a first microphone array, of the direction of arrival,
calculate a second estimate, with respect to an axis of a second microphone array that is different than the first microphone array, of the direction of arrival, and
calculate, based on the first and second estimates and said determined orientation, a projection of the direction of arrival onto a projection plane that does not include the direction of arrival.

36. The apparatus according to claim 35, wherein said sound is a component of a multichannel signal, and wherein said multichannel signal is based on signals produced by said first microphone array and on signals produced by said second microphone array.

37. The apparatus according to claim 35, wherein said first estimate indicates a first angle with respect to the axis of the first microphone array, and wherein said processor is further configured to convert the first angle to a second angle with respect to the axis of the first microphone array, wherein the second angle is in the projection plane and is based on at least a magnitude of the second estimate.

38. The apparatus according to claim 37, wherein a magnitude of the second angle is less than a magnitude of the first angle.

39. The apparatus according to claim 37, wherein said processor is further configured to combine the second angle with information from the second estimate to obtain the calculated projection.

40. The apparatus according to claim 35, wherein the projection plane includes the axis of the first microphone array and the axis of the second microphone array.

41. The apparatus according to claim 35, wherein said first estimate is based on a plurality of phase differences between channels of a multichannel signal, and wherein each of said channels is based on a signal produced by a corresponding microphone of said first microphone array.

42. The apparatus according to claim 35, wherein the axis of the first microphone array is not orthogonal to the axis of the second microphone array.

43. The apparatus according to claim 35, wherein the axis of the first microphone array is at least five degrees from orthogonal to the axis of the second microphone array.

44. The apparatus according to claim 35, wherein said processor is further configured to estimate an angle of elevation, with reference to a plane that includes the axes of the first and second microphone arrays, of the direction of arrival.

45. The apparatus according to claim 35, wherein said world reference axis is one among a magnetic axis and a gravitational axis.

46. The apparatus according to claim 35, wherein said first microphone array includes at least three microphones, and
wherein said first estimate is based on information from signals produced by each of said at least three microphones.

47. The apparatus according to claim 35, wherein said apparatus comprises a display configured to indicate the projected direction of arrival in a display plane that is not more than ten degrees from parallel to the projection plane.

48. The apparatus according to claim 35, wherein said processor is further configured to:
calculate a first estimate, with respect to the axis of the first microphone array, of a direction of arrival of a second sound,
calculate a second estimate, with respect to the axis of the second microphone array, of the direction of arrival of the second sound, and
calculate, based on the first and second estimates of the direction of arrival of the second sound, a projection of the direction of arrival of the second sound into a plane that does not include the direction of arrival of the second sound; and
wherein said apparatus includes a display configured to produce a display image that indicates both among the projected direction of arrival of the sound and the projected direction of arrival of the second sound.

49. The apparatus according to claim 35, wherein said processor is further configured to:
calculate a steering vector that is based on pair-wise phase delays; and
perform a spatially selective filtering operation on a signal that is based on a multichannel signal produced by at least one among the first and second microphone arrays,
wherein said spatially selective filtering operation is based on the calculated steering vector.

50. The apparatus according to claim 35, wherein:
the first estimate indicates a first angle with respect to the axis of the first microphone array;
the second estimate indicates a second angle with respect to the axis of the second microphone array; and
the processor is further configured to:
convert the first angle to an angle in the projection plane based on the second angle and a skew angle, and
combine the converted angle with information from the second estimate to obtain the projection of the direction of arrival.

51. The apparatus according to claim 35, further comprising the first microphone array and the second microphone array, wherein the first microphone array and the second microphone array are configured to capture the sound.

52. The apparatus according to claim 35, further comprising a display configured to display the projection of the direction of arrival onto the projection plane that does not include the direction of arrival.

\* \* \* \* \*